US011863844B2

(12) United States Patent
Iyer et al.

(10) Patent No.: US 11,863,844 B2
(45) Date of Patent: Jan. 2, 2024

(54) ON-DEMAND GENERATION AND PERSONALIZATION OF VIDEO CONTENT

(71) Applicant: Intel Corporation, Santa Clara, CA (US)

(72) Inventors: Ravishankar Iyer, Portland, OR (US); Nilesh Kumar Jain, Portland, OR (US); Rameshkumar Illikkal, Folsom, CA (US); Carl S. Marshall, Portland, OR (US); Selvakumar Panneer, Portland, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 16/833,582

(22) Filed: Mar. 28, 2020

(65) Prior Publication Data

US 2020/0228880 A1 Jul. 16, 2020

Related U.S. Application Data

(60) Provisional application No. 62/826,342, filed on Mar. 29, 2019.

(51) Int. Cl.
*H04N 21/234* (2011.01)
*H04N 21/81* (2011.01)
(Continued)

(52) U.S. Cl.
CPC ......... *H04N 21/812* (2013.01); *H04N 21/235* (2013.01); *H04N 21/23418* (2013.01); *H04N 21/23424* (2013.01); *H04N 21/64715* (2013.01)

(58) Field of Classification Search
CPC ............................................... H04N 21/23424
See application file for complete search history.

(56) References Cited

U.S. PATENT DOCUMENTS

2007/0294773 A1* 12/2007 Hydrie ............ H04N 21/44204 348/E7.071
2008/0189753 A1* 8/2008 Nesvadba .......... H04N 21/8456 725/105

(Continued)

OTHER PUBLICATIONS

Bau, David et al., "GAN Dissection: Visualizing and Understanding Generative Adversarial Networks," Massachusetts Institute of Technology, IBM Research, The Chinese University of Hong Kong, ICLR 2019 (19 pages).

(Continued)

*Primary Examiner* — Michael H Hong
(74) *Attorney, Agent, or Firm* — Alliance IP, LLC

(57) ABSTRACT

Various embodiments for dynamically generating an advertisement in a video stream are disclosed. In one embodiment, video stream content associated with a video stream for a user device is received. Video analytics data is obtained for the video stream content, which indicates a scene recognized in the video stream content. An advertisement to be generated and inserted into the video stream content is then selected based on the scene recognized in the video stream content, and an advertisement template for generating the selected advertisement is obtained. Video advertisement content corresponding to the advertisement is then generated based on the advertisement template and the video analytics data. The video advertisement content is then inserted into the video stream content, and the modified video stream content is transmitted to the user device.

25 Claims, 18 Drawing Sheets

(51) Int. Cl.
*H04N 21/647* (2011.01)
*H04N 21/235* (2011.01)

(56) References Cited

U.S. PATENT DOCUMENTS

| | | | | | |
|---|---|---|---|---|---|
| 2010/0312608 | A1* | 12/2010 | Shan | G06Q 30/0256 | 705/14.54 |
| 2011/0197220 | A1* | 8/2011 | Rowe | G06Q 30/0251 | 725/32 |
| 2015/0143404 | A1* | 5/2015 | Byers | G06Q 30/0207 | 725/32 |
| 2016/0050465 | A1* | 2/2016 | Zaheer | H04N 21/6125 | 725/34 |
| 2017/0164029 | A1* | 6/2017 | Dey | H04N 21/4758 | |
| 2018/0189823 | A1* | 7/2018 | Xie | G06Q 30/0276 | |
| 2019/0095959 | A1* | 3/2019 | Yu | G06Q 30/0244 | |
| 2020/0042549 | A1* | 2/2020 | Mizrahi | G06F 16/683 | |

OTHER PUBLICATIONS

Goodfellow, Ian J., "Generative Adversarial Nets," Dèpartement d'informatique et de recherche opérationnelle, Montreal, Jun. 10, 2014 (9 pages).

Isola, Phillip, "Image-to-Image Translation with Conditional Adversarial Networks," Berkeley AI Research (BAIR) Laboratory, UC Berkeley, Nov. 26, 2018 (17 pages).

Lu, Yongyi et al., "Attribute-Guided Face Generation Using Conditional CycleGAN," The Hong Kong University of Science and Technology, Tencent Youtu, Nov. 14, 2018 (16 pages).

* cited by examiner

ON-DEMAND GENERATION AND PERSONALIZATION OF VIDEO CONTENT

CROSS-REFERENCE TO RELATED APPLICATIONS

This patent application claims the benefit of the filing date of U.S. Provisional Patent Application Ser. No. 62/826,342, filed on Mar. 29, 2019, and entitled "ON-DEMAND PERSONALIZATION OF VISUAL CONTENT," the contents of which are hereby expressly incorporated by reference.

FIELD OF THE SPECIFICATION

This disclosure relates in general to the field of content distribution, and more particularly, though not exclusively, to on-demand generation and personalization of video content.

BACKGROUND

Media content (e.g., movies, TV shows, advertisements) is typically generated offline, which means there is no opportunity for individual users or consumers to influence the actual content in real time. For example, advertisers typically produce advertisements (e.g., video clips) offline and then provide them to content distributors, and content distributors then selectively display the advertisements to users who are currently viewing other media content. In this manner, the advertisements break the flow of the watched content of the users, and each advertisement is presented in exactly the same form to all targeted users. As a result, there is no ability to modify advertisements in real time and dynamically tailor the underlying media content to individual users or consumers.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
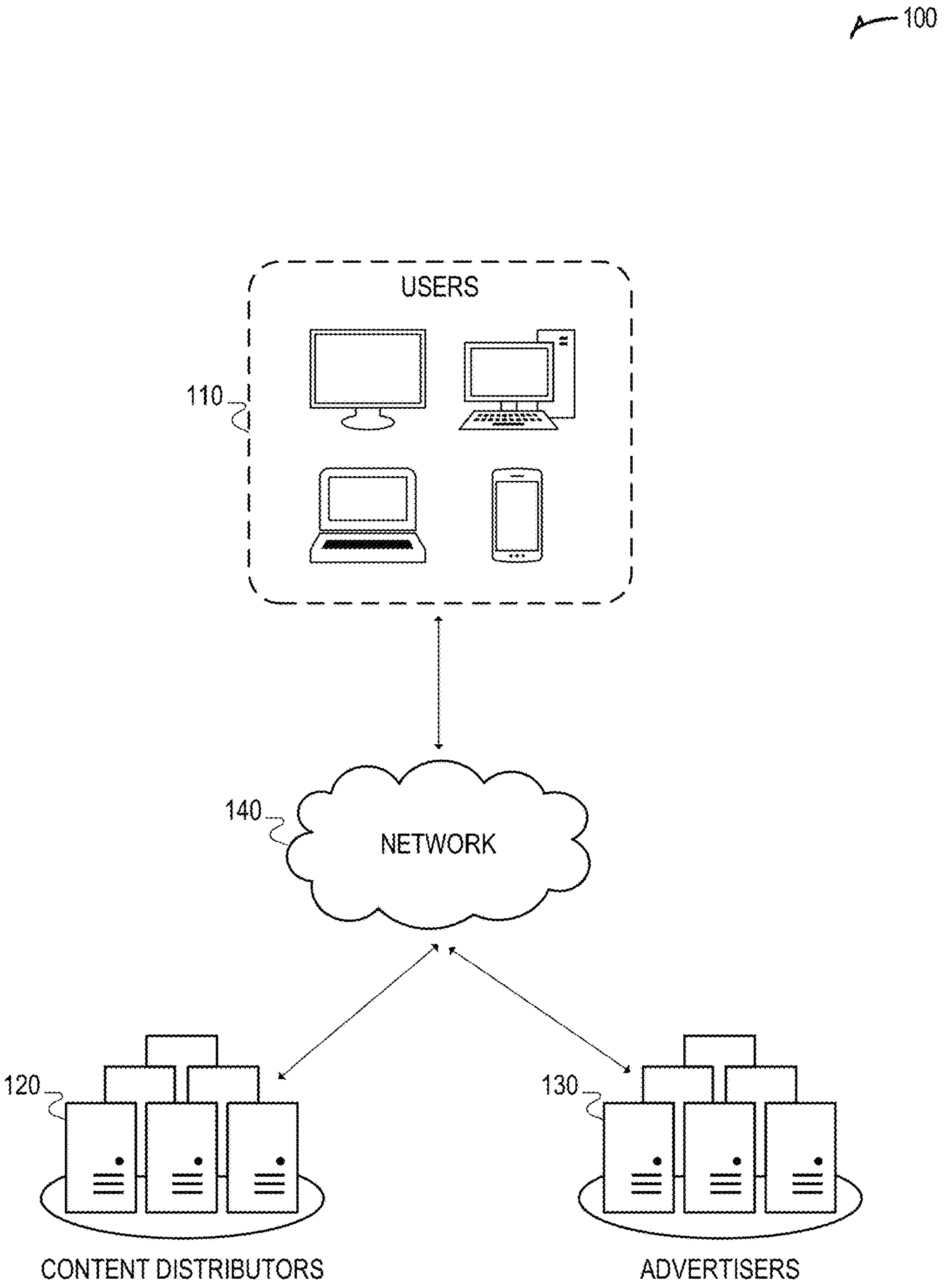
FIG. 1 illustrates an example embodiment of a generative content infusion system for providing on-demand generation and personalization of video content.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

On-Demand Generation and Personalization of Video Content

In the context of visual computing (e.g., the processing of visual data such as images and videos), artificial intelligence (AI) and machine learning (ML) techniques are typically used for classifying visual data (e.g., discriminative models) as opposed to creating visual data (e.g., generative models). However, recent developments relating to generative neural networks, such as variational autoencoders (VAEs) and generative adversarial networks (GANs), have led to many advancements in the use of AI for creating visual data, such as automatically-generated images and/or videos. For example, AI can now be leveraged to generate images from text, complex scenes from semantic maps (e.g., scene maps with semantic labels), artificial human faces that appear realistic, new or mimicked artistic styles (e.g., Van Gogh style), character animations, and so forth. This newly emerging area of AI for creating or augmenting visual data (e.g., images, videos) may be referred to as "cognitive graphics."

In the visual effects (VFX) industry, deep learning (DL) techniques can be leveraged to modify the appearance of objects in a scene of an image or video. For example, using deep learning, the targeted objects can be segmented out of the scene, and the corresponding areas of the segmentation mask can then be inpainted in order to modify, replace, and/or remove the objects from the scene, as desired.

Today, however, media content is currently generated offline, which means there is no opportunity for individual users or consumers to influence the actual content in real time. For example, while advertising and promotional content can be selectively distributed to users based on profiled user data, a user has no influence on the underlying content of an advertisement that has been selected for the user. In particular, advertisers typically produce advertisements (e.g., video clips) and provide them to content distributors, and content distributors then leverage user profiles (e.g., user characteristics, preferences, viewing history) to selectively display the advertisements to targeted users who are currently viewing other media content. In this manner, the advertisements break the flow of the watched content of the users, and each advertisement is presented in exactly the same form to all targeted users. As a result, there is no ability to modify advertisements in real time and dynamically tailor the underlying media content to individual users or consumers.

In particular, producing a video clip is a time-consuming and expensive process, regardless of whether the video clip is captured from a staged action sequence with professional actors, rendered exclusively using computer graphics, or a combination of both. While certain technology can be used to assist in each stage of the long video production pipeline, technological assistance is typically limited to automating or accelerating various mundane, tedious, and/or repetitive tasks (e.g., clean up and color correction), and thus the overall process is still very labor intensive. For example, once a video is produced, edited, and packaged for delivery, the content may still require additional support, such as providing "closed captioning" in the language where the content will be distributed, performing additional editing and reformatting based on the requirements of each distributor, and so forth. As a result, the underlying video content is static in nature and cannot be dynamically changed to suit different users.

This problem is even more aggravating for premium content protected by digital rights management (DRM) restrictions (e.g., movies, sports/game broadcasts, video streaming services such as Netflix). For example, DRM restrictions typically require the use of trusted execution environments (TEES) to ensure tamper resistant content consumption, and the current DRM licensing model lacks the capability to allow AI-based synthetic content generation with TEE support for premium content adaptation. Accordingly, for premium content with DRM restrictions, it can be challenging to leverage AI methodologies to securely modify embedded content to fit the needs of each user in a tamper resistant manner and with the appropriate licensing.

The static nature of video content also negatively impacts the user experience for advertisements. For example, content distributors typically continuously monitor information on user behavior and viewing habits in order to dynamically compute recommendations for advertisements to display to users (e.g., based on the user profiles in combination with the currently watched content and the pool of available advertisements). Then, based on a particular advertisement display frequency, the content distributors sporadically break or interrupt the currently watched content of users to insert the recommended advertisements. This results in a poor user experience, however, as the advertisements break the continuity of the viewing experience for the users.

Alternatively, advertisements can be overlaid over the watched content, but that causes the advertisements to hide portions of the watched content, while also placing significant limitations on the form of advertisements (e.g., scrolling banners with no audio). This approach often annoys users and reduces their overall engagement, which limits the potential opportunity for advertisers to engage potential customers through creative and appealing advertisements.

Thus, due to the static nature of video content, no current solutions are capable of modifying video content in real time in order to dynamically tailor the content to individual users or consumers. This results in a lost opportunity for advertisers, as well as a poor user experience.

Accordingly, this disclosure presents various embodiments for performing on-demand personalization of visual content, as described further below.

FIG. 1 illustrates an example embodiment of a generative content infusion system 100 for providing on-demand generation and personalization of video content. In the illustrated embodiment, for example, system 100 can be used to personalize or customize visual content for individual users in real time, as described further below.

In the illustrated embodiment, system 100 includes users 110, content distributors 120, advertisers 130, and a network 140. The content distributors 120 distribute media content to the users 110 (e.g., over network 140), such as movies, television shows, sporting events, streamed videos, and/or any other type of visual-based media content. In addition, on behalf of the advertisers 130, the content distributors 120 selectively distribute advertisements to targeted users 110 who are viewing other media content.

Prior to being displayed, however, the advertisements are personalized or customized for the targeted users 110 on-demand and in real time, which increases user engagement and improves the overall success of advertising campaigns. In particular, artificial intelligence (AI) techniques are leveraged to personalize advertisements for users 110 based on the content they are currently watching, potentially along with other information associated with the users, such as user contexts, characteristics, behavior, viewing history, and so forth. As an example, based on the video content that a user 110 is currently watching, an advertisement can be generated using AI to intelligently place an advertised product or service, or even the user itself, into the watched content without breaking the flow of that content.

Using deep learning techniques, for example, the system 100 may analyze the watched content in real time, and/or may use cached video analytics from an offline or prior analysis of the watched content, to "learn" certain information about the content and what it contains. The learned information associated with the watched content is then used to dynamically generate advertising content using AI techniques, such as generative adversarial networks (GANs) and variational autoencoders (VAE), among other examples. In some embodiments, for example, a machine learning model is trained based on certain video content and/or video genres, and based on that training, new content can then be dynamically generated from the currently watched content (e.g., for both premium DRM/ERM content and non-premium content).

In some cases, for example, advertising content may be directly incorporated into the watched content (e.g., incorporating the advertised products/services and/or the user into the watched content), while in other cases, the advertising content may be generated as a separate or standalone advertisement with a similar context as the watched context (e.g., similar theme, environment, objects, people, and/or characters). For example, with respect to advertising content that is directly incorporated into the watched content, the generated content may be dynamically placed into the watched content, and/or certain portions of the watched content may be dynamically replaced with the generated content (e.g., for a Pepsi advertisement, a Coca-Cola bottle in a movie may be replaced with a Pepsi bottle).

In some embodiments, system 100 may also include a novel digital rights management (DRM) licensing scheme to enable components that perform on-demand tailoring (e.g., GAN-based content tailoring) of premium content with DRM restrictions to obtain the appropriate licensing to modify DRM-protected content with TEE support and without violating DRM licensing policies (e.g., as described further throughout this disclosure in connection with other FIGURES). For example, content licensing and protection solutions for premium (DRM) content may rely on various security technologies, such as Intel Protected Audio Video Path (PAVP) technology, Software Guard Extensions (SGX), Trusted Execution Environments (TEE), and so forth. These solutions can be extended or augmented with AI-based content modification and metering functionality to provide improved content licensing and content analytics for premium content. In addition, secure metering of the synthetic content generation analytics can be supported to improve content generation at the source/head-end. For example, analytics and metrics can be tracked for synthetically generated content, such as what premium content it contains, how the content was modified or generated, when it was generated, the number or identity of users that consumed it, and so forth. Moreover, in some cases, these metrics may be used to apportion advertising royalties for synthetically generated advertisements that include premium content (e.g., royalties to the creators of the premium content).

The on-demand video content generation and personalization functionality described in connection with system 100 (and further described throughout this disclosure) can be performed by computing component(s) deployed anywhere throughout a system or network topology, such as in the cloud, edge, and/or fog, among other examples. In some cases, for example, the on-demand customization may be performed by the content distributors 120 or other service providers in the cloud and/or at the edge (e.g., using multi-access edge computing (MEC)), or by the user devices 110 at the edge (e.g., smartphones, tablets, media streaming devices, cable boxes, smart TVs, gateways/routers, other home IoT devices), among other examples.

In some cases, the particular components that perform the on-demand video content generation may vary depending on the type of content (e.g., live versus recorded video) and the level or granularity of personalization that is being provided (e.g., per user, household, neighborhood, zip code, city, state, country). For example, for live video content that is personalized per user or household, the content generation may be performed at the edge or on the client devices of the users. For recorded or on-demand video that is personalized for a large group of users within a broader geographical area, however, the content generation may be performed in the cloud or fog.

The proposed solution provides numerous advantages. In particular, revenue in the video advertisement segment is substantial and is expected to continue growing at a high rate. Ad-based revenue is a primary source of revenue for many top companies (e.g., Google/YouTube, Facebook). This solution provides a faster alternative for generating advertisements that not only lowers the production cost of advertisements, but also helps showcase advertised products and services to users at optimal times, thus increasing the overall success of advertising campaigns. For example, an important metric of success in the advertising and entertainment industry is user engagement. This solution enables advertisers to have the content of their advertisements tailored for users in real time, which increases the overall user engagement. Thus, this solution can be productized for media delivery platforms (e.g., online, broadcast, etc.) as well as advertisers to reduce the overall cost to reach out to users with advertised products and services, while also improving the success of those advertising campaigns.

The proposed solution not only addresses the shortcomings of current advertising approaches, but it has the potential to enable an entirely new business model. For example, content creators can monetize advertisers by opening up a new segment of media content that can be altered in a certain way to incorporate user-specific advertisements without disturbing the viewing experience, thus providing a higher level of user engagement.

While the proposed solution is directly applicable and highly beneficial to the advertising and entertainment industry, it is broadly applicable in any context or use case where on-demand customization of visual data can be leveraged.

For example, the proposed solution may also be used to generate video content for purposes that extend beyond advertising. For example, a user could be portrayed as one of the people or characters in the video content the user is watching (e.g., by replacing a character in a movie with the user's likeness), an alternative ending could be generated for a movie in a way that would appeal to a particular user, inappropriate content could be censored for certain users (e.g., blurring video content and bleeping language that is not suited for children), or a network connectivity drop could be hidden with dynamically generated video content (e.g., dynamically generating an advertisement to display while network connectivity is restored or attempting to reconstruct the original content that was dropped or lost), among other examples.

Figure 2:
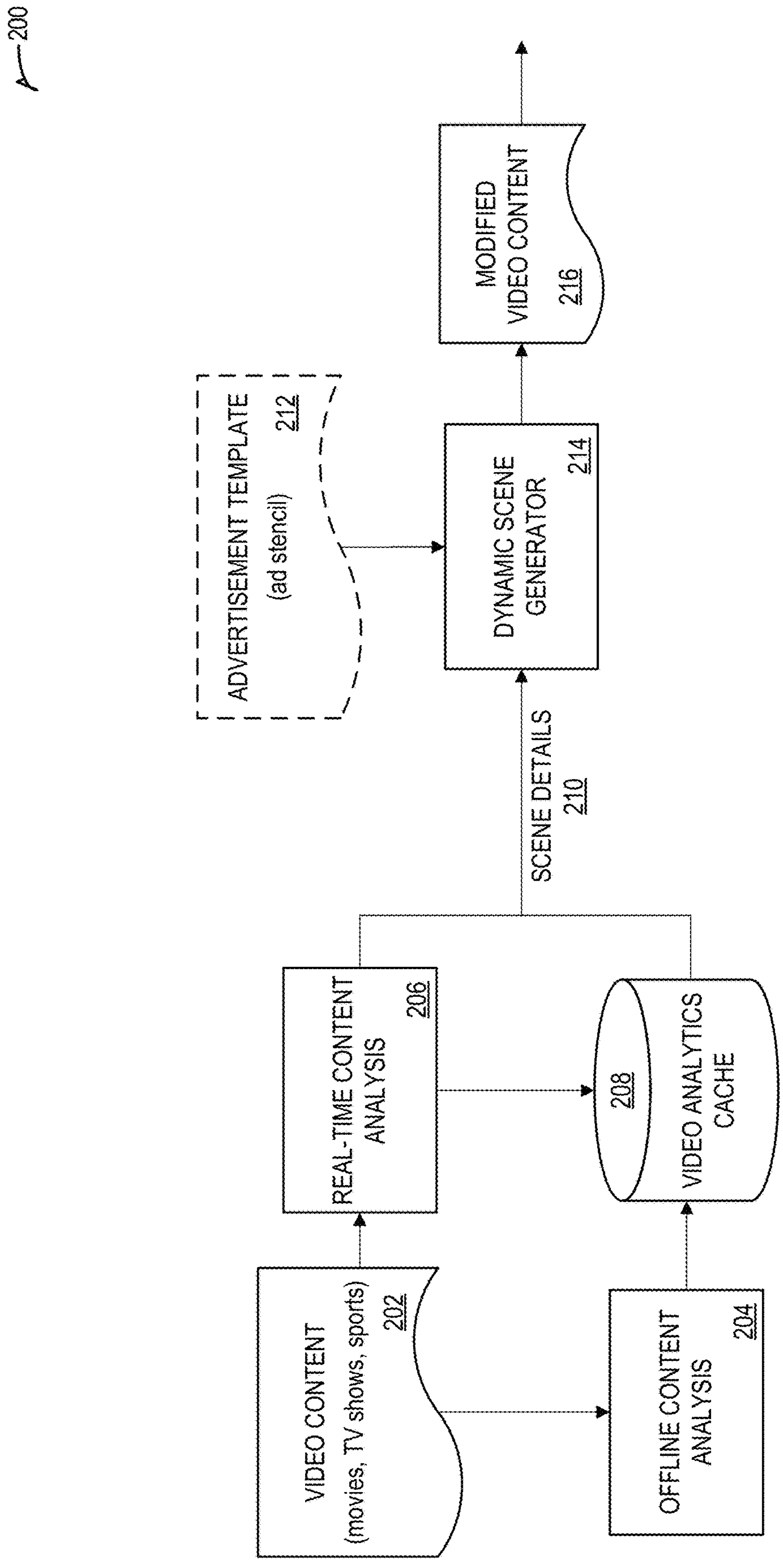
FIG. 2 illustrates an example process flow for on-demand video content generation performed by a generative content infusion system.

FIG. 2 illustrates an example process flow 200 for on-demand video content generation performed by a generative content infusion system. In process flow 200, for example, certain video content 202 is received from and delivered by a content producer, such as a movie, TV show, sporting event, and/or any other type of premium or non-premium video content.

Depending upon the nature of the content, offline analysis 204 and/or online real-time analysis 206 of the content is performed using AI techniques to learn certain information about the content, such as its theme, style, context, characters, objects, and so forth. The information learned from the offline 204 and/or online 206 analysis (e.g., the scene details 210) is then cached in video analytics cache 208 in order to provide fast access at the time of use and to facilitate reuse.

Separately, an advertisement template 212 (e.g., an ad stencil) is prepared by an advertiser for a particular advertisement. In various embodiments, for example, an interface or specification may be provided or implemented to enable advertisers to define advertisements as templates or stencils.

Once it is time to generate an advertisement, the learned scene information 210 and the advertisement template 212 are both provided to a dynamic scene generator 214. Based on the learned scene information 210 and the advertisement template 212, the dynamic scene generator 214 then prepares a generative model to modify the original content 202 and output modified content 216 that incorporates an advertisement into the original content 202.

In some embodiments, for example, the dynamic scene generator 214 may be implemented using artificial intelligence and/or machine learning techniques. For example, the dynamic scene generator 214 may be implemented using generative neural networks (GNNs) such as generative adversarial networks (GANs) or variational autoencoders (VAEs), among other examples. The functionality of the dynamic scene generator 214 is described further throughout this disclosure.

Figure 3:
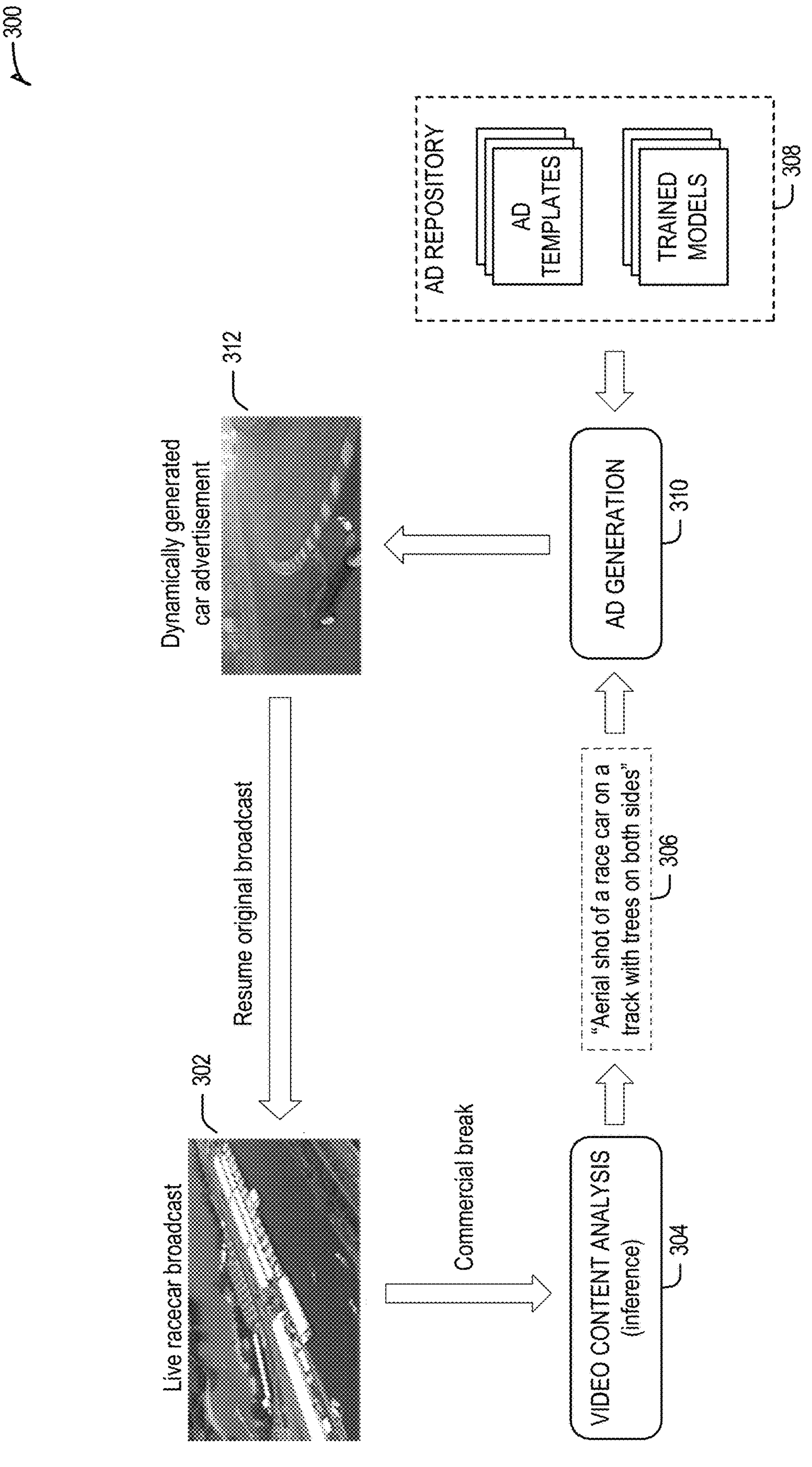
FIG. 3 illustrates an example process flow for dynamically generating an advertisement in a live video stream.

FIG. 3 illustrates an example process flow 300 for dynamically generating an advertisement in a live video stream. In particular, the example process flow 300 shows how a video clip for an advertisement can be generated in real time based on the video content the viewer is currently watching.

In the illustrated example, the viewer is watching a live racecar broadcast 302. When a commercial break is about to occur (e.g., based on agreements with sponsors), a video content analysis 304 is performed on the live video content 302 to perform scene understanding and extract the key representations 306 of the scene depicted in the live video content 302. In the illustrated example, the key representations of the scene 306 are represented using a natural language description 306: "an aerial shot of a race car on a track with tress on both sides."

The key representations and/or themes 306 of the live video content 302 (e.g., race track, trees, fast cars) are then used in conjunction with information obtained from an ad repository 308 (e.g., an advertisement template and/or trained generative model for generating an advertisement) to generate 310 a video clip for an advertisement that maintains the theme, flow, and ambience of the live video content 302.

In the illustrated example, the generated advertisement 312 is a video clip of a consumer sports car zooming through a racetrack in order to emphasize the sportiness and handling of the car. Once the video advertisement ends, the process flow automatically transitions back to the live event.

While this example shows how an advertisement can be generated for a live TV event, the same solution can be used to generate video and/or image advertisements that are shown online via video streaming services, search engines, social media platforms, websites, and so forth.

Figure 4:
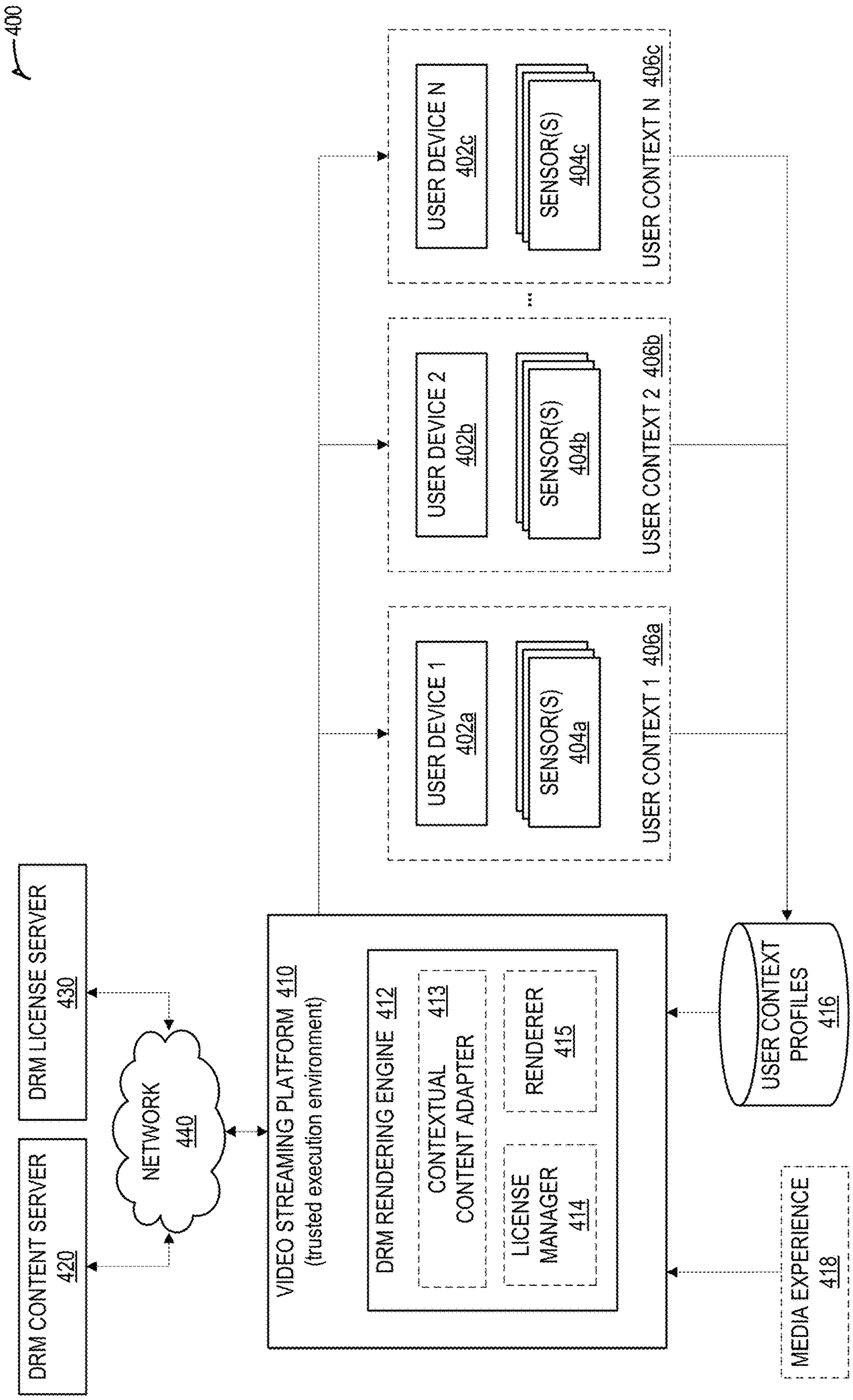
FIG. 4 illustrates an example embodiment of a system for performing on-demand personalization of protected DRM video content.

FIG. 4 illustrates an example embodiment of a system 400 for performing on-demand personalization of protected video content, such as premium video content that is subject to digital rights management (DRM) protections or restrictions. For example, the illustrated embodiment provides DRM licensing support to enable premium content protected with DRM restrictions to be customized on-demand (e.g., using generative adversarial networks (GANs)), as described further below.

In the illustrated embodiment, system 400 includes a video streaming platform 410 with a trusted media runtime engine (e.g., within a trusted execution environment (TEE)), which obtains premium video content from a DRM content server 420 (e.g., via network 440), modifies/adapts the content to the corresponding users or consumers, and then delivers the content to the corresponding user devices 402*a-c* for consumption.

Moreover, in the illustrated example, video streaming platform 410 includes a DRM engine 412 with augmented DRM licensing capabilities to support dynamic generation and modification of premium DRM content (e.g., GAN-based content modification). In particular, in DRM engine 412, a contextual content adaptor 413 works with a license manager 414 and renderer 415 to modify and/or update premium content using AI-based content generation based on the corresponding DRM content license.

For example, the license manager 414 performs remote attestation using platform credentials of the video streaming platform 410 to get the appropriate content license from the DRM license server 430. Moreover, based on the allowed license attributes, the contextual content adapter 413 generates adaptive content personalized for the consuming users without violating the license attributes.

In particular, the contextual content adapter 413 tailors the generated content to the users based on DRM user context profiles 416 that have been built by the platform AI entities over a period of time. For example, user contexts 406*a-c* for the respective users are observed and sensed via the corresponding user devices 402*a-c* and/or sensors 404*a-c* of the users. Moreover, user context profiles 416 are then built for the users over time based on the observed and sensed user contexts 406*a-c*, and the user context profiles 416 are continuously updated as additional feedback relating to user context is observed, sensed, or otherwise provided by the users or users devices 402*a-c*. In this manner, these user context profiles 416 can be used to adapt or personalize the video content for each user, as described further throughout this disclosure.

The video content for a particular user may also be adapted or personalized based on a media experience knob 418, which may provide information about the media consumption experience of that user, such as the form factor of the user device 402*a-c*, video quality or resolution, the type of video content, available network bandwidth, and so forth.

The components of system 400 may be implemented using any suitable type or combination of computing components, including general-purpose processors (e.g., CPUs), special-purpose processors and accelerators (e.g., GPUs, hardware video encoders/decoders, AI accelerators, FPGAs), sensors, network interfaces and controllers, and storage devices, among other examples.

Figure 5:
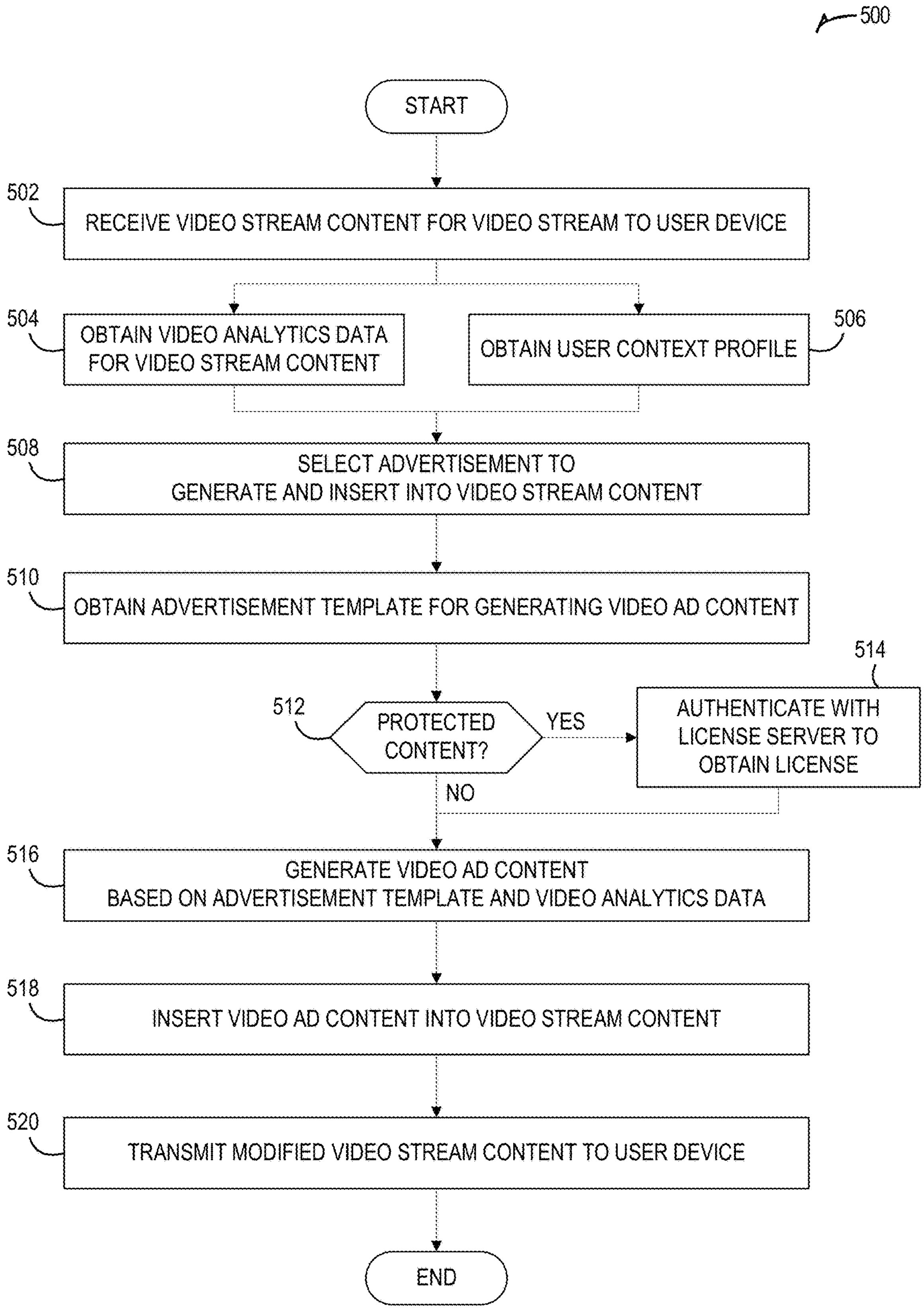
FIG. 5 illustrates a flowchart for an example embodiment of dynamic ad generation in a video stream.

FIG. 5 illustrates a flowchart 500 for an example embodiment of dynamic ad generation in a video stream. In various embodiments, flowchart 500 may be implemented using the embodiments and functionality described throughout this disclosure (e.g., the systems and devices of FIGS. 1, 4, 17, and 18, among others). In some embodiments, for example, flowchart 500 may be implemented by a video streaming device in the cloud, fog, or edge, or on the premises of a user consuming the video stream, among other examples.

The flowchart begins at block 502 to receive video stream content associated with a video stream for a user device. For example, the video stream content may contain certain parts of a live or on-demand video that is being transmitted or streamed to the user device.

The flowchart then proceeds to block 504 to obtain video analytics data for the video stream content. The video analytics data provides information about the scene(s) depicted in the video stream content, such as the scene context and/or scene content for a particular scene, which is derived from a video content analysis performed on the video stream content.

For example, the scene context may include various contextual characteristics recognized in a scene, such as a theme, context, flow, actions, background vs. foreground, type or style of visual content (e.g., movie, cartoon, lighting, ambiance), physical environment (e.g., indoor, outdoor), location, time of day, and so forth. Moreover, the scene content may include any physical objects or things recognized in the scene, such as people, animals, characters, sports balls, vehicles, buildings, structures, signage, land/sea/sky, and so forth.

In some cases, for example, the video analytics data may represent the scene context and/or scene content using a natural language description or video content metadata. The video analytics metadata may also include a segmentation mask that identifies the types of objects appearing in the scene and where they reside within the scene. For example, the segmentation mask may identify where the respective objects appear within each frame of the video content corresponding to the scene.

The video analytics data is derived by performing a video content analysis on the video stream content, which can either be performed in real time or offline. For example, for live video content, the video content analysis may be performed in real time to derive the corresponding video analytics data for the live content. For on-demand or recorded video content, however, the video content analysis may be performed offline (e.g., in advance of when it is actually used) and the resulting video analytics data may be stored or cached in a video analytics cache so that it is readily available whenever the video content is subsequently streamed to a user.

For example, the video analytics cache may contain video analytics datasets for a collection of videos that have been analyzed offline or ahead of time. In this manner, when a particular video is being streamed, the cache can be consulted to determine whether it contains the video analytics data for certain video content within that video. If it does, the video analytics data for that video content can simply be retrieved from the cache. Otherwise, a real-time video content analysis is performed on the video content to generate the video analytics data, and the video analytics data is also cached in the video analytics cache for future use.

In some embodiments, the video content analysis is performed by analyzing the video stream content using artificial intelligence or machine learning techniques. For example, a convolutional neural network (CNN) may be used to classify and/or recognize the scene context and content of a scene depicted in the video content. The video analytics data for that video content is then generated based on the scene context and/or scene content recognized in the scene.

The flowchart then proceeds to block 506 to obtain a user context profile for the user of the device receiving the video stream. In some embodiments, for example, user context data for users consuming video streams may be tracked and collected over time to generate user context profiles for the users, which may be stored in a user context profile repository. In this manner, the user context profiles may be used to select and/or generate personalized advertisements to insert into the video streams of the users.

A user context profile may provide a variety of information associated with a user and with the context in which the user consumes video content. For example, the user context profile may indicate various characteristics or attributes associated with the user, such as user identity, demographics, preferences, interests, and so forth. Similarly, the user context profile may indicate various characteristics or attributes associated with the context in which the user consumes video content, such as viewing habits (e.g., what content is watched and when), viewing behavior (e.g., physical behavior while viewing, such as actions, words, sounds, eye focus, level of attentiveness, and other physical reactions to video content), time, location, device form factor (e.g., TV, phone, tablet, computer, streaming device, AR/VR headset, smart watch), video quality/resolution, video content type, network bandwidth consumption, and so forth.

The user context data may be at least partially obtained or derived from devices in the surrounding environment of the user, such as the user device used to view or consume the video content, peripheral devices associated with the user device, and/or other standalone devices within proximity of the user. For example, the user context data may be derived from data captured by sensors (e.g., cameras, microphones, location sensors, motion sensors, accelerometers, gyroscopes, temperature sensors), or from data or usage metrics provided by other computing components (e.g., touchscreens, processors, GPUs and accelerators, network interface controllers), among other examples. The various sensors and computing components may be part of the user device (e.g., TV, phone, tablet, computer, streaming device, AR/VR headset, smart watch), part of peripheral devices associated with the user device (e.g., handheld controllers, mice, keyboard), or part of other standalone devices in the environment (e.g., standalone sensors such as cameras and microphones).

The flowchart then proceeds to block 508 to select an advertisement to generate and insert into the video stream content. In some embodiments, for example, the advertisement may be selected from a collection of advertisements in an ad repository based on the scene recognized in the video stream content and/or the user context profile associated with the user. For example, a car advertisement may be selected for a user watching a racecar event who is an adult and/or car enthusiast, a sports drink advertisement may be selected for a user watching a sporting event who is physically active and/or interested in physical fitness, or a video game advertisement may be selected for a user watching cartoons who is interested in video games.

The flowchart then proceeds to block 510 to obtain an advertisement template for the selected advertisement. The advertisement template contains a template of information for generating video advertisement content corresponding to the advertisement.

In some cases, for example, the advertisement template may include a semantic representation or map of objects to be depicted in the generated video advertisement content, such as a product associated with the advertisement, people interacting with the product, and so forth. For example, the template may include a semantic representation or cut out of each object (e.g., an image or other visual representation of the object), along with any other information that identifies its appearance, size, shape, colors, and so forth. In this manner, the advertisement template can be used to generate a scene that contains the content or objects represented in the template, along with other content that is recognized in the current video stream (e.g., as indicated in the video analytics data).

In some cases, the advertisement template may include a video template for the advertisement. For example, the video template may contain a video clip for the ad, a segmentation mask identifying content in the video clip (e.g., objects), and/or an indication of the content in the video clip that should remain and/or that can be modified or replaced. As an example, the video template may indicate that an advertised product in the video clip should remain intact (e.g., an advertised beverage) while the people interacting with the product can be modified or replaced (e.g., with characters from a movie or professional athletes from a sporting event currently being streamed).

The advertisement template may also include any text, speech, sounds, music, and/or other content to be included in the generated advertisement.

The flowchart then proceeds to block 512 to determine whether the video stream content contains protected or premium content, such as content that is subject to digital rights management (DRM) protection.

If the video stream content does not contain protected content, the flowchart proceeds to block 516, as described further below.

If the video stream content contains protected content, however, the flowchart proceeds to block 514 to authenticate with a license server and obtain the requisite license to modify and/or distribute the protected content. For example, for DRM content, the streaming platform may perform remote attestation to authenticate itself with a DRM license server and obtain the requisite content license from the DRM license server. The streaming platform may also configure a trusted or secure environment for generating, modifying, and/or displaying video content containing portions of the protected content (e.g., using a trusted execution environment (TEE) and/or protected audio video path). After the requisite license is obtained and the trusted environment is configured, the flowchart proceeds to block 516, as described further below.

At block 516, video advertisement content corresponding to the advertisement is generated based on the advertisement template and the video analytics data.

In some cases, for example, the video advertisement content may be generated by incorporating the advertisement directly into a scene in the video stream content. In particular, certain content in the video stream may be modified or replaced with advertisement content from the advertisement template. The content to be modified or replaced in the video stream can be identified based on the video analytics data. For example, the video analytics data may be used to identify a portion of the scene content depicted in the video stream that can be modified or replaced with corresponding content from the advertisement template. As a few examples, a beverage depicted in the original video content could be replaced with another type of beverage from the advertisement template, business signage in the original video content could be modified with the logo of another business in the advertisement template, an airplane in an advertisement template for a particular airline could be placed in the sky of the original video content, a cruise ship in an advertisement template for a cruise line could be placed in an ocean in the original video content, and so forth.

In other cases, the video advertisement content may be generated by dynamically generating an ad scene that incorporates content from both the advertisement template and the video stream. In particular, the ad scene may combine advertisement content from the advertisement template with certain content recognized in the scene depicted in the video stream. For example, for a video stream of a live racecar event, a car advertisement may be dynamically generated with a scene that depicts an advertised car (e.g., from the advertisement template) in a similar environment as the live racecar event (e.g., based on the video analytics data for the live racecar stream).

In some embodiments, artificial intelligence and/or machine learning techniques may be used to generate the video advertisement content. For example, the video advertisement content may be generated using a generative neural network (GNN) model, such as a generative adversarial network (GAN) model or a variational autoencoder (VAE) model, among other examples. In some embodiments, for example, a collection of generative (GNN) models may be trained to generate different types or genres of video content. In this manner, the video advertisement content may be generated using a corresponding generative model that is trained to generate the appropriate type or genre of video content for the advertisement. For example, the appropriate generative model for the video advertisement content may be obtained from the collection of generative models, and the advertisement template and the video analytics data may then be supplied as input to the generative model. The generative model then uses those inputs to generate the corresponding video advertisement content.

Further, in some cases, certain information from the user context profile of the user may also be used to generate the video advertisement content and/or personalize that content for the particular user. For example, the video advertisement content may be at least partially generated based on user preferences or interests, viewing habits and behavior, reactions or feedback to previous ads, the context or physical environment of the user (e.g., location, time, temperature, device form factor, video quality/resolution, number of people in the room), the physical appearance or likeness of the user (e.g., to portray the actual user or person in the generated video content), and so forth.

The flowchart then proceeds to block 518 to insert the video advertisement content into the video stream content. For example, depending on the nature of the video advertisement content, the video advertisement content may simply be inserted into the video stream (e.g., breaking the flow of the video stream with the advertisement), or the video advertisement content may replace certain portions of the video stream (e.g., an original scene from the video stream may be replaced with a modified scene that depicts the advertised product in that scene). In this manner, modified video stream content is generated based on insertion of the video advertisement content into the video stream content.

The flowchart then proceeds to block 520 to transmit the modified video stream content to the user device for consumption. In some cases, for example, the user device may receive the modified video stream content, decode the underlying video content, and then display that video content to a user.

At this point, the flowchart may be complete. In some embodiments, however, the flowchart may restart and/or certain blocks may be repeated. For example, in some embodiments, the flowchart may restart at block 502 to continue dynamically generating and inserting advertisements into video streams.

Example Computing Embodiments

The following sections present various examples of computing devices, systems, architectures, and environments that may be used in conjunction with the on-demand visual content personalization functionality described throughout this disclosure.

Example Edge Computing Embodiments

Figure 6:
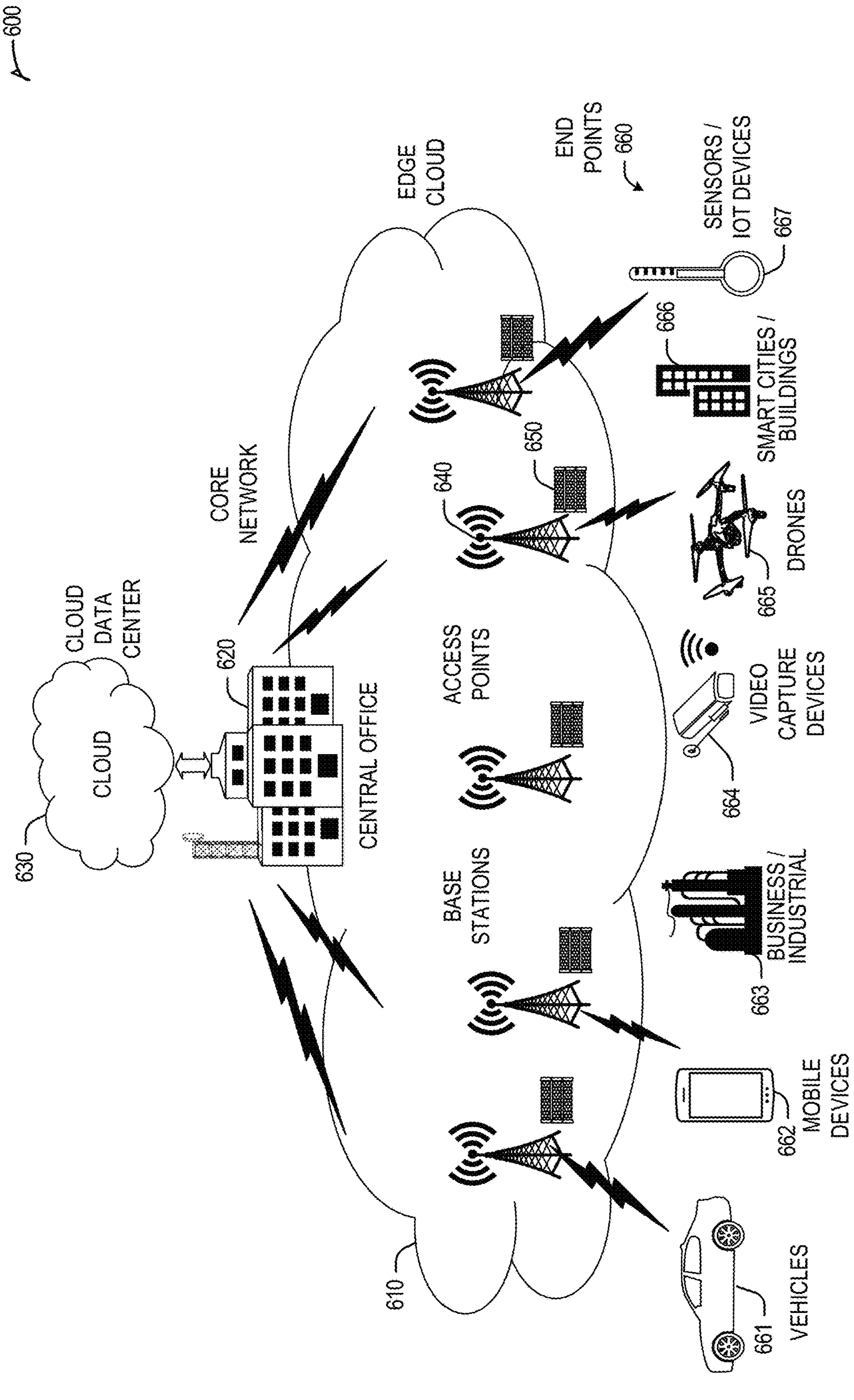
FIG. 6 illustrates an overview of an edge cloud configuration for edge computing.

FIG. 6 is a block diagram 600 showing an overview of a configuration for edge computing, which includes a layer of processing referred to in many of the following examples as an "edge cloud". As shown, the edge cloud 610 is co-located at an edge location, such as an access point or base station 640, a local processing hub 650, or a central office 620, and thus may include multiple entities, devices, and equipment instances. The edge cloud 610 is located much closer to the endpoint (consumer and producer) data sources 660 (e.g., autonomous vehicles 661, user equipment 662, business and industrial equipment 663, video capture devices 664, drones 665, smart cities and building devices 663, sensors and IoT devices 667, etc.) than the cloud data center 630. Compute, memory, and storage resources which are offered at the edges in the edge cloud 610 are critical to providing ultra-low latency response times for services and functions used by the endpoint data sources 660 as well as reduce network backhaul traffic from the edge cloud 610 toward cloud data center 630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 7:
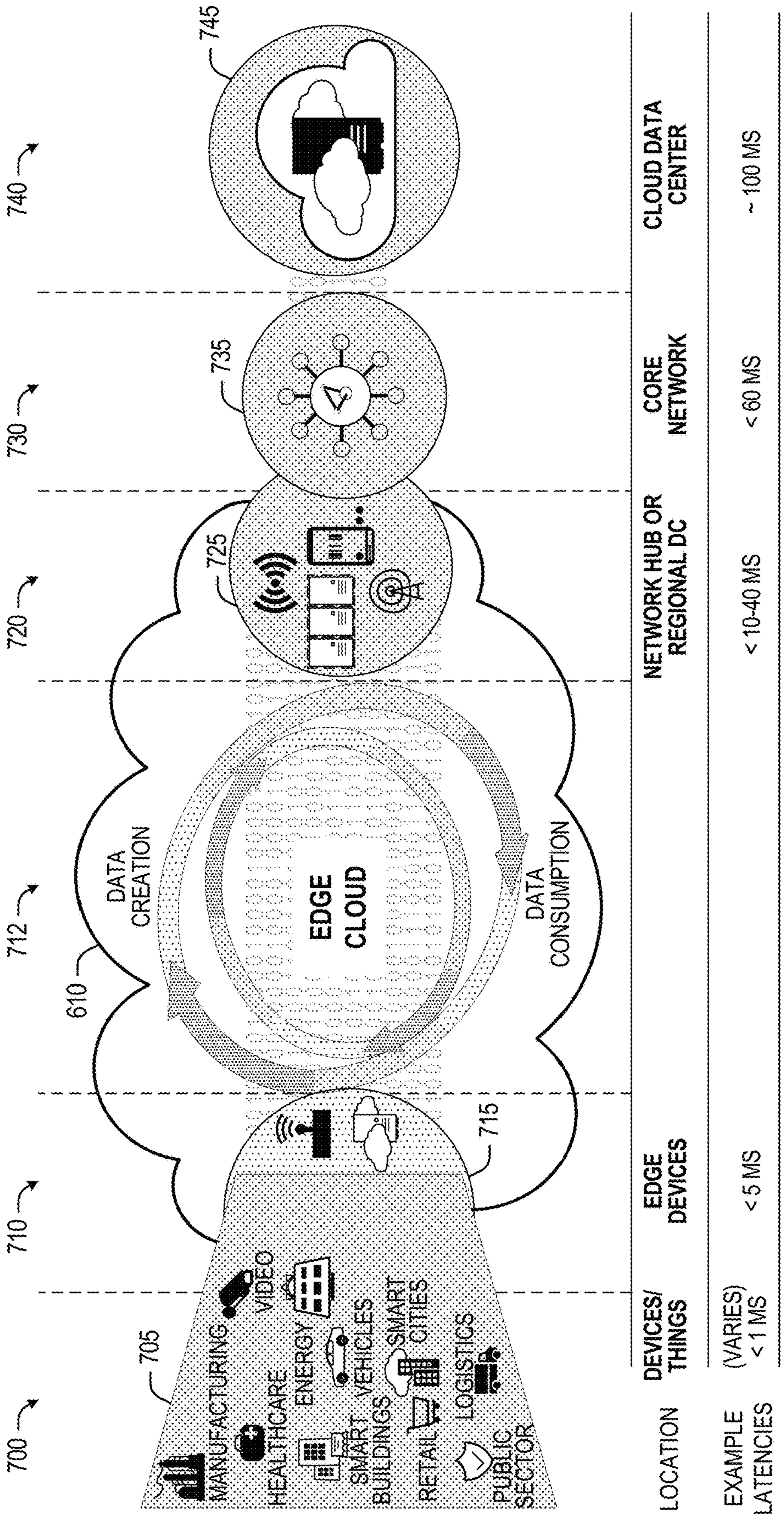
FIG. 7 illustrates operational layers among endpoints, an edge cloud, and cloud computing environments.

FIG. 7 illustrates operational layers among endpoints, an edge cloud, and cloud computing environments. Specifically, FIG. 7 depicts examples of computational use cases 705, utilizing the edge cloud 610 among multiple illustrative layers of network computing. The layers begin at an endpoint (devices and things) layer 700, which accesses the edge cloud 610 to conduct data creation, analysis, and data consumption activities. The edge cloud 610 may span multiple network layers, such as an edge devices layer 710 having gateways, on-premise servers, or network equipment (nodes 715) located in physically proximate edge systems; a network access layer 720, encompassing base stations, radio processing units, network hubs, regional data centers, or local network equipment (equipment 725); and any equipment, devices, or nodes located therebetween (in layer 712, not illustrated in detail). The network communications within the edge cloud 610 and among the various layers may occur via any number of wired or wireless mediums.

Examples of latency, resulting from network communication distance and processing time constraints, may range from less than a millisecond (ms) when among the endpoint layer 700, under 5 ms at the edge devices layer 710, to even between 10 to 40 ms when communicating with nodes at the network access layer 720. Beyond the edge cloud 610 are core network 730 and cloud data center 740 layers, each with increasing latency (e.g., between 50-60 ms at the core network layer 730, to 600 or more ms at the cloud data center layer). As a result, operations at a core network data center 735 or a cloud data center 745, with latencies of at least 50 to 100 ms or more, will not be able to accomplish many time-critical functions of the use cases 705. Each of these latency values are provided for purposes of illustration and contrast; it will be understood that the use of other access network mediums and technologies may further reduce the latencies.

The various use cases 705 may access resources under usage pressure from incoming streams, due to multiple services utilizing the edge cloud. To achieve results with low latency, the services executed within the edge cloud 610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate.

Thus, with these variations and service features in mind, edge computing within the edge cloud 610 may provide the ability to serve and respond to multiple applications of the use cases 705 (e.g., object tracking, video surveillance, connected cars, etc.) in real-time or near real-time, and meet ultra-low latency requirements for these multiple applications. These advantages enable a whole new class of applications (VNFs, Function as a Service (FaaS), standard processes, etc.) which cannot leverage conventional cloud computing due to latency or other limitations.

However, with the advantages of edge computing comes the following caveats. The devices located at the edge are often resource constrained and therefore there is pressure on usage of edge resources. Typically this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 610 in a multi-tenant, multi-owner, or multi-access setting, where services and applications are requested by many users, especially as network usage dynamically fluctuates and the composition of the multiple stakeholders, use cases, and services changes.

Figure 8:
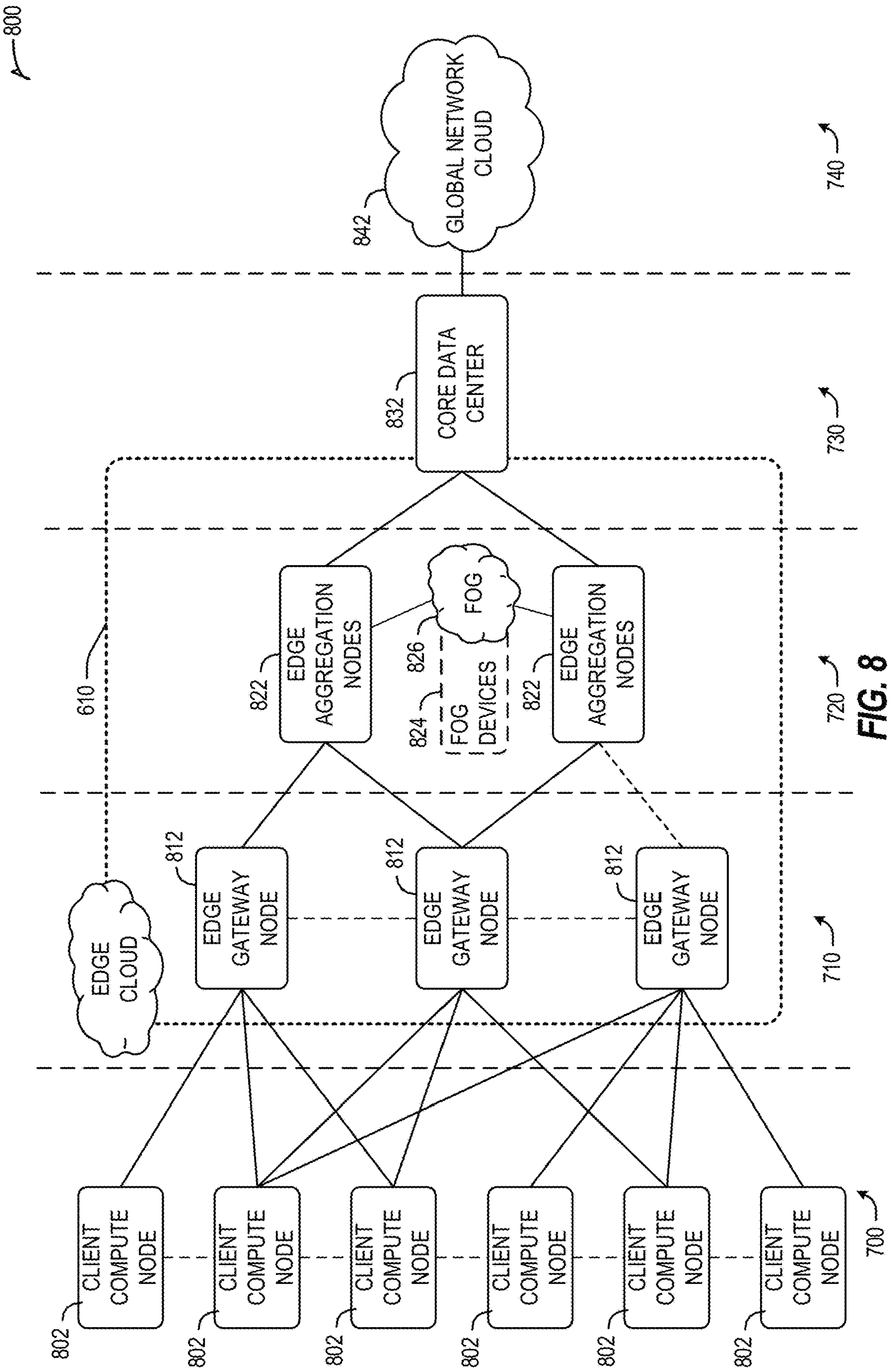
FIG. 8 provides an overview of layers of distributed compute deployed among an edge computing system.

At a more generic level, an edge computing system may be described to encompass any number of deployments at the previously discussed layers operating in the edge cloud 610 (network layers 700-740), which provide coordination from client and distributed computing devices. FIG. 8 provides an abstracted overview of layers of distributed compute deployed among an edge computing environment for purposes of illustration. Various types of network links at the same (e.g., peer-to-peer) or different layers are also depicted.

FIG. 8 generically depicts an edge computing system 800 for providing edge services and applications to multi-stakeholder entities, as distributed among one or more client compute nodes 802, one or more edge gateway nodes 812, one or more edge aggregation nodes 822, one or more core data centers 832, and a global network cloud 842, as distributed across layers of the network. The implementation of the edge computing system 800 may be provided at or on behalf of a telecommunication service provider ("telco", or "TSP"), internet-of-things service provider, cloud service provider (CSP), enterprise entity, or any other number of entities. Various implementations and configurations of the system 800 may be provided dynamically, such as when orchestrated to meet service objectives.

Individual nodes or devices of the edge computing system 800 are located at a particular layer corresponding to layers 700, 710, 720, 730, 740. For example, the client compute nodes 802 are located at an endpoint layer 700, while the edge gateway nodes 812 are located at an edge devices layer 710 (local level) of the edge computing system 800. Additionally, the edge aggregation nodes 822 (and/or fog devices 824, if arranged or operated with or among a fog networking configuration 826) are located at a network access layer 720 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provide a decentralized architecture and serves as an extension to cloud computing by collaborating with one or more edge node devices, providing the subsequent amount of localized control, configuration and management, and much more for end devices. Furthermore, Fog computing provides the ability for edge resources to identify similar resources and collaborate in order to create an edge-local cloud which can be used solely or in conjunction with cloud computing in order to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 832 is located at a core network layer 730 (a regional or geographically-central level), while the global network cloud 842 is located at a cloud data center layer 740 (a national or world-wide layer). The use of "core" is provided as a term for a centralized network location—deeper in the network—which is accessible by multiple edge nodes or components; however, a "core" does not necessarily designate the "center" or the deepest location of the network. Accordingly, the core data center 832 may be located within, at, or near the edge cloud 610. Although an illustrative number of client compute nodes 802, edge gateway nodes 812, edge aggregation nodes 822, edge core data centers 832, global network clouds 842 are shown in FIG. 8, it should be appreciated that the edge computing system 800 may include additional devices or systems at each layer. Devices at any layer can be configured as peer nodes to each other and, accordingly, act in a collaborative manner to meet service objectives. Additionally, as shown in FIG. 8, the number of components of respective layers 700, 710, 720, 730, 740 generally increases at each lower level (e.g., when moving closer to endpoints). As such, one edge gateway node 812 may service multiple client compute nodes 802, and one edge aggregation node 822 may service multiple edge gateway nodes 812.

Consistent with the examples provided herein, a client compute node 802 may be embodied as any type of endpoint component, device, appliance, or other thing capable of communicating as a producer or consumer of data. Further, the label "node" or "device" as used in the edge computing system 800 does not necessarily mean that such node or device operates in a client or slave role; rather, any of the nodes or devices in the edge computing system 800 refer to individual entities, nodes, or subsystems which include discrete or connected hardware or software configurations to facilitate or use the edge cloud 610.

As such, the edge cloud 610 is formed from network components and functional features operated by and within the edge gateway nodes 812 and the edge aggregation nodes 822 of layers 710, 720, respectively. The edge cloud 610 may be embodied as any type of network that provides edge computing and/or storage resources which are proximately located to radio access network (RAN) capable endpoint devices (e.g., mobile computing devices, IoT devices, smart devices, etc.), which are shown in FIG. 8 as the client compute nodes 802. In other words, the edge cloud 610 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 610 may form a portion of or otherwise provide an ingress point into or across a fog networking configuration 826 (e.g., a network of fog devices 824, not shown in detail), which may be embodied as a system-level horizontal and distributed architecture that distributes resources and services to perform a specific function. For instance, a coordinated and distributed network of fog devices 824 may perform computing, storage, control, or networking aspects in the context of an IoT system arrangement. Other networked, aggregated, and distributed functions may exist in the edge cloud 610 between the core data center 832 and the client endpoints (e.g., client compute nodes 802). Some of these are discussed in the following sections in the context of network functions or service virtualization, including the use of virtual edges and virtual services which are orchestrated for multiple stakeholders.

As discussed in more detail below, the edge gateway nodes 812 and the edge aggregation nodes 822 cooperate to provide various edge services and security to the client compute nodes 802. Furthermore, because a client compute node 802 may be stationary or mobile, a respective edge gateway node 812 may cooperate with other edge gateway devices to propagate presently provided edge services, relevant service data, and security as the corresponding client compute node 802 moves about a region. To do so, the edge gateway nodes 812 and/or edge aggregation nodes 822 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 610. In a multi-stakeholder environment, there can be multiple loadable security modules (LSMs) used to provision policies that enforce the stakeholders interests. Enforcement point environments could support multiple LSMs that apply the combination of loaded LSM policies (e.g., where the most constrained effective policy is applied, such as where if any of A, B or C stakeholders restricts access then access is restricted). Within the edge cloud 610, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (to identify what elements are required by the system to conduct a service, how the system responds to service conditions and changes, and the like).

A "service" is a broad term often applied to various contexts, but in general it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during and end of the service.

Figure 9:
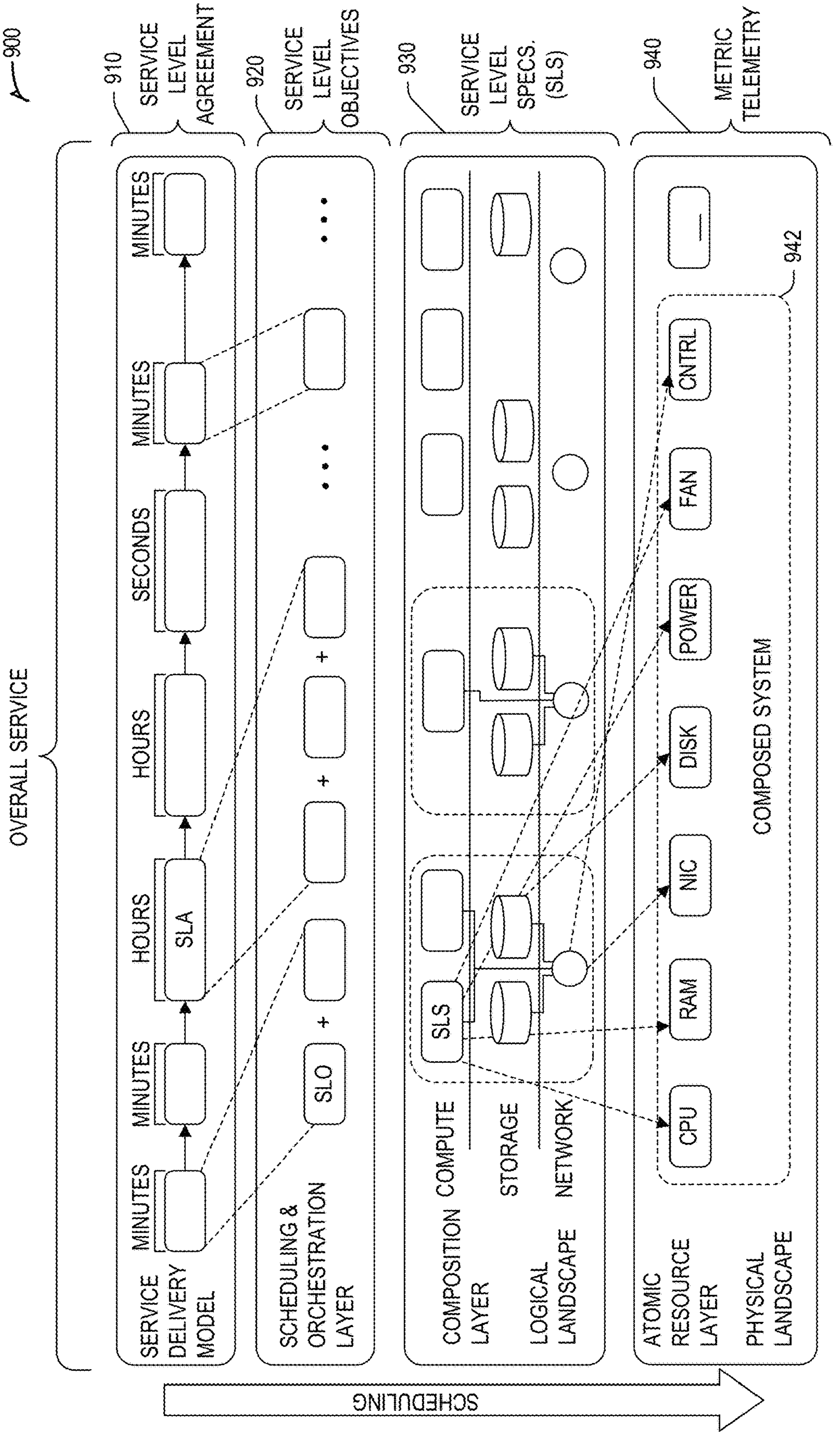
FIG. 9 provides an overview of layers of distributed compute deployed among an edge computing system.

An example relationship among services for use in an edge computing system is depicted in FIG. 9. In scenarios of edge computing, there are several services, and transaction layers in operation and dependent on each other—these services create a "service chain". At the lowest level, ingredients compose systems. These systems (or resources) communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in the hierarchy depicted in FIG. 9 is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement could define "transactional throughput" or "timeliness"—in case of SDSi, the system (or resource) can sign up to guarantee specific service level specifications (SLS 930) and objectives (SLO 920) of a service level agreement (SLA 910). SDSi hardware also provides the ability for the infrastructure and resource owner to empower the silicon component (e.g., components of a composed system 942 that produce metric telemetry 940) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

The higher layer in the services hierarchy, Resource Level Services, includes systems which provide (in complete or through composition) the ability to meet workload demands by either acquiring and enabling system level features via SDSi, or through the composition of individually addressable resources (compute, storage and network).

The higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

The higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

The highest layer of services in the service hierarchy, Business Level Services (BLS), is tied to the capability that is being delivered. At this level, the customer or entity might not care about how the service is composed or what ingredients are used, managed, tracked in order to provide the service(s). The primary objective of business level services is to attain the goals set by the customer according to the overall contract terms and conditions established between the customer and the provider at the agreed to financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead through an agent or middleware capability. Services such as: locate, find, address, trace, track, identify, register may be placed immediately in effect as resources appear on the framework, and the manager or owner of the resource domain can use management rules and policies to ensure orderly resource discovery, registration and certification.

Moreover, any number of the edge computing architectures described herein may be adapted with service management features. These features may enable a system to be constantly aware and record information about the motion, vector and direction of resources as well as fully describe these features as both telemetry and metadata associated with the devices. These service management features can be used for resource management, billing and metering, as well as an element of security. The same functionality also applies to related resources, where a less intelligent device, like a sensor, might attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

Figure 10:
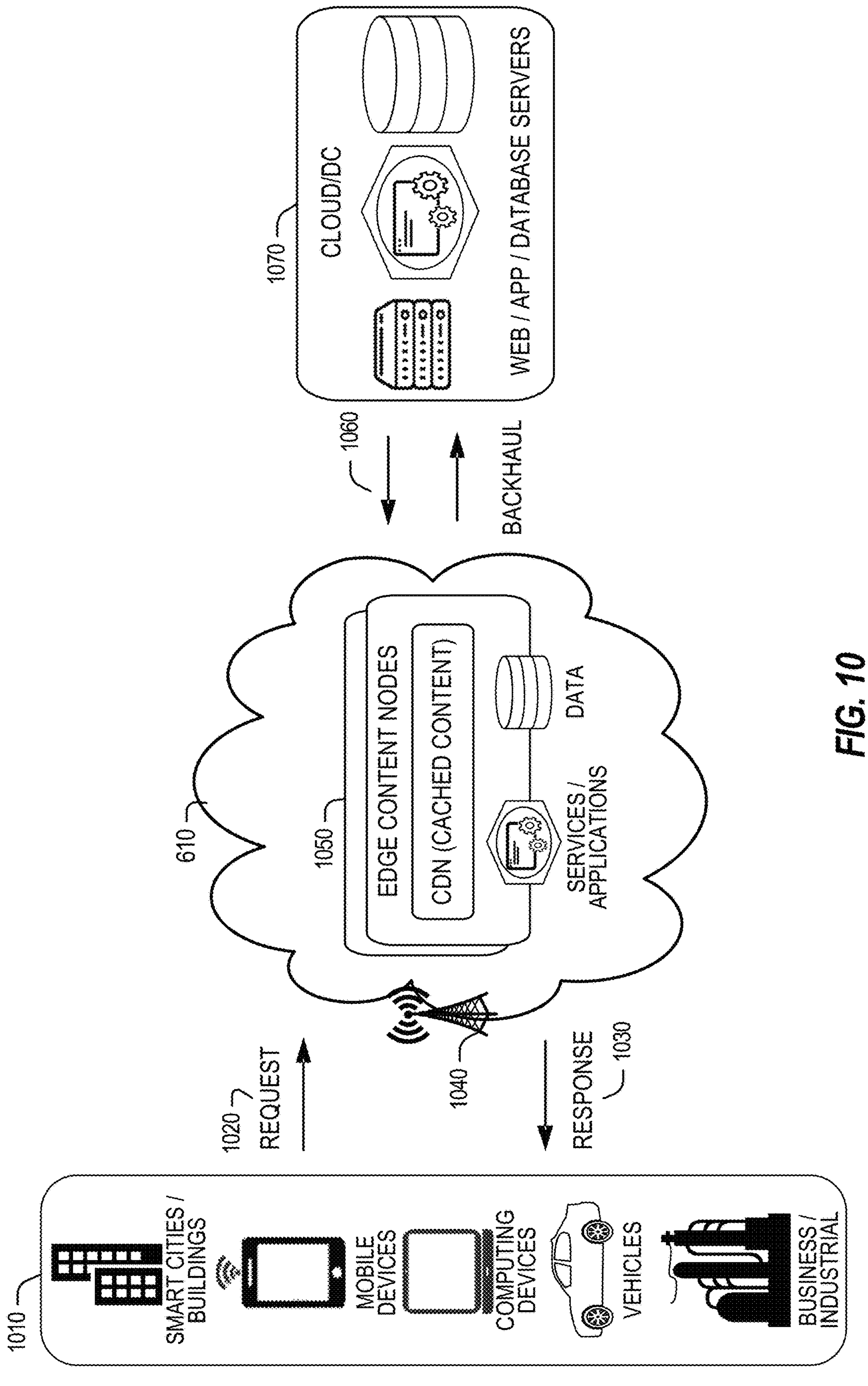
FIGS. 10 and 11 illustrate over-the-top and network-aggregation approaches for networking and services in an edge computing system.
Figure 11:
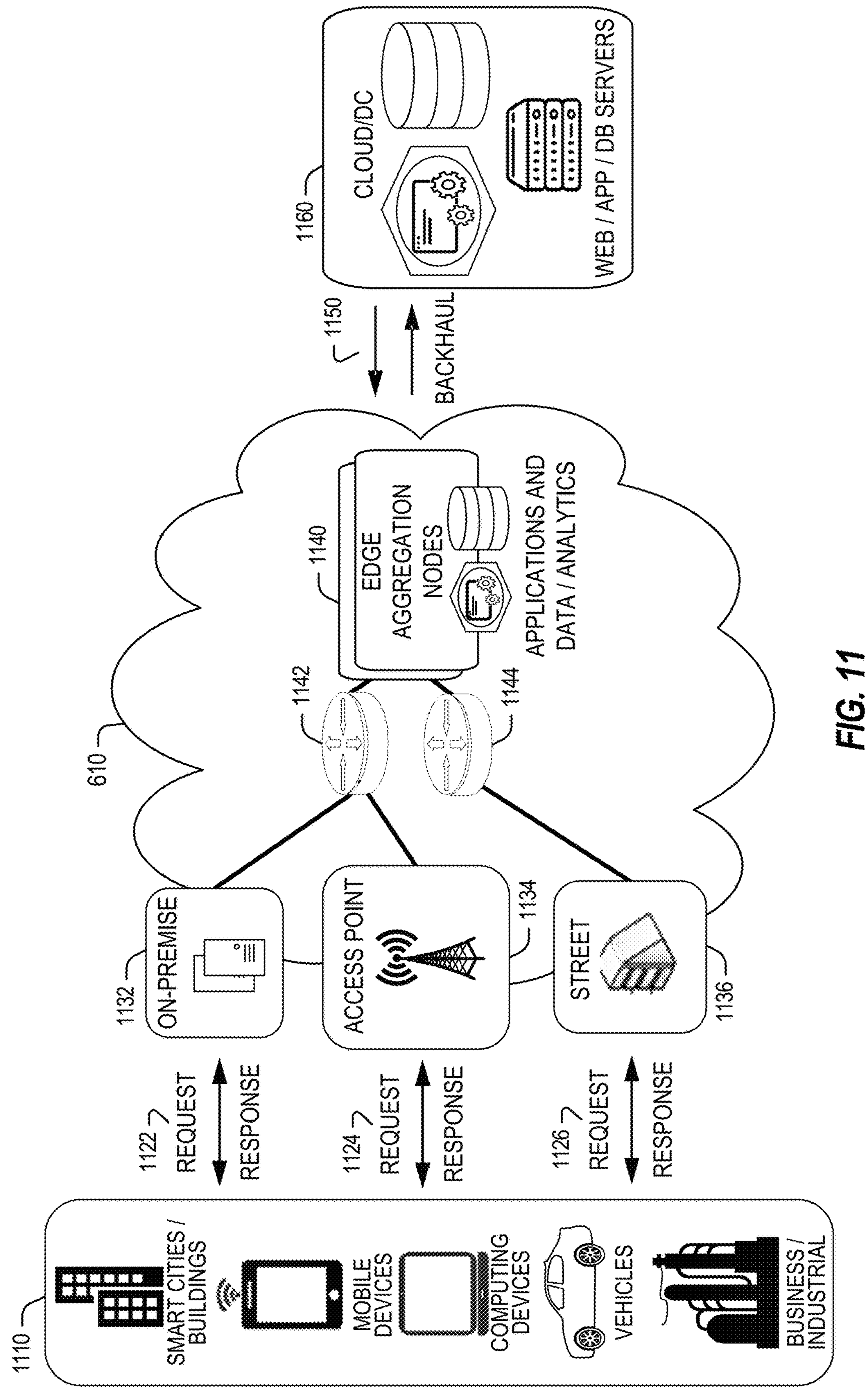

The deployment of a multi-stakeholder edge computing system may be arranged and orchestrated to enable the deployment of multiple services and virtual edge instances, among multiple edge nodes and subsystems, for use by multiple tenants and service providers. In a system example applicable to a cloud service provider (CSP), the deployment of an edge computing system may be provided via an "over-the-top" approach, to introduce edge computing nodes as a supplemental tool to cloud computing. In a contrasting system example applicable to a telecommunications service provider (TSP), the deployment of an edge computing system may be provided via a "network-aggregation" approach, to introduce edge computing nodes at locations in which network accesses (from different types of data access networks) are aggregated. FIGS. 10 and 11 contrast these over-the-top and network-aggregation approaches for networking and services in respective edge computing system. However, these over-the-top and network aggregation approaches may be implemented together in a hybrid or merged approach or configuration as suggested in later examples.

In FIG. 10, various client endpoints 1010 (in the form of mobile devices, computers, autonomous vehicles, business computing equipment, industrial processing equipment) provide requests 1020 for services or data transactions, and receive responses 1030 for the services or data transactions, to and from the edge cloud 610 (e.g., via a wireless or wired network 1040). Within the edge cloud 610, the CSP may deploy various compute and storage resources, such as edge content nodes 1050 to provide cached content from a distributed content delivery network. Other available compute and storage resources available on the edge content nodes 1050 may be used to execute other services and fulfill other workloads. The edge content nodes 1050 and other systems of the edge cloud 610 are connected to a cloud or data center 1070, which uses a backhaul network 1060 to fulfill higher-latency requests from a cloud/data center for websites, applications, database servers, etc.

In FIG. 11, various client endpoints 1110 (in the form of mobile devices, computers, autonomous vehicles, business computing equipment, industrial processing equipment) exchange requests and responses that are specific to the type of endpoint network aggregation. For instance, computers, business computing equipment, and industrial processing equipment may obtain network access via a wired broadband network, by exchanging requests and responses 1122 through an on-premise network system 1132. Mobile computing devices may obtain network access via a wireless broadband network, by exchanging requests and responses 1122 through a cellular network tower 1134. Autonomous vehicles may obtain network access via a wireless vehicular network through a street-located network system 1136. However, regardless of the type of network access, the TSP may deploy aggregation points 1142, 1144 within the edge cloud 610 to aggregate traffic and requests. Thus, within the edge cloud 610, the TSP may deploy various compute and storage resources, such as at edge aggregation nodes 1140, to provide requested content. The edge aggregation nodes 1140 and other systems of the edge cloud 610 are connected to a cloud or data center 1160, which uses a backhaul network 1150 to fulfill higher-latency requests from a cloud/data center for websites, applications, database servers, etc. (Additional or consolidated instances of the edge aggregation nodes 1140 and the aggregation points 1142, 1144, including those deployed on a single server framework, may also be present within the edge cloud 610 or other areas of the TSP infrastructure).

Figure 12:
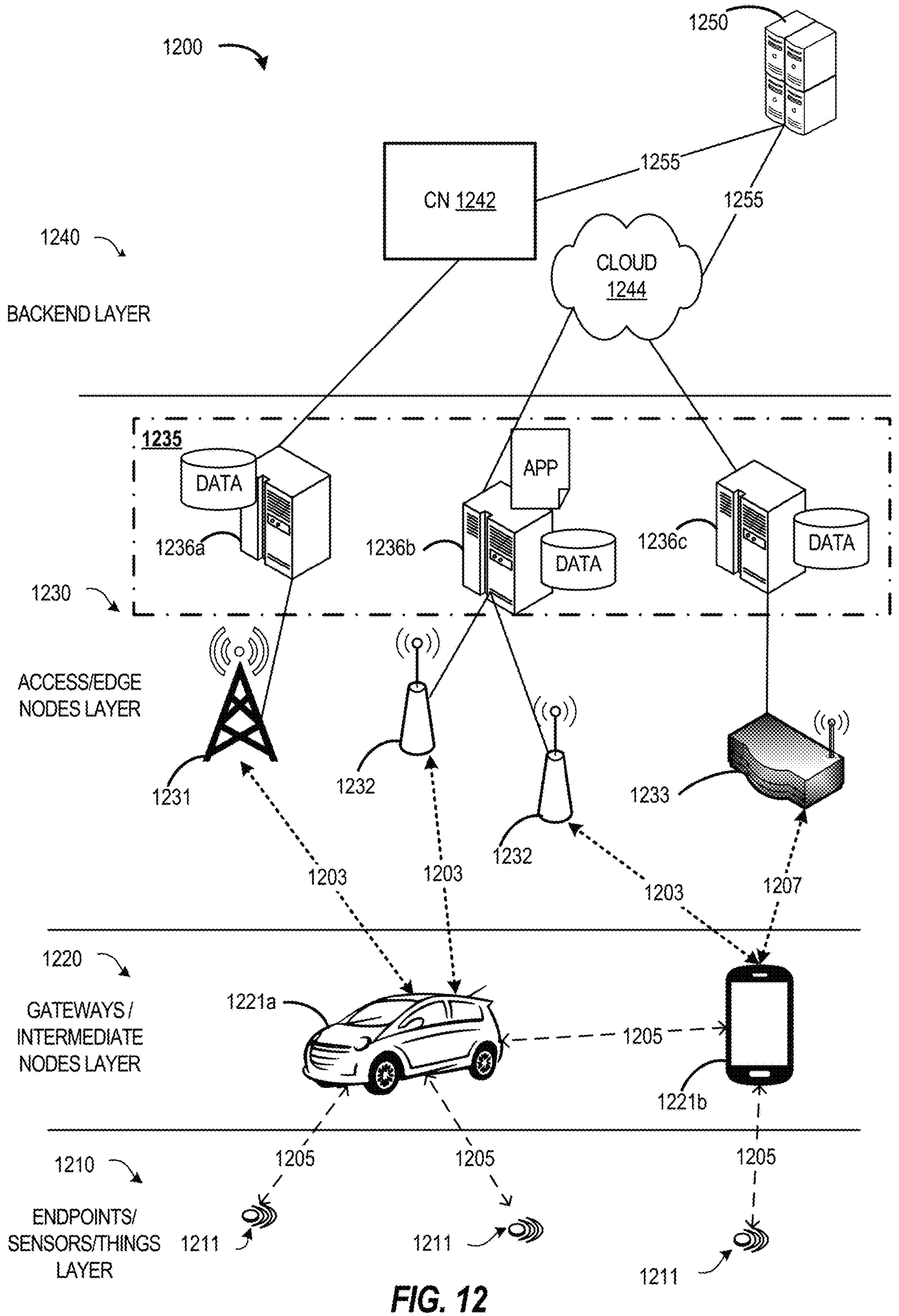
FIG. 12 illustrates an example edge computing environment in accordance with various embodiments.

FIG. 12 illustrates an example edge computing environment 1200 in accordance with various embodiments. FIG. 12 specifically illustrates the different layers of communication occurring within the environment 1200, starting from endpoint sensors or things layer 1210 (e.g., operating in an Internet of Things (IoT) network topology) comprising one or more IoT devices 1211 (also referred to as edge endpoints 1210 or the like); increasing in sophistication to gateways or intermediate node layer 1220 comprising one or more user equipment (UEs) 1221*a* and 1221*b* (also referred to as intermediate nodes 1220 or the like), which facilitate the collection and processing of data from endpoints 1210; increasing in processing and connectivity sophistication to access node layer 1230 (or "edge node layer 1230") comprising a plurality of network access nodes (NANs) 1231, 1232, and 1233 (collectively referred to as "NANs 1231-1233" or the like) and a plurality of edge compute nodes 1236*a-c* (collectively referred to as "edge compute nodes 1236" or the like) within an edge computing system 1235; and increasing in connectivity and processing sophistication to a backend layer 1210 comprising core network (CN) 1242 and cloud 1244. The processing at the backend layer 1210 may be enhanced by network services as performed by a remote application server 1250 and/or other cloud services. Some or all of these elements may be equipped with or otherwise implement some or all aspects of the LPP embodiments discussed infra.

The environment 1200 is shown to include end-user devices, such as intermediate nodes 1220 and endpoints 1210, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1231, 1232, and/or 1233. The NANs 1231-1233 are arranged to provide network connectivity to the end-user devices via respective links 1203, 1207 between the individual NANs and the one or more UEs 1211, 1221.

As examples, the communication networks and/or access technologies may include cellular technology such as LTE, MuLTEfire, and/or NR/5G (e.g., as provided by Radio Access Network (RAN) node 1231 and/or RAN nodes 1232), WiFi or wireless local area network (WLAN) technologies (e.g., as provided by access point (AP) 1233 and/or RAN nodes 1232), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1220 include UE 1221*a* and UE 1221*b* (collectively referred to as "UE 1221" or "UEs 1221"). In this example, the UE 1221*a* is illustrated as a vehicle UE, and UE 1221*b* is illustrated as a smartphone (e.g., handheld touchscreen mobile computing device connectable to one or more cellular networks). However, these UEs 1221 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1210 include UEs 1211, which may be IoT devices (also referred to as "IoT devices 1211"), which are uniquely identifiable embedded computing devices (e.g., within the Internet infrastructure) that comprise a network access layer designed for low-power IoT applications utilizing short-lived UE connections. The IoT devices 1211 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1211 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1211 can utilize technologies such as M2M or MTC for exchanging data with an MTC server (e.g., a server 1250), an edge server 1236 and/or edge computing system 1235, or device via a PLMN, ProSe or D2D communication, sensor networks, or IoT networks. The M2M or MTC exchange of data may be a machine-initiated exchange of data.

The IoT devices 1211 may execute background applications (e.g., keep-alive messages, status updates, etc.) to facilitate the connections of the IoT network. Where the IoT devices 1211 are, or are embedded in, sensor devices, the IoT network may be a WSN. An IoT network describes an interconnecting IoT UEs, such as the IoT devices 1211 being connected to one another over respective direct links 1205. The IoT devices may include any number of different types of devices, grouped in various combinations (referred to as an "IoT group") that may include IoT devices that provide one or more services for a particular user, customer, organizations, etc. A service provider (e.g., an owner/operator of server 1250, CN 1242, and/or cloud 1244) may deploy the IoT devices in the IoT group to a particular area (e.g., a geolocation, building, etc.) in order to provide the one or more services. In some implementations, the IoT network may be a mesh network of IoT devices 1211, which may be termed a fog device, fog system, or fog, operating at the edge of the cloud 1244. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1244 to Things (e.g., IoT devices 1211). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 1230) and/or a central cloud computing service (e.g., cloud 1244) for performing heavy computations or computationally burdensome tasks. On the other hand, edge cloud computing consolidates human-operated, voluntary resources, as a cloud. These voluntary resource may include, inter-alia, intermediate nodes 1220 and/or endpoints 1210, desktop PCs, tablets, smartphones, nano data centers, and the like. In various implementations, resources in the edge cloud may be in one to two-hop proximity to the IoT devices 1211, which may result in reducing overhead related to processing data and may reduce network delay.

In some embodiments, the fog may be a consolidation of IoT devices 1211 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 1244. The fog operating at the edge of the cloud 1244 may overlap or be subsumed into an edge network 1230 of the cloud 1244. The edge network of the cloud 1244 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1236 or edge devices). The Fog layer resides on top of the edge layer and is a consolidation of networking devices such as the intermediate nodes 1220 and/or endpoints 1210 of FIG. 12.

Data may be captured, stored/recorded, and communicated among the IoT devices 1211 or, for example, among the intermediate nodes 1220 and/or endpoints 1210 that have direct links 1205 with one another as shown by FIG. 12. Analysis of the traffic flow and control schemes may be implemented by aggregators that are in communication with the IoT devices 1211 and each other through a mesh network. The aggregators may be a type of IoT device 1211 and/or network appliance. In the example of FIG. 12, the aggregators may be edge nodes 1230, or one or more designated intermediate nodes 1220 and/or endpoints 1210. Data may be uploaded to the cloud 1244 via the aggregator, and commands can be received from the cloud 1244 through gateway devices that are in communication with the IoT devices 1211 and the aggregators through the mesh network. Unlike the traditional cloud computing model, in some implementations, the cloud 1244 may have little or no computational capabilities and only serves as a repository for archiving data recorded and processed by the fog. In these implementations, the cloud 1244 centralized data storage system and provides reliability and access to data by the computing resources in the fog and/or edge devices. Being at the core of the architecture, the Data Store of the cloud 1244 is accessible by both Edge and Fog layers of the aforementioned edge-fog network.

As mentioned previously, the access networks provide network connectivity to the end-user devices 1220, 1210 via respective NANs 1231-1233. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 1231, 1232. This virtualized framework allows the freed-up processor cores of the NANs 1231, 1232 to perform other virtualized applications, such as virtualized applications for LPP embodiments discussed herein.

The UEs 1221, 1211 may utilize respective connections (or channels) 1203, each of which comprises a physical communications interface or layer. The connections 1203 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 1211, 1221 and the NANs 1231-1233 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1211, 1221 and NANs 1231-1233 may operate using LAA, enhanced LAA (eLAA), and/or further eLAA (feLAA) mechanisms. The UEs 1221, 1211 may further directly exchange communication data via respective direct links 1205, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 1211, 1221 are capable of measuring various signals or determining/identifying various signal/channel characteristics. Signal measurement may be performed for cell selection, handover, network attachment, testing, and/or other purposes. The measurements collected by the UEs 1211, 1221 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1231-1233 reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 1231-1233.

The UE 1221*b* is shown to be configured to access an access point (AP) 1233 via a connection 1207. In this example, the AP 1233 is shown to be connected to the Internet without connecting to the CN 1242 of the wireless system. The connection 1207 can comprise a local wireless connection, such as a connection consistent with any IEEE 802.11 protocol, wherein the AP 1233 would comprise a wireless fidelity (WiFi®) router. In embodiments, the UEs 1221 and IoT devices 1211 can be configured to communicate using suitable communication signals with each other or with any of the AP 1233 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1231 and 1232 that enable the connections 1203 may be referred to as "RAN nodes" or the like. The RAN nodes 1231, 1232 may comprise ground stations (e.g., terrestrial access points) or satellite stations providing coverage within a geographic area (e.g., a cell). The RAN nodes 1231, 1232 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1231 is embodied as a NodeB, evolved NodeB (eNB), or a next generation NodeB (gNB), and the RAN nodes 1232 are embodied as relay nodes, distributed units, or Road Side Unites (RSUs). Any other type of NANs can be used.

Any of the RAN nodes 1231, 1232 can terminate the air interface protocol and can be the first point of contact for the UEs 1221 and IoT devices 1211. In some embodiments, any of the RAN nodes 1231/1232 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 1211, 1221 can be configured to communicate using OFDM communication signals with each other or with any of the NANs 1231, 1232 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 1231-1232 organize downlink transmissions (e.g., from any of the RAN nodes 1231, 1232 to the UEs 1211, 1221) and uplink transmissions (e.g., from the UEs 1211, 1221 to RAN nodes 1231, 1232) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1211, 1221 at each transmission time interval (TTI). A TTI is the duration of a transmission on a radio link 1203, 1205, and is related to the size of the data blocks passed to the radio link layer from higher network layers.

The NANs 1231/1232 may be configured to communicate with one another via respective interfaces or links (not shown), such as an X2 interface for LTE implementations (e.g., when CN 1242 is an Evolved Packet Core (EPC)), an Xn interface for 5G or NR implementations (e.g., when CN 1242 is an Fifth Generation Core (5GC)), or the like. The NANs 1231 and 1232 are also communicatively coupled to CN 1242. In embodiments, the CN 1242 may be an evolved packet core (EPC) network, a NextGen Packet Core (NPC) network, a 5G core (5GC), or some other type of CN. The CN 1242 may comprise a plurality of network elements, which are configured to offer various data and telecommunications services to customers/subscribers (e.g., users of UEs 1221 and IoT devices 1211) who are connected to the CN 1242 via a RAN. The components of the CN 1242 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 1242 may be referred to as a network slice, and a logical instantiation of a portion of the CN 1242 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1242 components/functions.

The CN 1242 is shown to be communicatively coupled to an application server 1250 and a network 1250 via an IP communications interface 1255. the one or more server(s) 1250 comprise one or more physical and/or virtualized systems for providing functionality (or services) to one or more clients (e.g., UEs 1221 and IoT devices 1211) over a network. The server(s) 1250 may include various computer devices with rack computing architecture component(s), tower computing architecture component(s), blade computing architecture component(s), and/or the like. The server(s) 1250 may represent a cluster of servers, a server farm, a cloud computing service, or other grouping or pool of servers, which may be located in one or more datacenters. The server(s) 1250 may also be connected to, or otherwise associated with one or more data storage devices (not shown). Moreover, the server(s) 1250 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1250 offer applications or services that use IP/network resources. As examples, the server(s) 1250 may provide traffic management services, cloud analytics, content streaming services, immersive gaming experiences, social networking and/or microblogging services, and/or other like services. In addition, the various services provided by the server(s) 1250 may include initiating and controlling software and/or firmware updates for applications or individual components implemented by the UEs 1221 and IoT devices 1211. The server(s) 1250 can also be configured to support one or more communication services (e.g., Voice-over-Internet Protocol (VoIP) sessions, PTT sessions, group communication sessions, social networking services, etc.) for the UEs 1221 and IoT devices 1211 via the CN 1242.

The cloud 1244 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1244 include application capabilities type, infrastructure capabilities type, and platform capabilities type. A cloud capabilities type is a classification of the functionality provided by a cloud service to a cloud service customer (e.g., a user of cloud 1244), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1244 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; Function as a Service (FaaS) to the applications running in the edge devices (e.g., smartphones or IoT) to accelerate their workloads and applications; Acceleration FaaS (AFaaS) an FaaS implementation where functions are implemented and executed in a hardware accelerator, which may be used to further improve edge FaaS capability; Conflict Analysis as a Service (CAaaS); crypto-services (e.g., TLS-aaS, DTLS-aaS); Edge-as-a-Service (EaaS) Orchestration as a Service (OaaS); and/or other like cloud services including various anything-as-a-service (X-aaS) offerings.

In some embodiments, the cloud 1244 may represent a network such as the Internet, a local area network (LAN) or a wide area network (WAN) including proprietary and/or enterprise networks for a company or organization, or combinations thereof. The cloud 1244 may be a network that comprises computers, network connections among the computers, and software routines to enable communication between the computers over network connections. In this regard, the cloud 1244 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1244 may be via a wired or a wireless connection using the various communication protocols discussed infra. More than one network may be involved in a communication session between the illustrated devices. Connection to the cloud 1244 may require that the computers execute software routines which enable, for example, the seven layers of the OSI model of computer networking or equivalent in a wireless (cellular) phone network. Cloud 1244 may be used to enable relatively long-range communication such as, for example, between the one or more server(s) 1250 and one or more UEs 1221 and IoT devices 1211. In some embodiments, the cloud 1244 may represent the Internet, one or more cellular networks, local area networks, or wide area networks including proprietary and/or enterprise networks, TCP/Internet Protocol (IP)-based network, or combinations thereof. In such embodiments, the cloud 1244 may be associated with network operator who owns or controls equipment and other elements necessary to provide network-related services, such as one or more base stations or access points, one or more servers for routing digital data or telephone calls (e.g., a core network or backbone network), etc. The backbone links 1255 may include any number of wired or wireless technologies, and may be part of a LAN, a WAN, or the Internet. In one example, the backbone links 1255 are fiber backbone links that couple lower levels of service providers to the Internet, such as the CN 1212 and cloud 1244.

In embodiments, the edge compute nodes 1236 may include or be part of an edge system 1235 (or edge network 1235). The edge compute nodes 1236 may also be referred to as "edge hosts 1236" or "edge servers 1236." The edge system 1235 includes a collection of edge servers 1236 (e.g., MEC hosts/servers 1236-1 and 1236-2 of FIG. 13) and edge management systems (not shown by FIG. 12) necessary to run edge computing applications (e.g., MEC Apps 1336 of FIG. 13) within an operator network or a subset of an operator network. The edge servers 1236 are physical computer systems that may include an edge platform (e.g., MEC platform 1337 of FIG. 13) and/or virtualization infrastructure (e.g., VI 1338 of FIG. 13), and provide compute, storage, and network resources to edge computing applications. Each of the edge servers 1236 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1220 and/or endpoints 1210. The VI of the edge servers 1236 provide virtualized environments and virtualized resources for the edge hosts, and the edge computing applications may run as VMs and/or application containers on top of the VI. One example implementation of the edge system 1235 is a MEC system 1235, which is discussed in more detail infra with respect to FIGS. 13-14. It should be understood that the disclosed MEC systems and services deployment examples are only one illustrative example of edge computing systems/networks 1235, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

As shown by FIG. 12, each of the NANs 1231, 1232, and 1233 are co-located with edge compute nodes (or "edge servers") 1236*a*, 1236*b*, and 1236*c*, respectively. These implementations may be small-cell clouds (SCCs) where an edge compute node 1236 is co-located with a small cell (e.g., pico-cell, femto-cell, etc.), or may be mobile micro clouds (MCCs) where an edge compute node 1236 is co-located with a macro-cell (e.g., an eNB, gNB, etc.). The edge compute node 1236 may be deployed in a multitude of arrangements other than as shown by FIG. 12. In a first example, multiple NANs 1231-1233 are co-located or otherwise communicatively coupled with one edge compute node 1236. In a second example, the edge servers 1236 may be co-located or operated by RNCs, which may be the case for legacy network deployments, such as 3G networks. In a third example, the edge servers 1236 may be deployed at cell aggregation sites or at multi-RAT aggregation points that can be located either within an enterprise or used in public coverage areas. In a fourth example, the edge servers 1236 may be deployed at the edge of CN 1242. These implementations may be used in follow-me clouds (FMC), where cloud services running at distributed data centers follow the UEs 1221 as they roam throughout the network.

In any of the aforementioned embodiments and/or implementations, the edge servers 1236 provide a distributed computing environment for application and service hosting, and also provide storage and processing resources so that data and/or content can be processed in close proximity to subscribers (e.g., users of UEs 1221, 1211) for faster response times The edge servers 1236 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1236 from the UEs 1211/1221, CN 1242, cloud 1244, and/or server(s) 1250, or vice versa. For example, a device application or client application operating in a UE 1221/1211 may offload application tasks or workloads to one or more edge servers 1236. In another example, an edge server 1236 may offload application tasks or workloads to one or more UE 1221/1211 (e.g., for distributed ML computation or the like).

Figure 13:
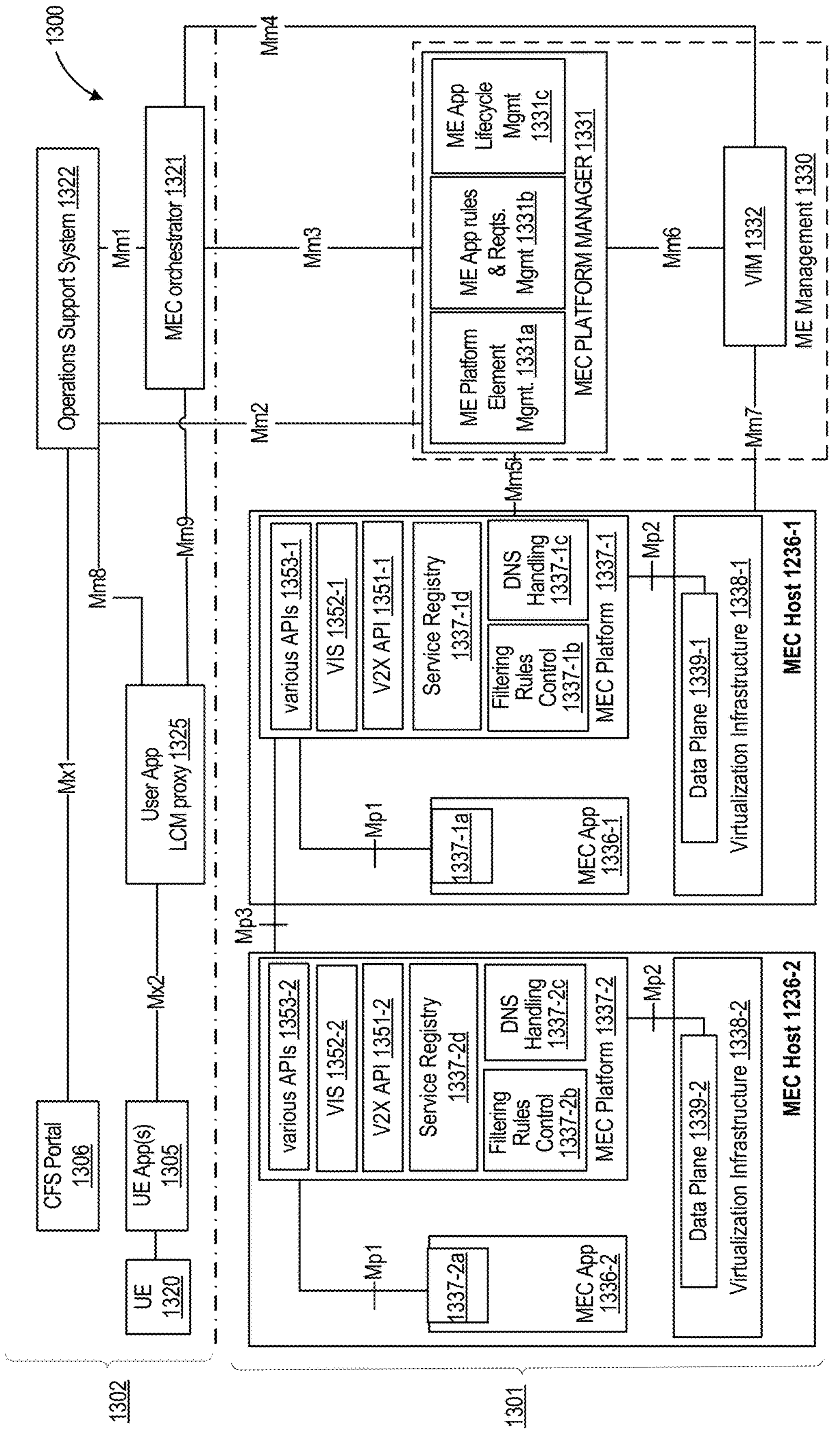
FIG. 13 depicts a block diagram for an example MEC system architecture according to various embodiments.

FIG. 13 depicts a block diagram for an example MEC system architecture 1300 according to various embodiments. The MEC system architecture 1300 may correspond to the edge computing system 1235 of FIG. 12. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP LTE-V2X based protocols) need to exchange data, provide data to aggregation points and access to data in databases which provide an overview of the local situation derived from a multitude of sensors (by various cars, roadside units, etc.).

The illustrated logical connections between various entities of the MEC architecture 1300 may be access-agnostic and not dependent on a particular deployment. MEC enables implementation of MEC applications (MEC Apps) 1336-1 and 1336-2 (collectively referred to as "MEC Apps 1336" or the like) as software-only entities that run on top of a Virtualization Infrastructure (VI) 1338-1 and 1338-2 (collectively referred to as "VI 1338" or the like), which is located in or close to the network edge. A MEC app 1336 is an application that can be instantiated on a MEC host 1236 within the MEC system 1300 and can potentially provide or consume MEC services 1337*a*. The term "user application" in the context of MEC refers to an MEA 1336 that is instantiated in the MEC system 1300 in response to a request from a user (e.g., UE 1221) via a device application. FIG. 13 shows the general entities involved, and these entities can be grouped into multi-access edge system level 1302, multi-access edge host level 1301, and network level entities (not shown). The multi-access edge host level 1301 includes a MEC host 1236-1 and MEC Host 1236-2 (which may be the same or similar to the MEC servers 1236 discussed previously, and re collectively referred to as "MEC host 1236" or the like) and Multi-access Edge (ME) management 1330, which provide functionality to run MEC Apps 1336 within an operator network or a subset of an operator network. The multi-access edge system level 1302 includes multi-access edge system level management 1302, UE 1320 (which may be the same or similar to the intermediate nodes 1220 and/or endpoints 1210 discussed herein), and third party entities. The network level (not shown) includes various external network level entities, such as a 3GPP network (e.g., CN 1242 of FIG. 12), a local area network (e.g., a LAN, WLAN, PAN, etc.), and an external network (e.g., CN 1242 and/or cloud 1244 of FIG. 12). The multi-access edge host level 1301 includes multi-access edge host level management and one or more MEC hosts 1236. The multi-access edge host level management may include various components that handle the management of the multi-access edge specific functionality of a particular MEC platform 1337, MEC host 1236, and the MEC Apps 1336 to be run. The MEC host 1236 includes the MEC platform 1337, MEC Apps 1336, and VI 1338.

The MEC system 1300 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 1300 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 1236 is an entity that contains an MEC platform 1337 and VI 1338 which provides compute, storage, and network resources for the purpose of running MEC Apps 1336. Each of the VIs 1338 includes a respective data plane (DP) 1339 (including DP 1339-1 and 1339-2) that executes respective traffic rules 1337-1*b* and 1337-2*b* (collectively referred to as "traffic rules 1337*b*") received by the MEC platform 1337, and routes the traffic among applications (e.g., MEC Apps 1336), MEC services 1337-1*a* and 1337-2*a* (collectively referred to as "MEC services 1337*a*"), DNS server/proxy (see e.g., via DNS handling entities 1337-1*c* and 1337-2*c*), 3GPP network, local networks, and external networks. The MEC DP 1338*a* may be connected with the (R)AN nodes 1231 and CN 1242 of FIG. 12, and/or may be connected with the AP 1233 of FIG. 12 via a wider network, such as the internet, an enterprise network, or the like. The other entities depicted and/or discussed herein may be the same or similar as those discussed with regard to FIG. 12.

The MEC platforms 1337-1 and 1337-2 (collectively referred to as "MEC platform 1337" or the like) within a MEC host 1236 may be a collection of essential functionality required to run MEC Apps 1336 on a particular VI 1338 and enable them to provide and consume MEC services 1337*a*, and that can provide itself a number of MEC services 937*a*. The MEC platform 1337 can also provide various services and/or functions, such as offering an environment where the MEC Apps 1336 can discover, advertise, consume and offer MEC services 1337*a* (discussed infra), including MEC services 1337*a* available via other platforms when supported. The MEC platform 1337 may be able to allow authorized MEC Apps 1336 to communicate with third party servers located in external networks. The MEC platform 1337 may receive traffic rules from the MEC platform manager 1331, applications, or services, and instruct the data plane accordingly (see e.g., Traffic Rules Control 1337*b*). The MEC platform 1337 may send instructions to the DP 1338 within the VI 1338 via the Mp2 reference point. The Mp2 reference point between the MEC platform 1337 and the DP 1338 of the VI 1338 may be used to instruct the DP 1338 on how to route traffic among applications, networks, services, etc. In some implementations, the MEC platform 1337 may translate tokens representing UEs XP01 in the traffic rules into specific IP addresses. The MEC platform 1337 also receives DNS records from the MEC platform manager 1331 and configures a DNS proxy/server accordingly. The MEC platform 1337 hosts MEC services 1337*a* including the multi-access edge services discussed infra, and provide access to persistent storage and time of day information. Furthermore, the MEC platform 1337 may communicate with other MEC platforms 1337 of other MEC servers 1236 via the Mp3 reference point.

The VI 1338 may represent the totality of all hardware and software components which build up the environment in which MEC Apps 1336 and/or MEC platform 1337 are deployed, managed and executed. The VI 1338 may span across several locations, and the network providing connectivity between these locations is regarded to be part of the VI 1338. The physical hardware resources of the VI 1338 includes computing, storage and network resources that provide processing, storage and connectivity to MEC Apps 1336 and/or MEC platform 1337 through a virtualization layer (e.g., a hypervisor, VM monitor (VMM), or the like). The virtualization layer may abstract and/or logically partition the physical hardware resources of the MEC server 1236 as a hardware abstraction layer. The virtualization layer may also enable the software that implements the MEC Apps 1336 and/or MEC platform 1337 to use the underlying VI 1338, and may provide virtualized resources to the MEC Apps 1336 and/or MEC platform 1337, so that the MEC Apps 1336 and/or MEC platform 1337 can be executed.

The MEC Apps 1336 are applications that can be instantiated on a MEC host/server 1236 within the MEC system 1300 and can potentially provide or consume MEC services 1337*a*. The term "MEC service" refers to a service provided via a MEC platform 1337 either by the MEC platform 937 itself or by a MEC App 1336. MEC Apps 1336 may run as VM on top of the VI 1338 provided by the MEC server 1236, and can interact with the MEC platform 1337 to consume and provide the MEC services 1337*a*. The MEC Apps 1336 are instantiated on the VI 1338 of the MEC server 1236 based on configuration or requests validated by the ME management 1330. In some embodiments, the MEC Apps 1336 can also interact with the MEC platform 1337 to perform certain support procedures related to the lifecycle of the MEC Apps 1336, such as indicating availability, preparing relocation of user state, etc. The MEC Apps 1336 may have a certain number of rules and requirements associated to them, such as required resources, maximum latency, required or useful services, etc. These requirements may be validated by the ME management 1330, and can be assigned to default values if missing. MEC services 1337-1*a* and 1337-2*a* (collectively referred to as "MEC services "437*a*" or the like) are services provided and/or consumed either by the MEC platform 1337 and/or MEC Apps 1336. The service consumers (e.g., MEC Apps 1336 and MEC platform 1337) may communicate with particular MEC services 1337*a* over individual APIs (including MEC V2X API 1351-1, 1351-2 and various APIs 1353-1, 1353-2 in FIG. 13). When provided by an application, a MEC service 1337*a* can be registered in a list of services in the service registries 1337-1*d* and 1337-2*d* (collectively referred to as "service registry 1337*d*" or the like) to a respective the MEC platform 1337 over the Mp1 reference point. Additionally, the MEC Apps 1336 can subscribe to one or more services 1337*a* for which it is authorized over the Mp1 reference point.

The MEC system 1300 may support a feature called UserApps. When the MEC system 1300 supports the feature UserApps, the ME management 1330 may support the instantiation of MEC Apps 1336 (or user applications) on multiple MEC hosts 1236 following a single instantiation request, and when required by the operator in response to a request by the user. The application instance may need to fulfil a number of potential constraints predefined for the application 1305. Once instantiated, connectivity may be established between the UE 1320 and the application instance. Potential constraints may include latency, location, compute resources, storage resources, network capability, security conditions, and the like. As part of the user application (or MEC app 1336) instantiation, the MEC system 1300 will create an associated application context that the MEC system 1300 maintains for the lifetime of the user application (or MEC app 1336). The application context is a set of reference data about an application instance that is used to identify it, enable lifecycle management operations and associate it with its device application, The term "user context" in the context of MEC refers to application-specific runtime data maintained by a MEC app 1336, which is associated with a user of that application. The application context contains information specific to the application instance such as its unique identifier within the MEC system 1300 and the address (e.g., URI or the like) provided for clients (e.g., UE 1320) that are external to the MEC system 1300 to interact with the user application.

When the MEC system 1300 supports the feature UserApps, the system 1300 may, in response to a request by a user, support the establishment of connectivity between the UE 1320 and an instance of a specific MEC App 1336 fulfilling the requirements of the MEC App 1336 regarding the UE 1320. If no instance of the MEC App 1336 fulfilling these requirements is currently running, the multi-access edge system management may create a new instance of the application 1305 on a MEC host 1236 that fulfils the requirements of the application 1305. Once instantiated, connectivity is established between the UE 1320 and the new MEC App 1336 instance. Requirements of the application can include latency, location, compute resources, storage resources, network capability, security conditions, and the like. When the MEC system 1300 supports the UserApps feature, the system 1300 may support the onboarding of MEC Apps 1336 during the execution of an instantiation request, may allow the establishment of connectivity between the UE 1320 and a specific instance of an MEC App 1336, may support the capability to terminate the MEC App 1336 instance when no UE 1320 is connected to it anymore, and may support the termination of the MEC App 1336 running on multiple MEC servers 1236 following a single termination request.

As shown by FIG. 13, the Mp1 reference point is between the MEC platform 1337 and the MEC Apps 1336. The Mp1 reference point may provide service registration 1337*d*, service discovery, and communication support for various services, such as the MEC services 1337-1*a* provided by MEC host 1236-1 and MEC services 1337-2*a* provided by MEC Host 1236-2 (collectively referred to as "MEC services 1337*a*" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 1337*a* include Radio Network Information Service (RNIS), location services, and bandwidth management services. The RNIS, when available, provides authorized MEC Apps 1336 with radio network related information, and expose appropriate up-to-date radio network information to the MEC Apps 1336. The radio network information (RNI) may include, inter alia, radio network conditions, measurement and statistics information related to the user plane, information related to UEs 1320 served by the radio node(s) associated with the MEC host 1236 (e.g., UE context and radio access bearers), changes on information related to UEs 1320 served by the radio node(s) associated with the MEC host 1236, and/or the like. The RNI may be provided at the relevant granularity (e.g., per UE 1320, per cell, per period of time).

The service consumers (e.g., MEC Apps 1336 and MEC platform 1337) may communicate with the RNIS over an RNI API 1353 to obtain contextual information from a corresponding RAN. RNI may be provided to the service consumers via an access node (e.g., (R)AN nodes 1231, 1232, or AP 1233 of FIG. 12). The RNI API 1353 may support both query and subscription (e.g., a pub/sub) based mechanisms that are used over a Representational State Transfer (RESTful) API 1353 or over a message broker of the MEC platform 1337 (not shown by FIG. 13). A MEC App 1336 may query information on a message broker via a transport information query procedure, wherein the transport information may be pre-provisioned to the MEC App 1336 via a suitable configuration mechanism. The various messages communicated via the RNI API 1353 may be in XML, JSON, Protobuf, or some other suitable format.

The RNI may be used by MEC Apps 1336 and MEC platform 1337 to optimize the existing services and to provide new types of services that are based on up to date information on radio conditions. As an example, a MEC App 1336 may use RNI to optimize current services such as video throughput guidance. In throughput guidance, a radio analytics MEC App 1336 may use MEC services to provide a backend video server with a near real-time indication on the throughput estimated to be available at the radio downlink interface in a next time instant. The throughput guidance radio analytics application 1336 computes throughput guidance based on the required radio network information it obtains from a multi-access edge service running on the MEC server 1236. RNI may be also used by the MEC platform 1337 to optimize the mobility procedures required to support service continuity, such as when a certain MEC App 1336 requests a single piece of information using a simple request-response model (e.g., using RESTful mechanisms) while other MEC Apps 1336 subscribe to multiple different notifications regarding information changes (e.g., using a pub/sub mechanism and/or message broker mechanisms).

The location services (LS), when available, may provide authorized MEC Apps 1336 with location-related information, and expose such information to the MEC Apps 1336. With location related information, the MEC platform 1337 or one or more MEC Apps 1336 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1320 currently served by the radio node(s) associated with the MEC server 1236, information about the location of all UEs 1320 currently served by the radio node(s) associated with the MEC server 1236, information about the location of a certain category of UEs 1320 currently served by the radio node(s) associated with the MEC server 1236, a list of UEs 1320 in a particular location, information about the location of all radio nodes currently associated with the MEC server 1236, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 1236, or a subset thereof, according to a desired deployment. In this regard, the OMA Zonal Presence API 1353 provides means for MEC Apps 1336 to retrieve information about a zone, the access points associated to the zones and the users that are connected to the access points. In addition, the OMA Zonal Presence API 1353, allows authorized application to subscribe to a notification mechanism, reporting about user activities within a zone. In various embodiments, a MEC server 1236 may access location information or zonal presence information of individual UEs 1320 using the OMA Zonal Presence API 1353 to identify the relative location or positions of the UEs 1320.

The bandwidth management services (BWMS) provides for the allocation of bandwidth to certain traffic routed to and from MEC Apps 1336, and specify static/dynamic up/down bandwidth resources, including bandwidth size and bandwidth priority. MEC Apps 1336 may use the BWMS to update/receive bandwidth information to/from the MEC platform 1337. In some embodiments, different MEC Apps 1336 running in parallel on the same MEC server 1236 may be allocated specific static, dynamic up/down bandwidth resources, including bandwidth size and bandwidth priority. The BWMS includes a bandwidth management (BWM) API 1353 to allowed registered applications to statically and/or dynamically register for specific bandwidth allocations per session/application. The BWM API 1353 includes HTTP protocol bindings for BWM functionality using RESTful services or some other suitable API mechanism.

Referring back to FIG. 13, multi-access edge management comprises multi-access edge system level management and the multi-access edge host level management 1330. The ME management 1330 comprises the MEC platform manager 1331 and the VI manager (VIM) 1332, and handles the management of MEC-specific functionality of a particular MEC server 1236 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 1331 is responsible for managing the life cycle of applications including informing the multi-access edge orchestrator (MEC O) 1321 of relevant application related events. The MEC platform manager 1331 may also provide MEP element management functions **1331*a* to the MEC platform 1337, manage MEC App rules and requirements 1331*b* including service authorizations, traffic rules, DNS configuration and resolving conflicts, and manage MEC App 1336 lifecycles (MEALC mgmt 1331*c*). The MEC platform manager 1331 may also receive virtualized resources fault reports and performance measurements from the VIM 1332 for further processing. The Mm5 reference point between the MEC platform manager 1331 and the MEC platform 1337 is used to perform platform configuration, configuration of the MEPE mgmt 1331*a*, the MERR mgmt 1331*b*, the MEALC mgmt 1331*c***, management of application relocation, etc.

The VIM 1332 may be an entity that allocates, manages and releases virtualized (compute, storage and networking) resources of the VI 1338, and prepares the VI 1338 to run a software image. To do so, the VIM 1332 may communicate with the VI 1338 over the Mm7 reference point between the VIM 1332 and the VI 1338. Preparing the VI 1338 may include configuring the VI 1338, and receiving/storing the software image. When supported, the VIM 1332 may provide rapid provisioning of applications, such as described in "Openstack++ for Cloudlet Deployments", available at http://reports-archive.adm.cs.cmu.edu/anon/2015/CMU-CS-15-123.pdf. The VIM 1332 may also collect and report performance and fault information about the virtualized resources, and perform application relocation when supported. For application relocation from/to external cloud environments, the VIM 1332 may interact with an external cloud manager to perform the application relocation, for example using the mechanism described in "Adaptive VM Handoff Across Cloudlets", and/or possibly through a proxy. Furthermore, the VIM 1332 may communicate with the MEC platform manager 1331 via the Mm6 reference point, which may be used to manage virtualized resources, for example, to realize the application lifecycle management. Moreover, the VIM 1332 may communicate with the MEC O 1321 via the Mm4 reference point, which may be used to manage virtualized resources of the MEC server 1236, and to manage application images. Managing the virtualized resources may include tracking available resource capacity, etc.

The multi-access edge system level management includes the MEC O 1321 as a core component, which has an overview of the complete MEC system 1300. The MEC-O 1321 may maintain an overall view of the MEC system 1300 based on deployed multi-access edge hosts 901, available resources, available MEC services 1337*a*, and topology. The Mm3 reference point between the MEC-O 1321 and the MEC platform manager 1331 may be used for the management of the application lifecycle, application rules and requirements and keeping track of available MEC services 1337*a*. The MEC-O 1321 may communicate with the user application lifecycle management proxy (UALMP) 1325 via the Mm9 reference point in order to manage MEC Apps 1336 requested by UE application 1305.

The MEC-O 1321 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1302 to handle the applications. The MEC-O 1321 may select appropriate MEC host(s) 901 for application instantiation based on constraints, such as latency, available resources, and available services. The MEC-O 1321 may also trigger application instantiation and termination, as well as trigger application relocation as needed and when supported.

The Operations Support System (OSS) 1322 refers to the OSS of an operator that receives requests via the Customer Facing Service (CFS) portal 1306 (and over the Mx1 reference point) and from UE applications 1305 for instantiation or termination of MEC Apps 1336, and decides on the granting of these requests. The CFS portal 1306 (and the Mx1 interface) may be used by third-parties to request the MEC system 1300 to run applications 1306 in the MEC system 1300. Granted requests may be forwarded to the MEC-O 1321 for further processing. When supported, the OSS 1322 also receives requests from UE applications 1305 for relocating applications between external clouds and the MEC system 1300. The Mm2 reference point between the OSS 1322 and the MEC platform manager 1331 is used for the MEC platform manager 1331 configuration, fault and performance management. The Mm1 reference point between the MEC-O 1321 and the OSS 1322 is used for triggering the instantiation and the termination of multi-access edge applications 1336 in the MEC system 1300.

The UE app(s) 1305 (also referred to as "device applications" or the like) is one or more applications running in a device, computing system, etc. (e.g., UE 1320), that has the capability to interact with the MEC system 900 via the user application lifecycle management proxy 1325. The UE app(s) 1305 may be, include, or interact with one or more client applications, which in the context of MEC, is application software running on a device, computing system, etc. that utilizes functionality provided by one or more specific MEC application(s) 1336. The user application lifecycle management proxy ("user app LCM proxy") 1325 may authorize requests from UE applications 1305 in the UE and interacts with the OSS 1322 and the MEC-O 1321 for further processing of these requests. The term "lifecycle management," in the context of MEC, refers to a set of functions required to manage the instantiation, maintenance and termination of a MEC application 1336 instance. The user app LCM proxy 1325 may interact with the OSS 1322 via the Mm8 reference point, and is used to handle UE applications 1305 requests for running applications in the MEC system 1300. A user application 1305 may be an MEC App 1336 that is instantiated in the MEC system 1300 in response to a request of a user via an application running in the UE 1320 (e.g., UE application 1305). The user app LCM proxy 1325 allows UE applications 1305 to request on-boarding, instantiation, termination of user applications and when supported, relocation of user applications in and out of the MEC system 1300. It also allows informing the UE applications 1305 about the state of the user applications 1305. The user app LCM proxy 1325 is only accessible from within the mobile network, and may only be available when supported by the MEC system 1300. A UE application 1305 may use the Mx2 reference point between the user app LCM proxy 1325 and the UE application 1305 to request the MEC system 1300 to run an application in the MEC system 1300, or to move an application in or out of the MEC system 1300. The Mx2 reference point may only be accessible within the mobile network and may only be available when supported by the multi-access edge system.

In order to run an MEC App 1336 in the MEC system 1300, the MEC-O 1321 receives requests triggered by the OSS 1322, a third-party, or a UE application 1305. In response to receipt of such requests, the MEC-O 1321 selects a MEC server 1236 to host the MEC App 1336 for computational offloading. These requests may include information about the application to be run, and possibly other information, such as the location where the application needs to be active, other application rules and requirements, as well as the location of the application image if it is not yet on-boarded in the MEC system 1300.

In various embodiments, the MEC-O 1321 selects one or more MEC servers 1236 for computational intensive tasks. The selected one or more MEC servers 1236 may offload computational tasks of a UE application 1305 based on various operational parameters, such as network capabilities and conditions, computational capabilities and conditions, application requirements, and/or other like operational parameters. The application requirements may be rules and requirements associated to/with one or more MEC Apps 1336, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 1336 to be able to run; multi-access edge services that the MEC Apps 1336 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 1337*b*; DNS rules 1337*c*; etc.

The MEC-O 1321 considers the requirements and information listed above and information on the resources currently available in the MEC system 1300 to select one or several MEC servers 1236 within the MEC system 901 to host MEC Apps 1336 and/or for computational offloading. After one or more MEC servers 1236 are selected, the MEC-O 1321 requests the selected MEC host(s) 1236 to instantiate the application(s) or application tasks. The actual algorithm used to select the MEC servers 1236 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1321 may decide to select one or more new MEC servers 1236 to act as a master node, and initiates the transfer of an application instance or application-related state information from the one or more source MEC servers 1236 to the one or more target MEC servers 1236.

In addition, the MEC system architecture 1300 also provides support for applications. In the context of FIG. 13, the UE app 1305 is an application instance running on a vehicle or vUE 1320, and requesting V2X service to the system. MEC hosts 1236 are co-located with edge infrastructure (e.g., nodes 1231-133 of FIG. 12) and communicate with each other through the Mp3 interface. The example of FIG. 13 also uses V2X Information Services (VIS) 1352-1 and 1352-1 (collectively referred to as "MEC VIS 1352"). FIG. 13 is an example of application instances in a V2X service with MEC V2X API 1351*a* and 1351*b* (collectively referred to as "MEC V2X API 1351"). In the framework of V2X services, a vehicle UE 1320 is hosting a client application, and is connected to a certain MEC host 1236 (and a related MEC App 1336). In presence of multiple MEC host/server 1236, the VIS 1352 permits to expose information between MEC Apps 1336 running on different MEC hosts 1236. In addition, other remote application server instances can be located somewhere else (e.g., private clouds owned by the operator or by the OEM such as cloud 1244). The VIS 1352 may be produced by the MEC platform 1337 or by the MEC Apps 1336.

In particular, the VIS 1352 permits information exposure, pertinent to the support of automotive use cases, to MEC application instances. VIS 1352 also permits a single V2X/ITS operator to offer a V2X service(s) over a region that may span different countries and involve multiple network operators, MEC systems 1300 and MEC apps 1336 providers. For that purpose, the MEC VIS 1352 includes the following functionalities.

In some aspects, the MEC platform 1337 can include a MEC V2X API 1351 and provide MEC VIS 1352, which can include the following functionalities: (a) gathering of PC5 V2X relevant information from the 3GPP network for purposes of performing UE authorization for V2X communications (e.g., obtaining a list of V2X authorized UEs 1320, obtaining relevant information about the authorization based on the UE subscription, and obtaining V2X configuration parameters such as a common set of V2X configuration parameters which can include PC5 configuration parameters); (b) exposure of the information obtained in (a) to MEC apps 1336 in the same host or MEC apps in other MEC hosts; (c) enablement of MEC apps 1336 to communicate securely with the V2X-related 3GPP core network logical functions (e.g., enabling communication between the MEC host and a V2X control function in the core network); (d) enablement of MEC apps 1336 in different MEC systems 1300 to communicate securely with each other; and (e) gathering and processing information available in other MEC APIs 1353 (e.g., gathering and processing information obtained from a RNI API, Location API, WLAN API, and other APIs that may be implemented within the MEC platform 1337) in order to predict radio network congestion, and provide suitable notifications to the UE 1320.

From that perspective, the VIS 1352 is relevant to Mp1 and Mp3 reference points in the MEC architecture 1300. In particular, the relevant information is exposed to MEC apps 1336 via the Mp1 reference point, and the Mp3 reference point may enable the possibility to transfer this information between different MEC platforms 1337. The MEC V2X API 1351 provides information to MEC apps 1336 in a standardized way, which provides interoperability in multi-vendor scenarios. Nevertheless, MEC apps 1336 may communicate in a direct way (e.g., without the use of MEC platform 1337). Inter-system communication may be realized between MEC Orchestrators 1321. As an alternative, or, in addition to that, possible Mp3 enhancements (or new reference points between MEC systems 1300) may be defined.

In some aspects, the MEC Host 1236-2 in FIG. 13 can also implement a MEC V2X API 1351-2, which can provide an interface to one or more of the apps instantiated within MEC Host 1236-2, such as MEC App 1336-2*b*. In this regard, MEC host 1236-1 and MEC Host 1236-2 can communicate with each other via the Mp3 interface as well as the MEC V2X APIs 1351-1, 1351-2. Additionally, one or more of the MEC apps 1336-1 instantiated within MEC host 1236-1 can communicate with one or more of the MEC apps 1336-2 instantiated within MEC Host 1236-2 via the MEC V2X APIs 1351-1, 1351-2 as well as the Mp3 interface between the MEC host 1236-1 and MEC Host 1236-2.

In some aspects, each of the MEC hosts 1236 can be owned/managed by a different mobile services operator (while it can be operated directly by a MEC vendor or a third party). In some aspects, MEC apps 1336 instantiated on MEC host 1236-1 and MEC Host 1236-2 can be used to provide V2X-related services, and can be operated by the mobile services operator, by a MEC vendor, or by a third party (e.g., OEM, or OEM supplier, or system integrator).

In some aspects, the MEC V2X APIs 1351 can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs 1351 can be configured to gather information and data from sensors. In this regard, the deployment of the MEC V2X APIs 1351 is ensuring continuity of the service across different mobile networks, for the same OEM (e.g., automobile manufacturer). If a standard implementation of a V2X API 1351 is introduced (e.g., by ETSI MEC), this functionality can ensure the same basic V2X service characteristics for all OEMs in a 5G communication system with MEC functionalities.

In some aspects, MEC app 1336*a* and MEC app 1336*b* can use the corresponding MEC V2X APIs 1351 to retrieve information from the 3GPP network. In some aspects, MEC apps 1336 can be configured to host V2X configuration parameters such as PC5 configuration parameters (or a common set of V2X configuration parameters that can be available within a multi—PLMN communication environment). The availability of these V2X configuration parameters also in absence of network coverage is ensured by the usage of an Mp3 interface (or another type of interface) between the hosts. In some aspects, MEC app 1336-1 can be configured to connect to MEC Host 1236-2 (through V2X MEC API 1351-2 in MEC Host 1236-2), and MEC app 1336-2 can be configured to connect to MEC host 1236-1 (through V2X MEC API 1351-1 in MEC host 1236-1). In case of a multi-operator architecture, multiple MEC hosts can be configured to communicate with each other via the MEC V2X APIs 1351 and synchronize in order to transfer the relevant V2X configuration parameters, so that they can be available across the multi-operator architecture in absence of cellular coverage (e.g., outside of the 3GPP domain). In this way, a UE 1320 can have access to V2X configuration parameters even when the UE is not under coverage of its 3GPP network.

In some aspects, one or more ME apps within a MEC host 1236 can be instantiated to perform functionalities of a V2X application function, which may include providing VIS 1352. Additionally, MEC hosts can use MEC V2X APIs 1351 to perform various V2X or VIS 1352 functions. In particular, one or more ME apps can be instantiated within a MEC host to perform functionalities associated with a V2X application function. In some aspects, these ME apps can be configured to perform the following V2X application functions: obtaining V2X subscription information for a vUE 1320, determining whether the vUE 1320 is authorized to perform V2X communications in response to a request for V2X services, communicating V2X configuration parameters such as a common set of V2X configuration parameters, and so forth.

Figure 14:
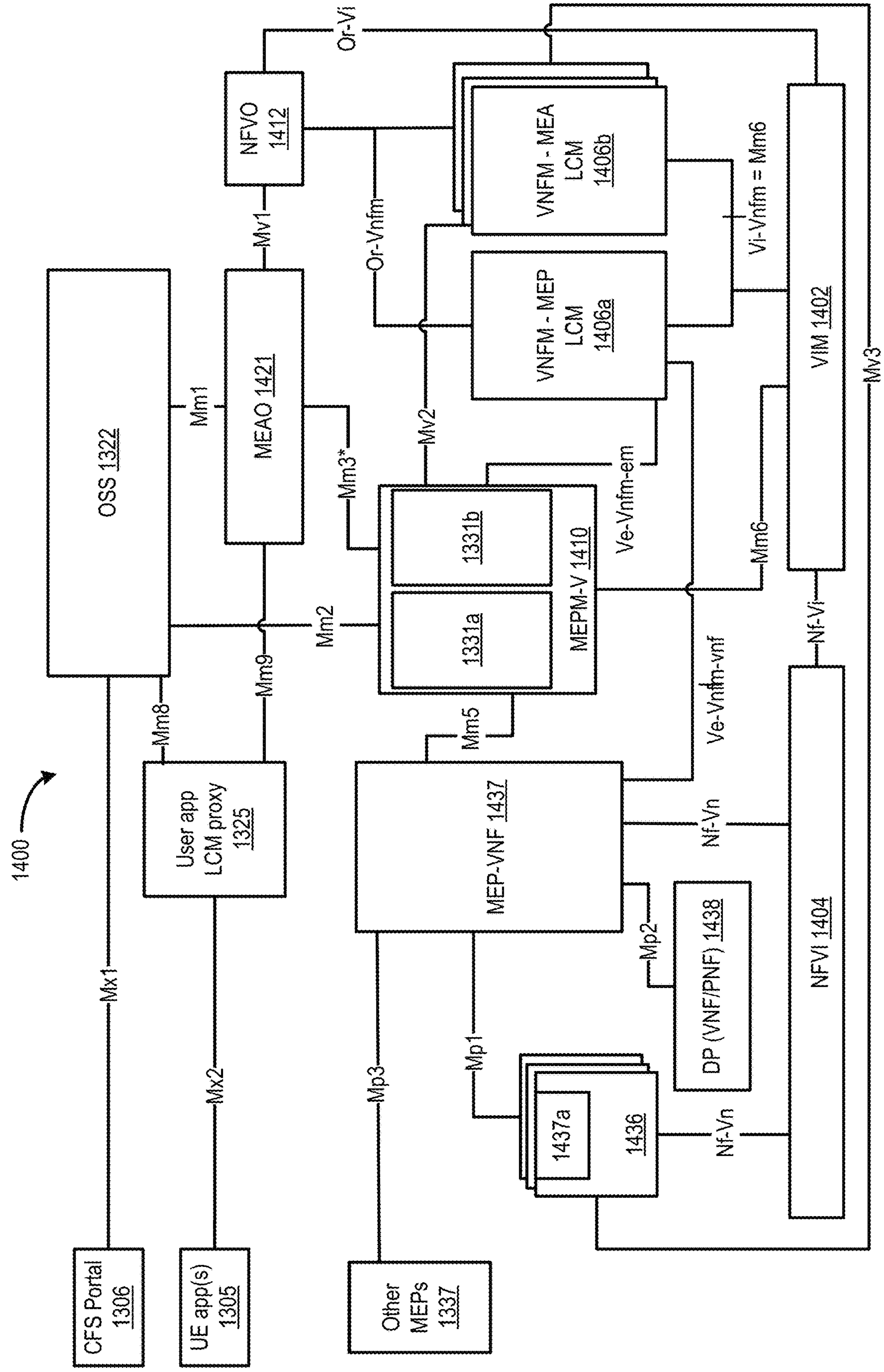
FIG. 14 illustrates an example multi-access edge system architecture in accordance with various embodiments.

FIG. 14 illustrates an example multi-access edge system architecture 1400 in accordance with various embodiments. MEC system 1400 of FIG. 14 is a second embodiment of a system architecture of the MEC system 1300 discussed previously. Like numbered elements in FIG. 14 are the same as discussed previously with respect to FIG. 13. The MEC system 1400 includes architectures and infrastructures that are used to virtualize one or more network functions (NFs) onto physical resources comprising a combination of industry-standard server hardware, storage hardware, or switches, or alternatively comprising proprietary hardware. Typically, mobile network operators virtualize their NFs using Network Functions Virtualization (NFV), and use virtualization infrastructure (VI) to consolidate various network elements, which are referred to as Virtualized Network Functions (VNFs). In other words, NFV can be used to execute virtual or reconfigurable implementations of one or more components/functions of a CN 1242. As mentioned previously, the MEC system 1300 (or individual MEC servers 1236/1301) may include VI to consolidate and virtualize various MEC components and MEC applications on top of the VI. In this regard, the system 1400 is an architecture where MEC elements are deployed in an NFV environment, which may provide maximum utilization of the underlying VI. In particular, the system 1400 is a MEC architecture that is deployed in NFV environments, wherein the MEP 1337 is deployed as a VNF, the MEAs 1336 appear as VNFs towards the NFV MANO components (MEAs 1336 with specific NFV functionality are referred to as an "MEA-VNFs 1436" or the like), and the VI 1338 is deployed as an NFVI 1404 and its virtualized resources are managed by a VIM 1402.

In addition to elements discussed previously with respect to FIG. 13, the system 1400 is illustrated as including a virtualized infrastructure manager (VIM) 1402, a network function virtualization infrastructure (NFVI) 1404, a VNF manager (VNFM) 1406, virtualized network functions (VNFs) including, inter alia, MEP-VNF 1437 and MEA-VNFs 1436, a MEC Edge Platform Manager-NFV (MEPM-V) 1410, and an NFV Orchestrator (NFVO) 1412. In embodiments, the MEP 1337 is realized as a VNF (e.g., MEP-VNF 1437 in FIG. 14) and is managed according to typical NFV procedures. In these embodiments, the MEPM 1331 is transformed into the Multi-access Edge Platform Manager-NFV (MEPM-V) 1410, where the MEPM-V 1410 acts as an Element Manager (EM) of the MEP-VNF 1437. The MEPM-V 1410 delegates Life Cycle Management (LCM) parts/tasks to one or more VNFM(s) 1406, including VNFM-MEP LCM 1406A and VNFM-MEA LCM 1406B. In particular, the VNFM 1406 is used to perform LCM of the MEP-VNF including LCM of the MEP 1337 performed by the VNFM-MEP LCM 1406A and LCM of the MEAs 1336 performed by the VNFM-MEA LCM 1406B.

Additionally, the MEC-O 1321 is transformed into a Multi-access Edge Application Orchestrator" (MEAO) 1421 that uses the NFVO 1412 for resource orchestration, and for orchestration of the set of MEA-VNFs as one or more NFV Network Services (NSs). The MEA-VNFs 1436 are managed like individual VNFs, where certain orchestration and Life Cycle Management (LCM) tasks are delegated to the NFVO 1412 and VNFM 1406*a,b* functional blocks. In some embodiments, the MEP-VNF 1437, the MEPM-V 1410, and VNFM-MEA LCM 1406B may be deployed as a single package or ensemble. In other embodiments, the VNFM-MEP LCM 1406A and VNFM-MEA LCM 1406B are part of a generic VNFM 1406, and the MEP-VNF 1437 and the MEPM-V 1410 are provided by a single vendor.

The VIM 1402 manages the resources of the NFVI 1404. The NFVI 1404 includes physical or virtual resources and applications (including hypervisors) used to execute the system 1400. The VIM 1402 manages the life cycle of virtual resources with the NFVI 1404 (e.g., creation, maintenance, and tear down of virtual machines (VMs) associated with one or more physical resources); tracks VM instances; tracks performance, fault, and security of VM instances and associated physical resources; and exposes VM instances and associated physical resources to other management systems. The NFVO 1412 coordinates, authorizes, releases, and engages resources of the NFVI 1404 in order to provide requested services (e.g., to execute a core network function, component, or slice).

The VNFM 1406 manages VNFs used to execute core network 1242 components/functions. The VNFM 1406 manages the life cycle of the VNFs and tracks performance, fault, and security of the virtual aspects of VNFs. The MEPM-V 1410 tracks the performance, fault and security of the functional aspects of VNFs. The tracking data from the VNFM 1406 and the MEPM-V 1410 may comprise, for example, performance measurement (PM) data used by the VIM 1402 or the NFVI 1404. Both the VNFM 1406 and the MEPM-V 1410 can scale up/down the quantity of VNFs of the system 1400.

The Mm3* reference point between MEAO 1421 and the MEPM-V 1410 is based on the Mm3 reference point discussed previously. The Mm3* reference point in this embodiment may be altered to account for the split between MEPM-V 1410 and VNFM-MEA LCMs 1406B. In addition to the reference points discussed previously with respect to FIG. 13, system 1400 includes the reference points Mv1, Mv2 and Mv3 between elements of the MEC architecture and NFV architectures to support the management of MEA-VNFs 1436 and respective MEC services 1437*a*. The Mv1 reference point connects the MEAO 1421 and the NFVO 1412 and is the same or similar to the Os-Ma-nfvo reference point in NFV architectures. The Mv2 reference point connects the VNFM-MEA LCM 1406B with the MEPM-V 1410 to allow LCM related notifications to be exchanged between these entities. The Mv2 reference point is the same or similar to the Ve-Vnfm-em reference point in NFV architectures. The Mv3 reference point connects the VNFM-MEA LCM 1406B with MEA-VNF 1436 instance(s) to allow the exchange of messages related to, for example, MEA LCM or initial deployment-specific configurations. The Mv3 reference point is the same or similar to the Ve-Vnfm-vnf reference point in NFV architectures.

Furthermore, the following reference points are used as they are defined for NFV architectures: The Nf-Vn reference point that connects each MEA-VNF 1436 with the NFVI 1404; the Nf-Vi reference point that connects the NFVI 1404 and the VIM 1402; the Os-Ma-nfvo reference point that connects the OSS 1322 and the NFVO 1412, which is primarily used to manage NSs (e.g., a number of VNFs connected and orchestrated to deliver a service); the Or-Vnfm reference point that connects the NFVO 1412 and the VNFM 1406*a,b*, which is primarily used for the NFVO 1412 to invoke VNF LCM operations; the Vi-Vnfm reference point that connects the VIM 1402 and the VNFM 1406*a,b*, which is primarily used by the VNFM 1406*a,b* to invoke resource management operations to manage cloud resources that are needed by the VNF 1437 and/or data plane (DP)-VNF 1438 (where Vi-Vnfm reference point corresponds to the Mm6 reference point discussed previously); the Or-Vi reference point that connects the NFVO 1412 and the VIM 1402, which is primarily used by the NFVO 1412 to manage cloud resources capacity; the Ve-Vnfm-em reference point that connects the VNFM 1406*a,b* that manages the lifecycle of the MEP 1337 with the MEPM-V 1410; the Ve-Vnfm-vnf reference point that connects the VNFM 1406*a,b* that manages the lifecycle of the MEP 1337 with the MEP-VNF 1437; the Nf-Vn reference point that connects the MEP-VNF 1437 and the NFVI 1404; the Nf-Vi reference point that connects the NFVI 1404 and the VIM 1402; the Os-Ma-nfvo reference point that connects the OSS 1322 and the NFVO 1412, which is primarily used to manage NSs, for example, a number of VNFs connected and orchestrated to deliver a service; the Or-Vnfm reference point that connects the NFVO 1412 and the VNFM 1406*a,b* that manages the lifecycle of the ME platform, which is primarily used for the NFVO 1412 to invoke VNF LCM operations; the Vi-Vnfm reference point that connects the VIM 1402 and the VNFM 1406*a,b* that manages the lifecycle of the MEP 1337, which is primarily used by the VNFM 1406*a,b* to invoke resource management operations to manage the cloud resources that are needed by the VNF; and the Or-Vi reference point that connects the NFVO 1412 and the VIM 1402. It is primarily used by the NFVO 1412 to manage cloud resources capacity.

When MEC is deployed in a NFV environment, the data plane (DP) 1438 may be implemented as a Physical Network Function (PNF) (e.g., as DP-PNF 1438), a VNF (e.g., as DP-VNF 1438), or combination thereof. When implemented as a DP-PNF 1438, the DP is connected to the NS that contains the MEA-VNFs 1436, and the Mp2 reference point is kept as a MEC-internal reference point also in the NFV-based deployment of MEC. In another embodiment, for performance enhancements, the Service Function Chaining (SFC) functionality provided by the underlying NFVI 1404 may be reused for traffic routing. In such a deployment, the DP 1438 and the Mp2 reference point are omitted from the system 1400. The SFC functionality in the NFVI 1404 is configured by the NFVO 1412 in the VIM 1402 based on the NFP of the NFV NS, using the Or-Vi reference point. In these embodiments, the MEAO 1421 translates the traffic rules into an NFP and sends it to the NFVO 1412. The MEP 1437 may not control the traffic redirection directly via the Mp2 reference point, but instead may pass requests to activate/deactivate/update traffic rules to the MEPM-V 1410, which will then be forwarded to the MEAO 1421. When receiving such a request, the MEAO 1421 may request the NFVO 1412 to update the NFP accordingly. Furthermore, although not shown by FIG. 14, the system 1400 may also include a network manager (NM). The NM may provide a package of end-user functions with the responsibility for the management of a network, which may include network elements with VNFs, non-virtualized network functions, or both (e.g., management of the VNFs may occur via the MEPM-V 1410).

In some aspects, one or more ME apps 1336 within MEC host 1301 or ME apps 1436 in MEC system 1400 can be instantiated to perform functionalities of a V2X application function. Additionally, MEC hosts 1301 can use MEC V2X APIs to perform various V2X functions. In particular, one or more MEA 1336/1436 can be instantiated within MEC host 1301 or MEC system 1400 to perform functionalities associated with a V2X application function. In some aspects, these MEAs 1336/1436 can be configured to perform the following V2X application functions: obtaining V2X subscription information for a vUE 1221*a*, determining whether the vUE 1221*a* is authorized to perform V2X communications in response to a request for V2X services, communicating V2X configuration parameters such as a common set of V2X configuration parameters, and so forth.

In some aspects, the MEP 1337 and/or MEP-VNF 1437 can include a MEC V2X API, which can be used to perform the following functionalities: (a) gathering of V2X relevant information from the 3GPP network for purposes of performing UE authorization for V2X communications (e.g., obtaining a list of V2X authorized UEs, obtaining relevant information about the authorization based on the UE subscription, and obtaining V2X configuration parameters such as a common set of V2X configuration parameters which can include PC5 configuration parameters); (b) exposure of the information obtained in (a) to MEC apps in the same host or MEC apps in other MEC hosts; (c) enablement of MEC apps to communicate securely with the V2X-related 3GPP core network logical functions (e.g., enabling communication between the MEC host and a V2X control function in the core network); (d) enablement of MEC apps in different MEC systems to communicate securely with each other; and (e) gathering and processing information available in other MEC APIs (e.g., gathering and processing information obtained from a RNI API, Location API, WLAN API, and other APIs that may be implemented within the MEP 1337 and/or MEP-VNF 1437) in order to predict radio network congestion, and provide suitable notifications to the UE.

In some aspects, a second MEC host 1301 can also implement a MEC V2X API which can provide an interface to one or more of the apps instantiated within MEC host 1301, such as MEC app 1336. In this regard, hosts 1301 can communicate with each other via the MP3 interface as well as the MEC V2X APIs. Additionally, one or more of the apps instantiated within host 1301 can communicate with one or more of the apps instantiated within host 1301 via the MEC V2X APIs as well as the interface between the hosts 1301.

In some aspects, each of the MEC hosts 1301 can be owned/managed by a different mobile services operator (while it can be operated directly by a MEC vendor or a third party). In some aspects, MEC applications instantiated on hosts 1002 and 1004 can be used to provide V2X-related services, and can be operated by the mobile services operator, by a MEC vendor, or by a third party (e.g. OEM, or OEM supplier, or system integrator).

In some aspects, the MEC V2X APIs can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs can be configured to gather information and data from sensors. In this regard, the deployment of the MEC V2X APIs is ensuring continuity of the service across different mobile networks, for the same OEM (e.g., automobile manufacturer). If a standard implementation of a V2X API is introduced (e.g. by ETSI MEC), this functionality can ensure the same basic V2X service characteristics for all OEMs in a 5G communication system with MEC functionalities.

In some aspects, MEC apps 1336 and 1436 can use the corresponding MEC V2X APIs to retrieve information from the 3GPP network. In some aspects, MEC apps 1336 and 1436 can be configured to host V2X configuration parameters such as PC5 configuration parameters (or a common set of V2X configuration parameters that can be available within a multi-PLMN communication environment). The availability of these V2X configuration parameters also in absence of network coverage is ensured by the usage of an Mp3 interface (or another type of interface) between the hosts. In some aspects, MEC app 1336/1436 can be configured to connect to MEC host 1301 (through V2X MEC API 1802 in MEC host 1301), and MEC app 1336/1436 can be configured to connect to MEC Host 1301 (through V2X MEC API in MEC host 1301). In case of a multi-operator architecture, multiple MEC hosts can be configured to communicate with each other via the MEC V2X APIs and synchronize in order to transfer the relevant V2X configuration parameters, so that they can be available across the multi-operator architecture in absence of cellular coverage (e.g., outside of the 3GPP domain). In this way, a UE 1221*a* can have access to V2X configuration parameters even when the UE is not under coverage of its 3GPP network.

Figure 15:
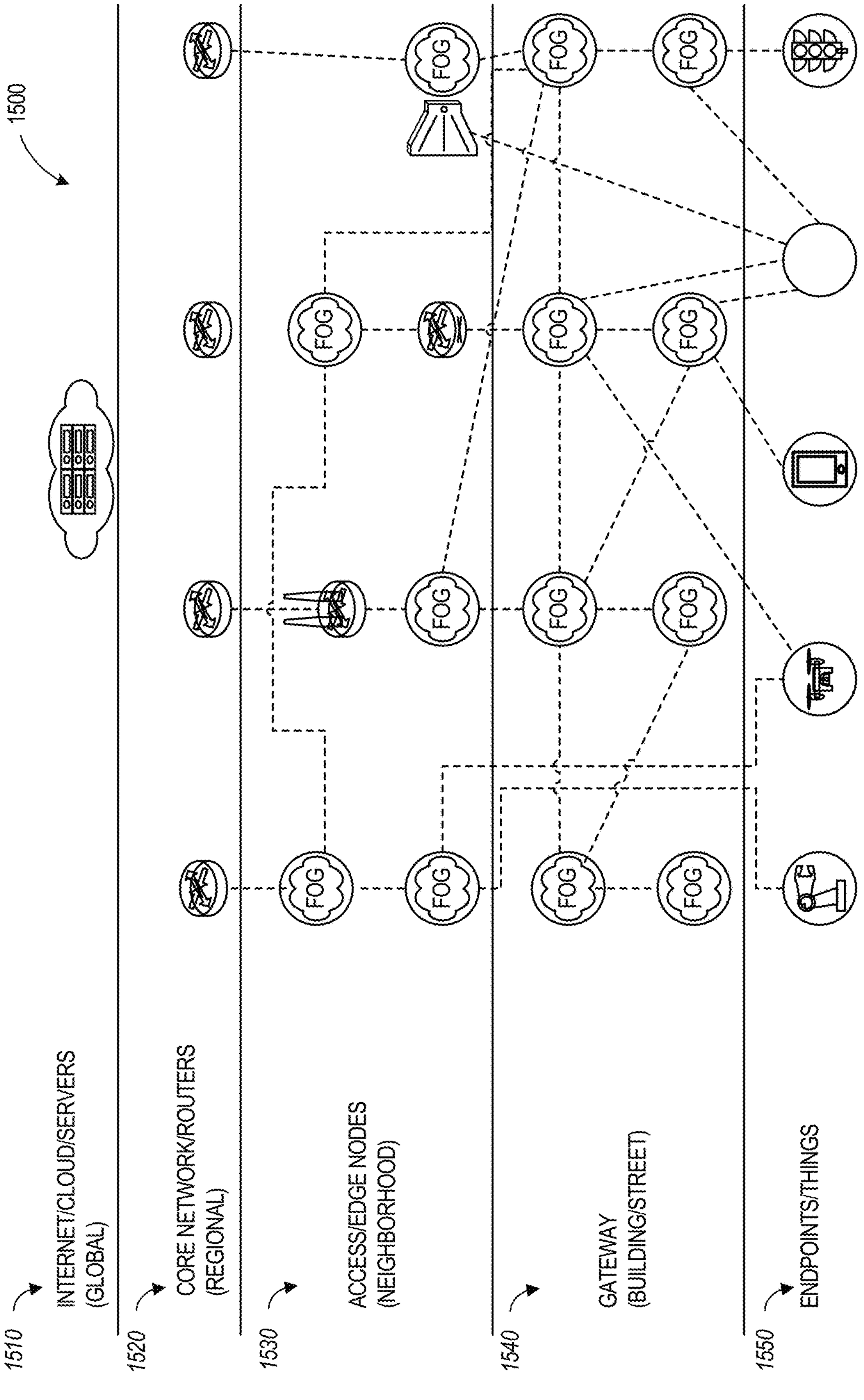
FIG. 15 illustrates an example MEC and FOG network topology.

FIG. 15 illustrates a MEC and FOG network topology 1500, according to an example. Referring to FIG. 15, the network topology 1500 can include a number of conventional networking layers, which may be extended through use of, and/or used to implement, the various embodiments discussed herein. Specifically, the relationships between endpoints (at endpoints/things network layer 1550), gateways (at gateway layer 1540), access or edge computing nodes (e.g., at neighborhood nodes layer 1530), CN or routers (e.g., at regional or central office layer 1520), may be represented through the use of data communicated via MEC functionality and/or applications located at various nodes within the topology 1500.

A FOG network (e.g., established at gateway layer 1540) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 15 illustrates a general architecture that integrates a number of MEC and FOG nodes—categorized in different layers (based on their position, connectivity and processing capabilities, etc.), with each node implementing functionality that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated to a MEC host in the system. The nodes may be migrated, associated to different MEC hosts, or consume MEC services from other (e.g., local or remote) MEC platforms.

Figure 16:
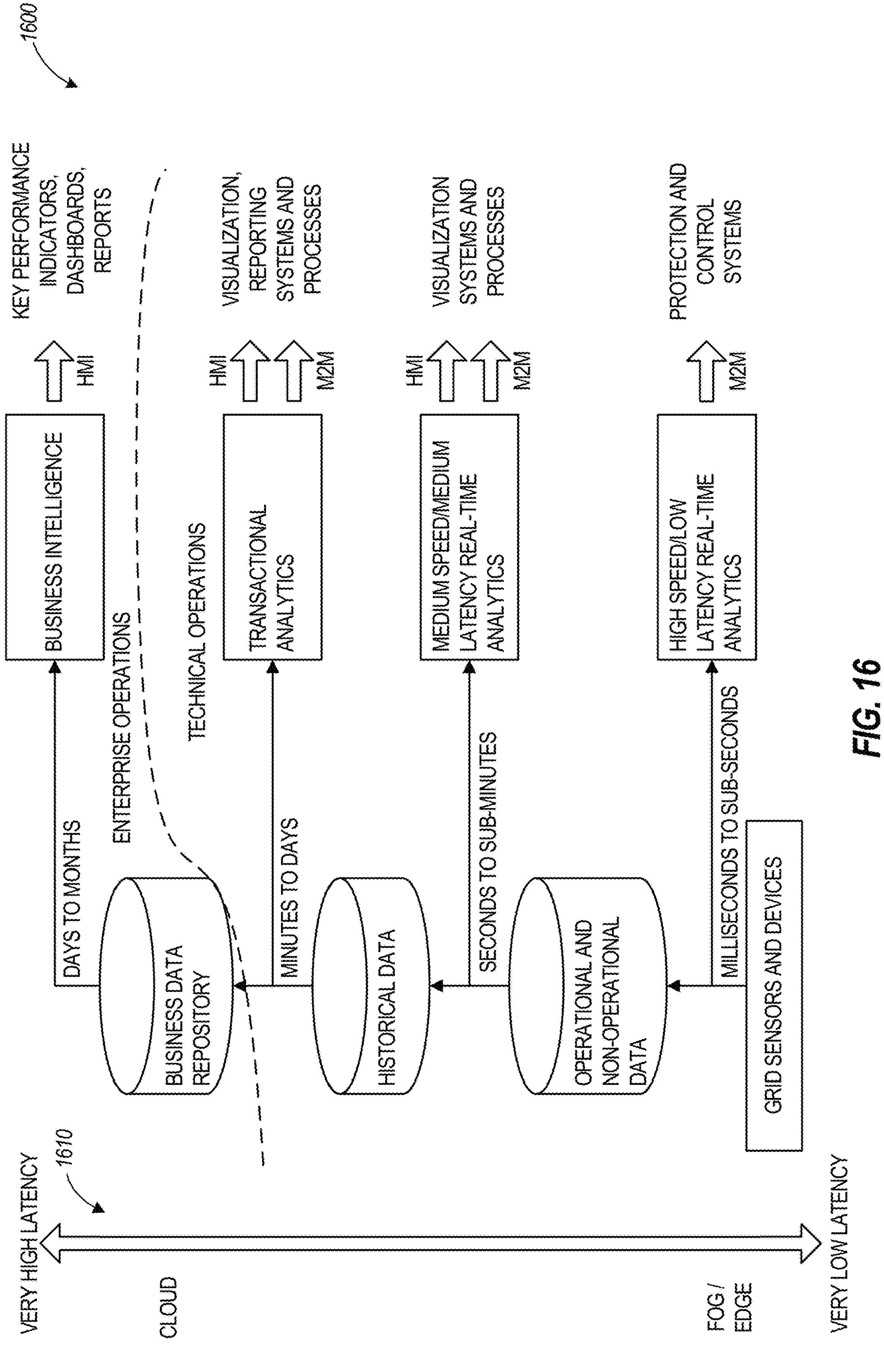
FIG. 16 illustrates another example MEC and FOG network topology.

FIG. 16 illustrates an example MEC and FOG network topology, according to an example embodiment. This network topology 1600 in FIG. 16, which includes a number of conventional networking layers, may be extended through use of the tags and objects discussed herein. Specifically, the relationships between endpoints (at endpoints/things network layer 1550 of FIG. 15), gateways (at gateway layer 1540 of FIG. 15), access or edge computing nodes (e.g., at neighborhood nodes layer 1530 of FIG. 15), core network or routers (e.g., at regional or central office layer 1520 of FIG. 15), may be represented through the use of linked objects and tag properties.

A FOG network (e.g., established at gateway layer 1524 of FIG. 15) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 16 illustrates a general architecture that integrates a number of MEC and FOG nodes—categorized in different layers (based on their position, connectivity and processing capabilities, etc.). It should be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC Host 1301, or a simple entity hosting a ME app 1336/1436 and a light-weighted ME Platform 1337/1437. In an example, a MEC or FOG node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional V2V/V2X applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in a vehicular communications context, a hierarchical structure of data processing and storage nodes are defined. For example, including local ultra-low-latency processing, regional storage and processing as well as remote cloud data-center based storage and processing. Service level agreements (SLAB) and key performance indicators (KPIs) may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Example Computing Systems, Platforms, and Devices

Figure 17:
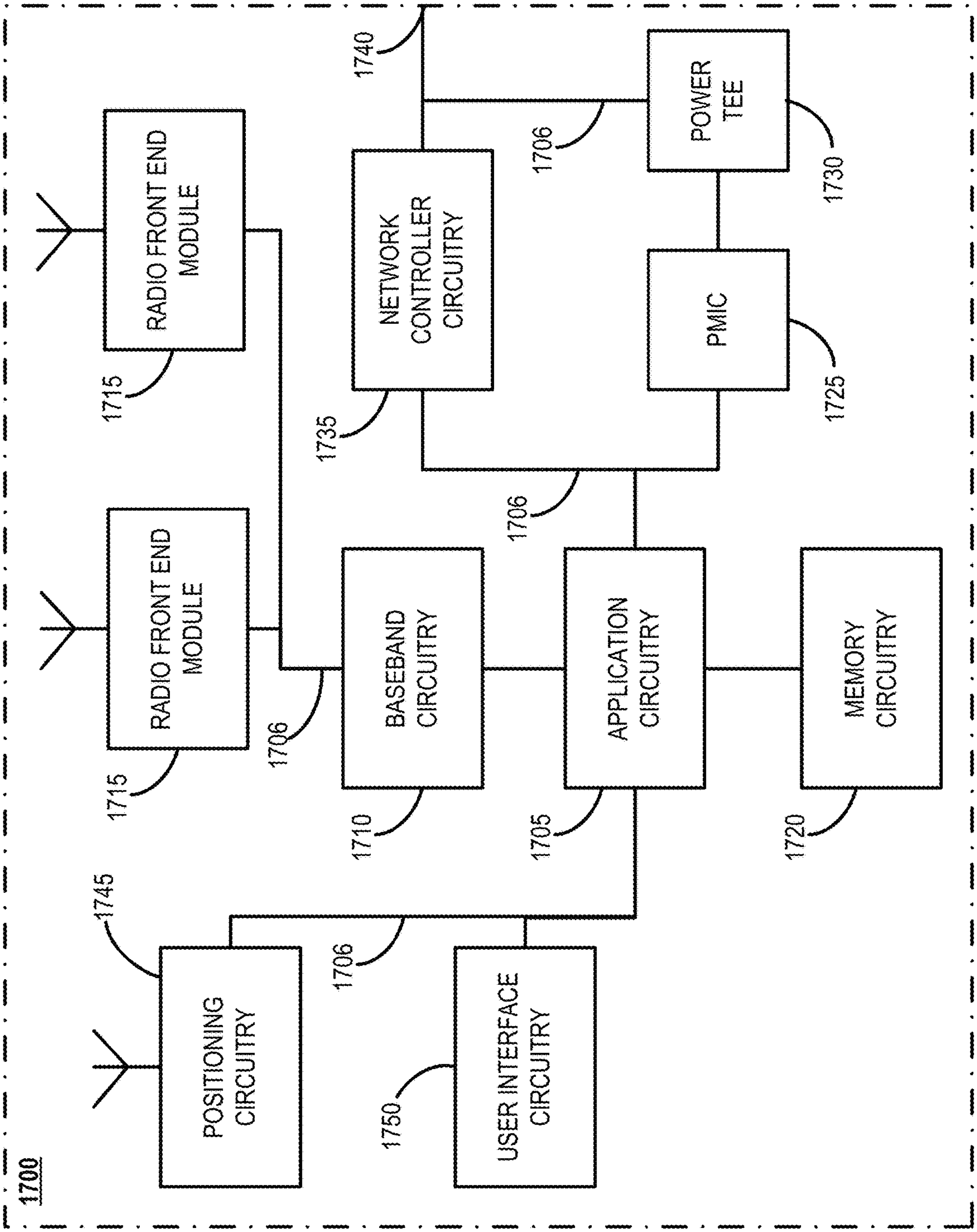
FIG. 17 illustrates an example of infrastructure equipment in accordance with various embodiments.

FIG. 17 illustrates an example of infrastructure equipment 1700 in accordance with various embodiments. The infrastructure equipment 1700 (or "system 1700") may be implemented as a base station, radio head, access network node (e.g., the edge nodes 1230 shown and described previously), MEC servers 1236, server(s) 1250, and/or any other element/device discussed herein. In other examples, the system 1700 could be implemented in or by an intermediate node 1220 or endpoint 1210.

The system 1700 includes application circuitry 1705, baseband circuitry 1710, one or more RFEMs 1715, memory circuitry 1720, PMIC 1725, power tee circuitry 1730, network controller circuitry 1735, network interface connector 1740, positioning circuitry 1745, and user interface 1750. In some embodiments, the device 1700 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 1705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 1705 may be coupled with or may include memory/storage elements and may be configured to execute instructions stored in the memory/storage to enable various applications or operating systems to run on the system 1700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1705 may include, for example, one or more processor cores, CPUs, application processors, GPUs, RISC processors, one or more Acorn RISC Machine (ARM) processors, CISC processors, one or more DSPs, one or more FPGAs, one or more PLDs, one or more ASICs, one or more microprocessors or controllers, or any suitable combination thereof. In some embodiments, the application circuitry 1705 may comprise, or may be, a special-purpose processor/controller to operate according to the various embodiments herein. As examples, the processor(s) of application circuitry 1705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1700 may not utilize application circuitry 1705, and instead may include a special-purpose processor/controller to process IP data received from an EPC or 5GC, for example.

In some implementations, the application circuitry 1705 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices PLDs such as CPLDs, HCPLDs, and the like; ASICs such as structured ASICs and the like; programmable SoCs; and/or the like. In such implementations, the circuitry of application circuitry 1705 may comprise logic blocks or logic fabric, and other interconnected resources that may be programmed to perform various functions, such as the procedures, methods, functions, etc. of the various embodiments discussed herein. In such embodiments, the circuitry of application circuitry 1705 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

In some implementations, such as implementations where subsystems of the edge nodes 1230, intermediate nodes 1220, and/or endpoints 1210 of FIG. 12 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1705 may be specifically tailored for operating the agents and/or for machine learning functionality, such as a cluster of AI GPUs, tensor processing units (TPUs) developed by Google® Inc., a Real AI Processors (RAPs™) provided by AlphalCs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1710 may be implemented, for example, as a solder-down substrate including one or more integrated circuits, a single packaged integrated circuit soldered to a main circuit board or a multi-chip module containing two or more integrated circuits. The baseband circuitry 1710 includes one or more processing devices (e.g., baseband processors) to carry out various protocol and radio control functions. Baseband circuitry 1710 may interface with application circuitry of system 1700 for generation and processing of baseband signals and for controlling operations of the RFEMs 1715. The baseband circuitry 1710 may handle various radio control functions that enable communication with one or more radio networks via the RFEMs 1715. The baseband circuitry 1710 may include circuitry such as, but not limited to, one or more single-core or multi-core processors (e.g., one or more baseband processors) or control logic to process baseband signals received from a receive signal path of the RFEMs 1715, and to generate baseband signals to be provided to the RFEMs 1715 via a transmit signal path. In various embodiments, the baseband circuitry 1710 may implement a RTOS to manage resources of the baseband circuitry 1710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 17, in one embodiment, the baseband circuitry 1710 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1715 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1715 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1710 and/or RFEMs 1715. The baseband circuitry 1710 may also support radio communications for more than one wireless protocol.

Continuing with the aforementioned embodiment, the baseband circuitry 1710 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include FFT, precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1750 may include one or more user interfaces designed to enable user interaction with the system 1700 or peripheral component interfaces designed to enable peripheral component interaction with the system 1700. User interfaces may include, but are not limited to, one or more physical or virtual buttons (e.g., a reset button), one or more indicators (e.g., LEDs), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 1715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1715, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1710 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1720 may include one or more of volatile memory including DRAM and/or SDRAM, and nonvolatile memory including high-speed electrically erasable memory (commonly referred to as Flash memory), PRAM, MRAM, etc., and may incorporate the 3D cross-point (XPOINT) memories from Intel® and Micron®. Memory circuitry 1720 may be implemented as one or more of solder down packaged integrated circuits, socketed memory modules and plug-in memory cards. The memory circuitry 1720 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1700, an operating system of infrastructure equipment 1700, one or more applications, and/or for carrying out the embodiments discussed herein. The computational logic may be stored or loaded into memory circuitry 1720 as instructions for execution by the processors of the application circuitry 1705 to provide or perform the functions described herein. The various elements may be implemented by assembler instructions supported by processors of the application circuitry 1705 or high-level languages that may be compiled into such instructions. The permanent copy of the programming instructions may be placed into persistent storage devices of memory circuitry 1720 in the factory during manufacture, or in the field through, for example, a distribution medium (not shown), through a communication interface (e.g., from a distribution server), and/or OTA.

The PMIC 1725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1730 may provide for electrical power drawn from a network cable to provide both power supply and data connectivity to the infrastructure equipment 1700 using a single cable.

The network controller circuitry 1735 provides connectivity to a network using a standard network interface protocol such as Ethernet, Ethernet over GRE Tunnels, Ethernet over MPLS, or some other suitable protocol, such as those discussed herein. Network connectivity may be provided to/from the infrastructure equipment 1700 via network interface connector 1740 using a physical connection, which may be electrical (commonly referred to as a "copper interconnect"), optical, or wireless. The network controller circuitry 1735 may include one or more dedicated processors and/or FPGAs to communicate using one or more of the aforementioned protocols. In some implementations, the network controller circuitry 1735 may include multiple controllers to provide connectivity to other networks using the same or different protocols. In various embodiments, the network controller circuitry 1735 enables communication with associated equipment and/or with a backend system (e.g., server(s) 1230 of FIG. 12), which may take place via a suitable gateway device.

The positioning circuitry 1745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1745 may include a Micro-Technology for Positioning, Navigation, and Timing (Micro-PNT) IC that uses a master timing clock to perform position tracking/estimation without GNSS assistance. The positioning circuitry 1745 may also be part of, or interact with, the baseband circuitry 1710 and/or RFEMs 1715 to communicate with the nodes and components of the positioning network. The positioning circuitry 1745 may also provide position data and/or time data to the application circuitry 1705, which may use the data to synchronize operations with various other infrastructure equipment, or the like. Additionally, when a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In ITSC implementations, the facilities layer of the road side ITS-S includes an ITS-S positioning service facility that provides and updates the geographical positioning of the ITS-S and/or other ITS-Ss in real time. Any of the aforementioned positioning technologies can be used to determine in real time the geographic position, with variable accuracy level for road safety ITS applications. In these implementations, the ITS-S positioning service facility may operate the positioning augmentation technology The components shown by FIG. 17 may communicate with one another using interface circuitry 1706 or IX 1706, which may include any number of bus and/or IX technologies such as ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 18:
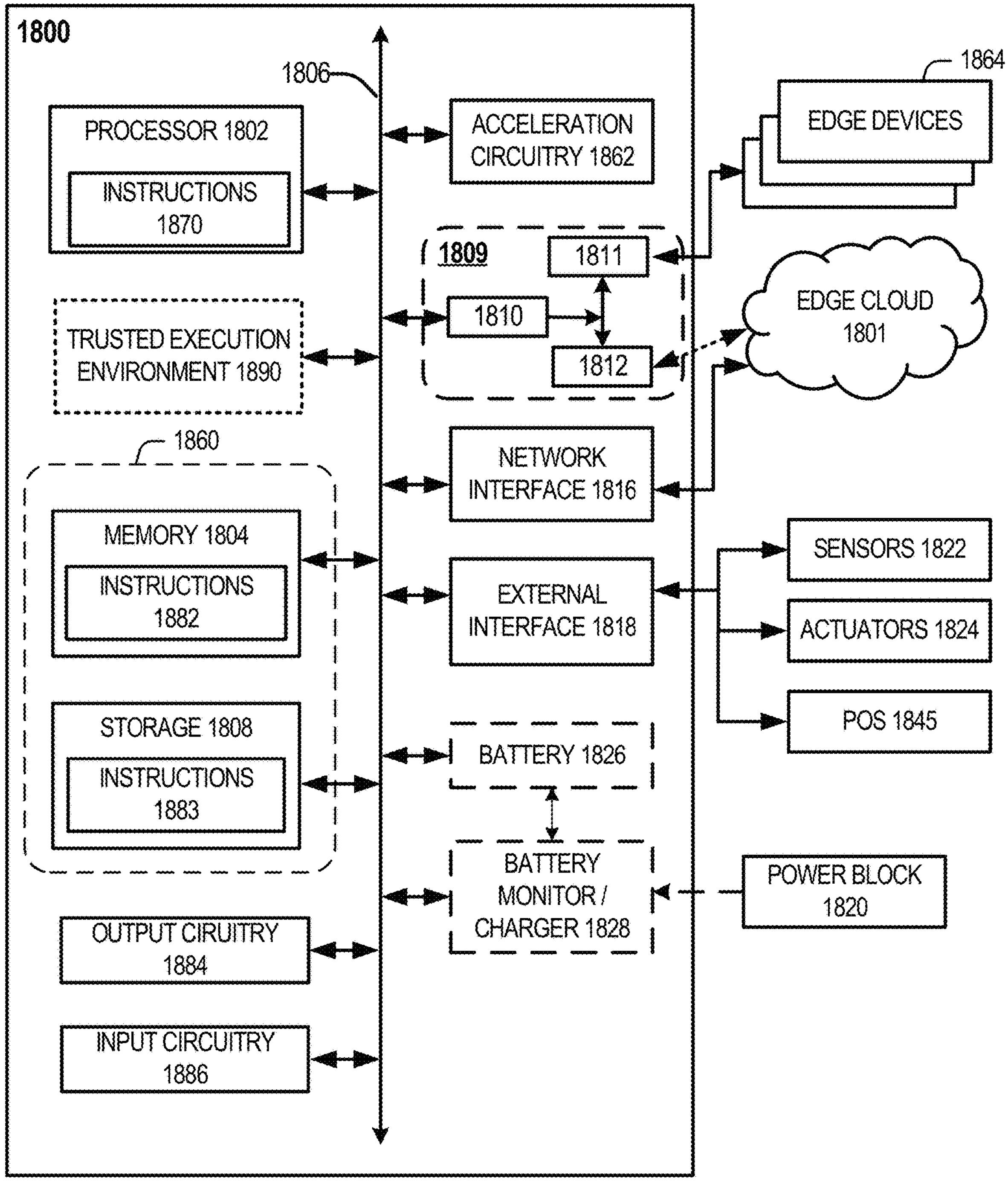
FIG. 18 illustrates an example of a computing platform in accordance with various embodiments.

FIG. 18 illustrates an example of a computing platform 1800 (also referred to as "system 1800," "device 1800," "appliance 1800," or the like) in accordance with various embodiments. In embodiments, the platform 1800 may be suitable for use as intermediate nodes 1220 and/or endpoints 1210 of FIG. 12, and/or any other element/device discussed herein with regard any other figure shown and described herein. Platform 1800 may also be implemented in or as a server computer system or some other element, device, or system discussed herein. The platform 1800 may include any combinations of the components shown in the example. The components of platform 1800 may be implemented as integrated circuits (ICs), portions thereof, discrete electronic devices, or other modules, logic, hardware, software, firmware, or a combination thereof adapted in the computer platform 1800, or as components otherwise incorporated within a chassis of a larger system. The example of FIG. 18 is intended to show a high level view of components of the computer platform 1800. However, some of the components shown may be omitted, additional components may be present, and different arrangement of the components shown may occur in other implementations.

The platform 1800 includes processor circuitry 1802. The processor circuitry 1802 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1802 may include one or more hardware accelerators, which may be microprocessors, programmable processing devices (e.g., FPGA, ASIC, etc.), or the like. The one or more hardware accelerators may include, for example, computer vision and/or deep learning accelerators. In some implementations, the processor circuitry 1802 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1802 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1802 may be coupled with or may include memory/storage and may be configured to execute instructions stored in the memory/storage to enable various applications or operating systems to run on the platform 1800. In these embodiments, the processors (or cores) of the processor circuitry 1802 is configured to operate application software to provide a specific service to a user of the platform 1800. In some embodiments, the processor circuitry 1802 may be a special-purpose processor/controller to operate according to the various embodiments herein.

As examples, the processor circuitry 1802 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1802 may be a part of a system on a chip (SoC), System-in-Package (SiP), a multi-chip package (MCP), and/or the like, in which the processor circuitry 1802 and other components are formed into a single integrated circuit, or a single package, such as the Edison™ or Galileo™ SoC boards from Intel® Corporation. Other examples of the processor circuitry 1802 are mentioned elsewhere in the present disclosure.

Additionally or alternatively, processor circuitry 1802 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1802 may comprise logic blocks or logic fabric including and other interconnected resources that may be programmed to perform various functions, such as the procedures, methods, functions, etc. of the various embodiments discussed herein. In such embodiments, the circuitry of processor circuitry 1802 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1802 may communicate with system memory circuitry 1804 over an interconnect 1806 (e.g., a bus). Any number of memory devices may be used to provide for a given amount of system memory. As examples, the memory circuitry 1804 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1804 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1804 may also comprise persistent storage devices, which may be temporal and/or persistent storage of any type, including, but not limited to, non-volatile memory, optical, magnetic, and/or solid state mass storage, and so forth.

The individual memory devices of memory circuitry 1804 may be implemented as one or more of solder down packaged integrated circuits, socketed memory modules, and plug-in memory cards. The memory circuitry 1804 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. In embodiments, the memory circuitry 1804 may be disposed in or on a same die or package as the processor circuitry 1802 (e.g., a same SoC, a same SiP, or soldered on a same MCP as the processor circuitry 1802).

To provide for persistent storage of information such as data, applications, operating systems (OS), and so forth, a storage circuitry 1808 may also couple to the processor circuitry 1802 via the interconnect 1806. In an example, the storage circuitry 1808 may be implemented via a solid-state disk drive (SSDD). Other devices that may be used for the storage circuitry 1808 include flash memory cards, such as SD cards, microSD cards, xD picture cards, and the like, and USB flash drives. In low power implementations, the storage circuitry 1808 may be on-die memory or registers associated with the processor circuitry 1802. However, in some examples, the storage circuitry 1808 may be implemented using a micro hard disk drive (HDD). Further, any number of new technologies may be used for the storage circuitry 1808 in addition to, or instead of, the technologies described, such resistance change memories, phase change memories, holographic memories, or chemical memories, among others.

The storage circuitry 1808 store computational logic 1883 (or "modules 1883") in the form of software, firmware, or hardware commands to implement the techniques described herein. The computational logic 1883 may be employed to store working copies and/or permanent copies of computer programs, or data to create the computer programs, for the operation of various components of platform 1800 (e.g., drivers, etc.), an OS of platform 1800 and/or one or more applications for carrying out the embodiments discussed herein. The computational logic 1883 may be stored or loaded into memory circuitry 1804 as instructions 1882, or data to create the instructions 1882, for execution by the processor circuitry 1802 to provide the functions described herein. The various elements may be implemented by assembler instructions supported by processor circuitry 1802 or high-level languages that may be compiled into such instructions (e.g., instructions 1870, or data to create the instructions 1870). The permanent copy of the programming instructions may be placed into persistent storage devices of storage circuitry 1808 in the factory or in the field through, for example, a distribution medium (not shown), through a communication interface (e.g., from a distribution server (not shown)), or over-the-air (OTA).

In an example, the instructions 1882 provided via the memory circuitry 1804 and/or the storage circuitry 1808 of FIG. 18 are embodied as one or more non-transitory computer readable storage media (see e.g., NTCRSM 1860) including program code, a computer program product or data to create the computer program, with the computer program or data, to direct the processor circuitry 1802 of platform 1800 to perform electronic operations in the platform 1800, and/or to perform a specific sequence or flow of actions, for example, as described with respect to the flowchart(s) and block diagram(s) of operations and functionality depicted previously. The processor circuitry 1802 accesses the one or more non-transitory computer readable storage media over the interconnect 1806.

In alternate embodiments, programming instructions (or data to create the instructions) may be disposed on multiple NTCRSM 1860. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1860 may be embodied by devices described for the storage circuitry 1808 and/or memory circuitry 1804. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1883, instructions 1882, 1870 discussed previously) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1800, partly on the system 1800, as a stand-alone software package, partly on the system 1800 and partly on a remote computer or entirely on the remote computer or server. In the latter scenario, the remote computer may be connected to the system 1800 through any type of network, including a LAN or WAN, or the connection may be made to an external computer (e.g., through the Internet using an Internet Service Provider).

In an example, the instructions 1870 on the processor circuitry 1802 (separately, or in combination with the instructions 1882 and/or logic/modules 1883 stored in computer-readable storage media) may configure execution or operation of a trusted execution environment (TEE) 1890. The TEE 1890 operates as a protected area accessible to the processor circuitry 1802 to enable secure access to data and secure execution of instructions. In some embodiments, the TEE 1890 may be a physical hardware device that is separate from other components of the system 1800 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 1890 may be implemented as secure enclaves, which are isolated regions of code and/or data within the processor and/or memory/storage circuitry of the system 1800. Only code executed within a secure enclave may access data within the same secure enclave, and the secure enclave may only be accessible using the secure application (which may be implemented by an application processor or a tamper-resistant microcontroller). Various implementations of the TEE 1890, and an accompanying secure area in the processor circuitry 1802 or the memory circuitry 1804 and/or storage circuitry 1808 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1800 through the TEE 1890 and the processor circuitry 1802.

In some embodiments, the memory circuitry 1804 and/or storage circuitry 1808 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1804 and/or storage circuitry 1808 may be divided into one or more trusted memory regions for storing applications or software modules of the TEE 1890.

Although the instructions 1882 are shown as code blocks included in the memory circuitry 1804 and the computational logic 1883 is shown as code blocks in the storage circuitry 1808, it should be understood that any of the code blocks may be replaced with hardwired circuits, for example, built into an FPGA, ASIC, or some other suitable circuitry. For example, where processor circuitry 1802 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1804 and/or storage circuitry 1808 may store program code of an operating system (OS), which may be a general purpose OS or an OS specifically written for and tailored to the computing platform 1800. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 1800, attached to the platform 1800, or otherwise communicatively coupled with the platform 1800. The drivers may include individual drivers allowing other components of the platform 1800 to interact or control various I/O devices that may be present within, or connected to, the platform 1800. For example, the drivers may include a display driver to control and allow access to a display device, a touchscreen driver to control and allow access to a touchscreen interface of the platform 1800, sensor drivers to obtain sensor readings of sensor circuitry 1821 and control and allow access to sensor circuitry 1821, actuator drivers to obtain actuator positions of the actuators 1822 and/or control and allow access to the actuators 1822, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the platform 1800 (not shown).

The components may communicate over the IX 1806. The IX 1806 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 1806 may be a proprietary bus, for example, used in a SoC based system.

The interconnect 1806 couples the processor circuitry 1802 to the communication circuitry 1809 for communications with other devices. The communication circuitry 1809 is a hardware element, or collection of hardware elements, used to communicate over one or more networks (e.g., cloud 1801) and/or with other devices (e.g., mesh devices/fog 1864). The communication circuitry 1809 includes baseband circuitry 1810 (or "modem 1810") and RF circuitry 1811 and 1812.

The baseband circuitry 1810 includes one or more processing devices (e.g., baseband processors) to carry out various protocol and radio control functions. Baseband circuitry 1810 may interface with application circuitry of platform 1800 (e.g., a combination of processor circuitry 1802, memory circuitry 1804, and/or storage circuitry 1808) for generation and processing of baseband signals and for controlling operations of the RF circuitry 1811 or 1812. The baseband circuitry 1810 may handle various radio control functions that enable communication with one or more radio networks via the RF circuitry 1811 or 1812. The baseband circuitry 1810 may include circuitry such as, but not limited to, one or more single-core or multi-core processors (e.g., one or more baseband processors) or control logic to process baseband signals received from a receive signal path of the RF circuitry 1811 and/or 1812, and to generate baseband signals to be provided to the RF circuitry 1811 or 1812 via a transmit signal path. In various embodiments, the baseband circuitry 1810 may implement an RTOS to manage resources of the baseband circuitry 1810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 18, in one embodiment, the baseband circuitry 1810 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G)/NR protocol entities when the communication circuitry 1809 is a cellular radiofrequency communication system, such as millimeter wave (mmWave) communication circuitry or some other suitable cellular communication circuitry. In the first example, the protocol processing circuitry 1802 would operate MAC, RLC, PDCP, SDAP, RRC, and NAS functions. In a second example, the protocol processing circuitry may operate one or more IEEE-based protocols when the communication circuitry 1809 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1810 and/or RF circuitry 1811 and 1812. The baseband circuitry 1810 may also support radio communications for more than one wireless protocol.

Continuing with the aforementioned embodiment, the baseband circuitry 1810 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1809 also includes RF circuitry 1811 and 1812 to enable communication with wireless networks using modulated electromagnetic radiation through a non-solid medium. Each of the RF circuitry 1811 and 1812 include a receive signal path, which may include circuitry to convert analog RF signals (e.g., an existing or received modulated waveform) into digital baseband signals to be provided to the baseband circuitry 1810. Each of the RF circuitry 1811 and 1812 also include a transmit signal path, which may include circuitry configured to convert digital baseband signals provided by the baseband circuitry 1810 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1811 or 1812 using metal transmission lines or the like.

The RF circuitry 1811 (also referred to as a "mesh transceiver") is used for communications with other mesh or fog devices 1864. The mesh transceiver 1811 may use any number of frequencies and protocols, such as 2.4 GHz transmissions under the IEEE 802.15.4 standard, using the Bluetooth® low energy (BLE) standard, as defined by the Bluetooth® Special Interest Group, or the ZigBee® standard, among others. Any number of RF circuitry 1811, configured for a particular wireless communication protocol, may be used for the connections to the mesh devices 1864. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1811 may communicate using multiple standards or radios for communications at different ranges. For example, the platform 1800 may communicate with close/proximate devices, e.g., within about 10 meters, using a local transceiver based on BLE, or another low power radio, to save power. More distant mesh devices 1864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1812 (also referred to as a "wireless network transceiver," a "cloud transceiver," or the like) may be included to communicate with devices or services in the cloud 1801 via local or wide area network protocols. The wireless network transceiver 1812 includes one or more radios to communicate with devices in the cloud 1801. The cloud 1801 may be the same or similar to cloud 144 discussed previously. The wireless network transceiver 1812 may be a LPWA transceiver that follows the IEEE 802.15.4, or IEEE 802.15.4g standards, among others, such as those discussed herein. The platform 1800 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 1811 and wireless network transceiver 1812, as described herein. For example, the radio transceivers 1811 and 1812 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 1811 and 1812 may include radios that are compatible with, and/or may operate according to any one or more of the following radio communication technologies and/or standards including but not limited to those discussed herein.

Network interface circuitry/controller (NIC) 1816 may be included to provide wired communication to the cloud 1801 or to other devices, such as the mesh devices 1864 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1800 via NIC 1816 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1816 may include one or more dedicated processors and/or FPGAs to communicate using one or more of the aforementioned network interface protocols. In some implementations, the NIC 1816 may include multiple controllers to provide connectivity to other networks using the same or different protocols. For example, the platform 1800 may include a first NIC 1816 providing communications to the cloud over Ethernet and a second NIC 1816 providing communications to other devices over another type of network.

The interconnect 1806 may couple the processor circuitry 1802 to an external interface 1818 (also referred to as "I/O interface circuitry" or the like) that is used to connect external devices or subsystems. The external devices include, inter alia, sensor circuitry 1821, actuators 1822, and positioning circuitry 1845.

The sensor circuitry 1821 may include devices, modules, or subsystems whose purpose is to detect events or changes in its environment and send the information (sensor data) about the detected events to some other a device, module, subsystem, etc. Examples of such sensors 1821 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1818 connects the platform 1800 to actuators 1822, allow platform 1800 to change its state, position, and/or orientation, or move or control a mechanism or system. The actuators 1822 comprise electrical and/or mechanical devices for moving or controlling a mechanism or system, and converts energy (e.g., electric current or moving air and/or liquid) into some kind of motion. The actuators 1822 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1822 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1800 may be configured to operate one or more actuators 1822 based on one or more captured events and/or instructions or control signals received from a service provider and/or various client systems.

The positioning circuitry 1845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1845 may include a Micro-Technology for Positioning, Navigation, and Timing (Micro-PNT) IC that uses a master timing clock to perform position tracking/estimation without GNSS assistance. The positioning circuitry 1845 may also be part of, or interact with, the communication circuitry 1809 to communicate with the nodes and components of the positioning network. The positioning circuitry 1845 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS).

In some implementations, the positioning circuitry 1845 is, or includes an INS, which is a system or device that uses sensor circuitry 1821 (e.g., motion sensors such as accelerometers, rotation sensors such as gyroscopes, and altimimeters, magentic sensors, and/or the like to continuously calculate (e.g., using dead by dead reckoning, triangulation, or the like) a position, orientation, and/or velocity (including direction and speed of movement) of the platform 1800 without the need for external references.

In some examples, various I/O devices may be present within, or connected to, the platform 1800, which are referred to as input device circuitry 1886 and output device circuitry 1884 in FIG. 18. The input device circuitry 1886 and output device circuitry 1884 include one or more user interfaces designed to enable user interaction with the platform 1800 and/or peripheral component interfaces designed to enable peripheral component interaction with the platform 1800. Input device circuitry 1886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1884 may be included to show information or otherwise convey information, such as sensor readings, actuator position(s), or other like information. Data and/or graphics may be displayed on one or more user interface components of the output device circuitry 1884. Output device circuitry 1884 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1800. The output device circuitry 1884 may also include speakers or other audio emitting devices, printer(s), and/or the like. In some embodiments, the sensor circuitry 1821 may be used as the input device circuitry 1886 (e.g., an image capture device, motion capture device, or the like) and one or more actuators 1822 may be used as the output device circuitry 1884 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 1824 may be coupled to the platform 1800 to power the platform 1800, which may be used in embodiments where the platform 1800 is not in a fixed location. The battery 1824 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1800 is mounted in a fixed location, the platform 1800 may have a power supply coupled to an electrical grid. In these embodiments, the platform 1800 may include power tee circuitry to provide for electrical power drawn from a network cable to provide both power supply and data connectivity to the platform 1800 using a single cable.

PMIC 1826 may be included in the platform 1800 to track the state of charge (SoCh) of the battery 1824, and to control charging of the platform 1800. The PMIC 1826 may be used to monitor other parameters of the battery 1824 to provide failure predictions, such as the state of health (SoH) and the state of function (SoF) of the battery 1824. The PMIC 1826 may include voltage regulators, surge protectors, power alarm detection circuitry. The power alarm detection circuitry may detect one or more of brown out (under-voltage) and surge (over-voltage) conditions. The PMIC 1826 may communicate the information on the battery 1824 to the processor circuitry 1802 over the interconnect 1806. The PMIC 1826 may also include an analog-to-digital (ADC) convertor that allows the processor circuitry 1802 to directly monitor the voltage of the battery 1824 or the current flow from the battery 1824. The battery parameters may be used to determine actions that the platform 1800 may perform, such as transmission frequency, mesh network operation, sensing frequency, and the like. As an example, the PMIC 1826 may be a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX.

A power block 1828, or other power supply coupled to a grid, may be coupled with the PMIC 1826 to charge the battery 1824. In some examples, the power block 1828 may be replaced with a wireless power receiver to obtain the power wirelessly, for example, through a loop antenna in the platform 1800. A wireless battery charging circuit, such as an LTC4020 chip from Linear Technologies of Milpitas, California, among others, may be included in the PMIC 1826. The specific charging circuits chosen depend on the size of the battery 1824, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

Various embodiments may include a video streaming device for dynamically generating an advertisement in a video stream, comprising: interface circuitry to communicate over a network; and processing circuitry to: receive, via the interface circuitry, video stream content associated with the video stream, wherein the video stream is to be transmitted to a user device; obtain video analytics data corresponding to the video stream content, wherein the video analytics data comprises at least an indication of a scene recognized in the video stream content; select the advertisement to be generated and inserted into the video stream content, wherein the advertisement is selected from a collection of advertisements based on the scene recognized in the video stream content; obtain an advertisement template for the advertisement, wherein the advertisement template comprises a template for generating video advertisement content corresponding to the advertisement; generate the video advertisement content based on the advertisement template and the video analytics data; generate modified video stream content based on the video stream content and the video advertisement content, wherein the modified video stream content is generated based on inserting the video advertisement content into the video stream content; and transmit, via the interface circuitry, the modified video stream content to the user device.

In some embodiments of the video streaming device, the video analytics data further comprises an indication of: a scene context, wherein the scene context indicates one or more contextual characteristics recognized in the scene; and scene content, wherein the scene content indicates one or more objects recognized in the scene.

In some embodiments of the video streaming device, the video analytics data further comprises: a natural language description of the scene context and the scene content; video content metadata indicating the scene context and the scene content; or a segmentation mask indicating where the one or more objects reside within the scene.

In some embodiments of the video streaming device, the processing circuitry to obtain the video analytics data corresponding to the video stream content is further to: determine whether a video analytics cache contains the video analytics data, wherein the video analytics cache contains a plurality of video analytics datasets generated based on a video content analysis performed on a plurality of videos; upon a determination that the video analytics cache contains the video analytics data, retrieve the video analytics data from the video analytics cache; and upon a determination that the video analytics cache does not contain the video analytics data: perform the video content analysis on the video stream content to generate the video analytics data; and cache the video analytics data in the video analytics cache.

In some embodiments of the video streaming device, the processing circuitry to obtain the video analytics data corresponding to the video stream content is further to: perform a video content analysis on the video stream content, wherein the video content analysis is to analyze the video stream content using a convolutional neural network (CNN); recognize, based on performing the video content analysis, the scene context and the scene content corresponding to the scene in the video stream content; and generate the video analytics data based on the scene context and the scene content.

In some embodiments of the video streaming device, the processing circuitry to generate the video advertisement content based on the advertisement template and the video analytics data is further to: obtain advertisement content from the advertisement template; identify, based on the video analytics data, a portion of the scene content to be replaced with the advertisement content; and generate the video advertisement content based on replacing the portion of the scene content with the advertisement content.

In some embodiments of the video streaming device, the processing circuitry to generate the video advertisement content based on the advertisement template and the video analytics data is further to: obtain advertisement content from the advertisement template; generate an ad scene to be depicted in the video advertisement content, wherein the ad scene is generated based on the advertisement content and the scene recognized in the video stream content; and generate the video advertisement content depicting the ad scene.

In some embodiments of the video streaming device, the processing circuitry to generate the video advertisement content based on the advertisement template and the video analytics data is further to: obtain a generative neural network (GNN) model for generating the video advertisement content, wherein the GNN model is trained to generate a genre of video content corresponding to the video advertisement content, and wherein the GNN model is obtained from a collection of GNN models trained to generate a plurality of genres of video content; and generate the video advertisement content using the GNN model, wherein the advertisement template and the video analytics data are supplied as input to the GNN model.

In some embodiments of the video streaming device, the GNN model comprises: a generative adversarial network (GAN) model; or a variational autoencoder (VAE) model.

In some embodiments of the video streaming device, the advertisement template further comprises a semantic representation of one or more objects to be depicted in the video advertisement content, wherein the one or more objects comprise a product associated with the advertisement.

In some embodiments of the video streaming device, the processing circuitry to generate the video advertisement content based on the advertisement template and the video analytics data is further to: identify a user of the user device; obtain user context data corresponding to the user, wherein the user context data indicates a user context of the user based on sensor data captured by one or more sensors; and personalize the video advertisement content for the user based on the user context.

In some embodiments of the video streaming device, the processing circuitry is further to: determine that the video stream content is protected via digital rights management (DRM) protection; authenticate, via the interface circuitry, the video streaming device with a DRM license server, wherein remote attestation is performed to authenticate the video streaming device with the DRM license server; obtain, via the interface circuitry, a content license from the DRM license server, wherein the content license authorizes the video streaming device to modify and distribute the video stream content; and generate the video advertisement content and the modified video stream content in a trusted execution environment.

In some embodiments of the video streaming device, the processing circuitry is further to track one or more metrics corresponding to the generated video advertisement content, wherein the one or more metrics comprise an indication of: protected content contained in the video advertisement content; how the protected content was modified; or an identify of the user consuming the protected content.

Various embodiments may include at least one non-transitory machine-readable storage medium having instructions stored thereon, wherein the instructions, when executed on processing circuitry of a video streaming device, cause the processing circuitry to: receive, via interface circuitry of the video streaming device, video stream content associated with a video stream, wherein the video stream is to be transmitted to a user device; obtain video analytics data corresponding to the video stream content, wherein the video analytics data comprises at least an indication of a scene recognized in the video stream content; select an advertisement to be generated and inserted into the video stream content, wherein the advertisement is selected from a collection of advertisements based on the scene recognized in the video stream content; obtain an advertisement template for the advertisement, wherein the advertisement template comprises a template for generating video advertisement content corresponding to the advertisement; generate the video advertisement content based on the advertisement template and the video analytics data; generate modified video stream content based on the video stream content and the video advertisement content, wherein the modified video stream content is generated based on inserting the video advertisement content into the video stream content; and transmit, via the interface circuitry, the modified video stream content to the user device.

In some embodiments of the storage medium, the video analytics data further comprises an indication of: a scene context, wherein the scene context indicates one or more contextual characteristics recognized in the scene; and scene content, wherein the scene content indicates one or more objects recognized in the scene.

In some embodiments of the storage medium, the video analytics data further comprises: a natural language description of the scene context and the scene content; video content metadata indicating the scene context and the scene content; or a segmentation mask indicating where the one or more objects reside within the scene.

In some embodiments of the storage medium, the instructions that cause the processing circuitry to obtain the video analytics data corresponding to the video stream content further cause the processing circuitry to: perform a video content analysis on the video stream content, wherein the video content analysis is to analyze the video stream content using a convolutional neural network (CNN); recognize, based on performing the video content analysis, the scene context and the scene content corresponding to the scene in the video stream content; and generate the video analytics data based on the scene context and the scene content.

In some embodiments of the storage medium, the instructions that cause the processing circuitry to generate the video advertisement content based on the advertisement template and the video analytics data further cause the processing circuitry to: obtain advertisement content from the advertisement template; identify, based on the video analytics data, a portion of the scene content to be replaced with the advertisement content; and generate the video advertisement content based on replacing the portion of the scene content with the advertisement content.

In some embodiments of the storage medium, the instructions that cause the processing circuitry to generate the video advertisement content based on the advertisement template and the video analytics data further cause the processing circuitry to: obtain advertisement content from the advertisement template; generate an ad scene to be depicted in the video advertisement content, wherein the ad scene is generated based on the advertisement content and the scene recognized in the video stream content; and generate the video advertisement content depicting the ad scene.

In some embodiments of the storage medium, the instructions that cause the processing circuitry to generate the video advertisement content based on the advertisement template and the video analytics data further cause the processing circuitry to: obtain a generative neural network (GNN) model for generating the video advertisement content, wherein the GNN model is trained to generate a genre of video content corresponding to the video advertisement content, and wherein the GNN model is obtained from a collection of GNN models trained to generate a plurality of genres of video content; and generate the video advertisement content using the GNN model, wherein the advertisement template and the video analytics data are supplied as input to the GNN model.

In some embodiments of the storage medium, the advertisement template further comprises a semantic representation of one or more objects to be depicted in the video advertisement content, wherein the one or more objects comprise a product associated with the advertisement.

In some embodiments of the storage medium, the instructions that cause the processing circuitry to generate the video advertisement content based on the advertisement template and the video analytics data further cause the processing circuitry to: identify a user of the user device; obtain user context data corresponding to the user, wherein the user context data indicates a user context of the user based on sensor data captured by one or more sensors; and personalize the video advertisement content for the user based on the user context.

In some embodiments of the storage medium, the instructions further cause the processing circuitry to: determine that the video stream content is protected via digital rights management (DRM) protection; authenticate, via the interface circuitry, the video streaming device with a DRM license server, wherein remote attestation is performed to authenticate the video streaming device with the DRM license server; obtain, via the interface circuitry, a content license from the DRM license server, wherein the content license authorizes the video streaming device to modify and distribute the video stream content; and generate the video advertisement content and the modified video stream content in a trusted execution environment.

Various embodiments may include a method performed by a video streaming device to dynamically generate an advertisement in a video stream, comprising: receiving video stream content associated with the video stream, wherein the video stream is to be transmitted to a user device; obtaining video analytics data corresponding to the video stream content, wherein the video analytics data comprises at least an indication of a scene recognized in the video stream content; selecting the advertisement to be generated and inserted into the video stream content, wherein the advertisement is selected from a collection of advertisements based on the scene recognized in the video stream content; obtaining the advertisement template for the advertisement, wherein the advertisement template comprises a template for generating video advertisement content corresponding to the advertisement; generating the video advertisement content based on the advertisement template and the video analytics data; generating modified video stream content based on the video stream content and the video advertisement content, wherein the modified video stream content is generated based on inserting the video advertisement content into the video stream content; and transmitting the modified video stream content to the user device.

In some embodiments of the method, the method further comprises: determining that the video stream content is protected via digital rights management (DRM) protection; authenticating the video streaming device with a DRM license server, wherein remote attestation is performed to authenticate the video streaming device with the DRM license server; obtaining a content license from the DRM license server, wherein the content license authorizes the video streaming device to modify and distribute the video stream content; and generating the video advertisement content and the modified video stream content in a trusted execution environment.

Various embodiments may include an apparatus for dynamically generating an advertisement in a video stream, comprising: means for receiving video stream content associated with the video stream, wherein the video stream is to be transmitted to a user device; means for obtaining video analytics data corresponding to the video stream content, wherein the video analytics data comprises at least an indication of a scene recognized in the video stream content; means for selecting the advertisement to be generated and inserted into the video stream content, wherein the advertisement is selected from a collection of advertisements based on the scene recognized in the video stream content; means for obtaining the advertisement template for the advertisement, wherein the advertisement template comprises a template for generating video advertisement content corresponding to the advertisement; means for generating the video advertisement content based on the advertisement template and the video analytics data; means for generating modified video stream content based on the video stream content and the video advertisement content, wherein the modified video stream content is generated based on inserting the video advertisement content into the video stream content; and means for transmitting the modified video stream content to the user device.

What is claimed is:

1. A device, comprising:

interface circuitry; and processing circuitry to:

receive, via the interface circuitry, a video stream for a user, wherein the video stream comprises video content protected based on digital rights management (DRM) protection;

authenticate, via the interface circuitry, with a DRM license server;

receive, via the interface circuitry, a content license from the DRM license server, wherein the content license authorizes the video content to be modified and distributed to the user;

modify the video content based on the content license, wherein a scene of the video content is modified to incorporate an advertisement; and transmit, via the interface circuitry, the modified video content for display to the user.

2. The device of claim 1, wherein the processing circuitry is further to:

track one or more metrics associated with the modified video content, wherein the one or more metrics indicate:

protected content that was modified in the modified video content;

modifications performed on the protected content; or a number of users that consumed the protected content.

3. The device of claim 1, wherein the processing circuitry to modify the video content based on the content license is further to:

receive metadata associated with the scene of the video content, wherein the metadata identifies content depicted in the scene;

select the advertisement to be incorporated into the scene, wherein the advertisement is selected from a plurality of advertisements based on the content depicted in the scene; and modify the scene to incorporate the advertisement.

4. The device of claim 1, wherein the processing circuitry to modify the video content based on the content license is further to:

generate the modified video content using a generative neural network.

5. The device of claim 1, wherein the video stream is received from a DRM content server.

6. The device of claim 1, wherein the video content is modified in a trusted execution environment.

7. The device of claim 1, wherein remote attestation is performed to authenticate with the DRM license server.

8. The device of claim 1, wherein the processing circuitry to transmit, via the interface circuitry, the modified video content for display to the user is further to:

transmit, via the interface circuitry, a modified video stream to the user, wherein the modified video stream comprises the modified video content.

9. The device of claim 1, wherein the processing circuitry to transmit, via the interface circuitry, the modified video content for display to the user is further to:

transmit, via the interface circuitry, the modified video content to a display device for display to the user.

10. At least one non-transitory machine-readable storage medium having instructions stored thereon, wherein the instructions, when executed on processing circuitry, cause the processing circuitry to:

receive a video stream for display to a user, wherein the video stream comprises video content protected based on digital rights management (DRM) protection;

authenticate, over a network, with a DRM license server;

receive, over the network, a content license from the DRM license server, wherein the content license authorizes the video content to be modified and distributed to the user;

modify the video content based on the content license, wherein a scene of the video content is modified to incorporate an advertisement; and transmit the modified video content for display to the user.

11. The storage medium of claim 10, wherein the instructions further cause the processing circuitry to:

track one or more metrics associated with the modified video content, wherein the one or more metrics indicate:

protected content that was modified in the modified video content;

modifications performed on the protected content; or a number of users that consumed the protected content.

12. The storage medium of claim 10, wherein the instructions that cause the processing circuitry to modify the video content based on the content license further cause the processing circuitry to:

receive metadata associated with the scene of the video content, wherein the metadata identifies content depicted in the scene;

select the advertisement to be incorporated into the scene; and modify the content depicted in the scene to incorporate the advertisement.

13. The storage medium of claim 10, wherein the instructions that cause the processing circuitry to modify the video content based on the content license further cause the processing circuitry to:

generate the modified video content using a generative neural network.

14. The storage medium of claim 10, wherein the video stream is received from a DRM content server.

15. The storage medium of claim 10, wherein the video content is modified in a trusted execution environment.

16. The storage medium of claim 10, wherein remote attestation is performed to authenticate with the DRM license server.

17. The storage medium of claim 10, wherein the instructions that cause the processing circuitry to transmit the modified video content for display to the user further cause the processing circuitry to:

transmit, over the network, a modified video stream to the user, wherein the modified video stream comprises the modified video content.

18. The storage medium of claim 10, wherein the instructions that cause the processing circuitry to transmit the modified video content for display to the user further cause the processing circuitry to:

transmit the modified video content to a display device for display to the user.

19. A method, comprising:

receiving a video stream for display to a user, wherein the video stream comprises video content protected based on digital rights management (DRM) protection;

authenticating, over a network, with a DRM license server;

receiving, over the network, a content license from the DRM license server, wherein the content license authorizes the video content to be modified and distributed to the user;

modifying the video content based on the content license, wherein a scene of the video content is modified to incorporate an advertisement; and transmitting the modified video content for display to the user.

20. The method of claim 19, further comprising:

tracking one or more metrics associated with the modified video content, wherein the one or more metrics indicate:

protected content that was modified in the modified video content;

modifications performed on the protected content; or a number of users that consumed the protected content.

21. The method of claim 19, wherein modifying the video content based on the content license comprises:

receiving metadata associated with the scene of the video content, wherein the metadata identifies content depicted in the scene;

selecting the advertisement to be incorporated into the scene; and modifying the content depicted in the scene to incorporate the advertisement.

22. The method of claim 19, wherein modifying the video content based on the content license comprises:

generating the modified video content using a generative neural network.

23. The method of claim 19, wherein the video stream is received from a DRM content server.

24. The method of claim 19, wherein the video content is modified in a trusted execution environment.

25. The method of claim 19, wherein transmitting the modified video content for display to the user comprises:

transmitting, over the network, a modified video stream to the user, wherein the modified video stream comprises the modified video content; or transmitting the modified video content to a display device for display to the user.

* * * * *